US012566769B1

(12) United States Patent
Sun et al.

(10) Patent No.: US 12,566,769 B1
(45) Date of Patent: *Mar. 3, 2026

(54) SYSTEMS AND METHODS FOR CONSERVING TOKEN USE WITH A LANGUAGE MODEL FOR CONTEXTUAL ENTITY SELECTION

(71) Applicant: Dyania Health, Inc., Jersey City, NJ (US)

(72) Inventors: Weiqi Sun, Hoboken, NJ (US); Renae Schlosser, Silver Lake, OH (US); George Sakkis, Athens (GR); Jason Cannavale, Hoboken, NJ (US)

(73) Assignee: Dyania Health, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/252,808

(22) Filed: Jun. 27, 2025

Related U.S. Application Data

(63) Continuation of application No. PCT/GR2025/050015, filed on Jun. 2, 2025.

(51) Int. Cl.
G06F 16/2457 (2019.01)
G06F 16/242 (2019.01)

(52) U.S. Cl.
CPC ...... G06F 16/24578 (2019.01); G06F 16/243 (2019.01)

(58) Field of Classification Search
None
See application file for complete search history.

(56) References Cited

U.S. PATENT DOCUMENTS

| | | | |
|---|---|---|---|
| 12,259,915 | B2 | 3/2025 | Qadrud-Din et al. |
| 12,373,649 | B1 | 7/2025 | Matthews et al. |

(Continued)

FOREIGN PATENT DOCUMENTS

| | | |
|---|---|---|
| CN | 119252451 A | 1/2025 |
| JP | 2004-227218 A | 8/2004 |
| WO | WO-01/97155 A1 | 12/2001 |

OTHER PUBLICATIONS

Jia et al, 2021, "Scaling up Visual and Vision-Language Representation Learning With Noisy Text Supervision", https:// proceedings. mlr.press/v139/jia21b/jia21b.pdf (Year: 2021).

(Continued)

*Primary Examiner* — Kannan Shanmugasundaram
(74) *Attorney, Agent, or Firm* — Foley & Lardner LLP

(57) ABSTRACT

A system for conserving token use with a language model can include a server configured to store a plurality of records in a database; receive, from a client device, a request comprising a set of criteria to identify whether the entity satisfies the set of criteria; generate a first natural language query comprising a first record selected based on a first timestamp; execute a language model the first natural language query to generate a first result; generate a second natural language query comprising a second record selected based at least on the second record corresponding to a second timestamp; execute the language model using the second natural language query to generate a second result; determine the set of criteria is satisfied based at least on the second result; and communicate a message identifying the entity to the client device.

20 Claims, 16 Drawing Sheets

(56) References Cited

U.S. PATENT DOCUMENTS

| 2022/0130504 | A1 |   | 4/2022 | Burch et al. | |
| 2022/0319697 | A1 | * | 10/2022 | Morris | G06Q 10/10 |
| 2023/0385315 | A1 |   | 11/2023 | Jiao et al. | |
| 2024/0221874 | A1 | * | 7/2024 | Miotto | G16H 10/20 |
| 2025/0258708 | A1 |   | 8/2025 | Crabtree et al. | |
| 2025/0258938 | A1 |   | 8/2025 | Palladino et al. | |

OTHER PUBLICATIONS

Non-Final Office Action on U.S. Appl. No. 19/252,833 dated Oct. 7, 2025.

Non-Final Office Action on U.S. Appl. No. 19/252,902 dated Sep. 18, 2025.

International Search Report and Written Opinion on PCT Appl. No. PCT/GR2025/050015 mailed on Nov. 21, 2025.

* cited by examiner

105

190

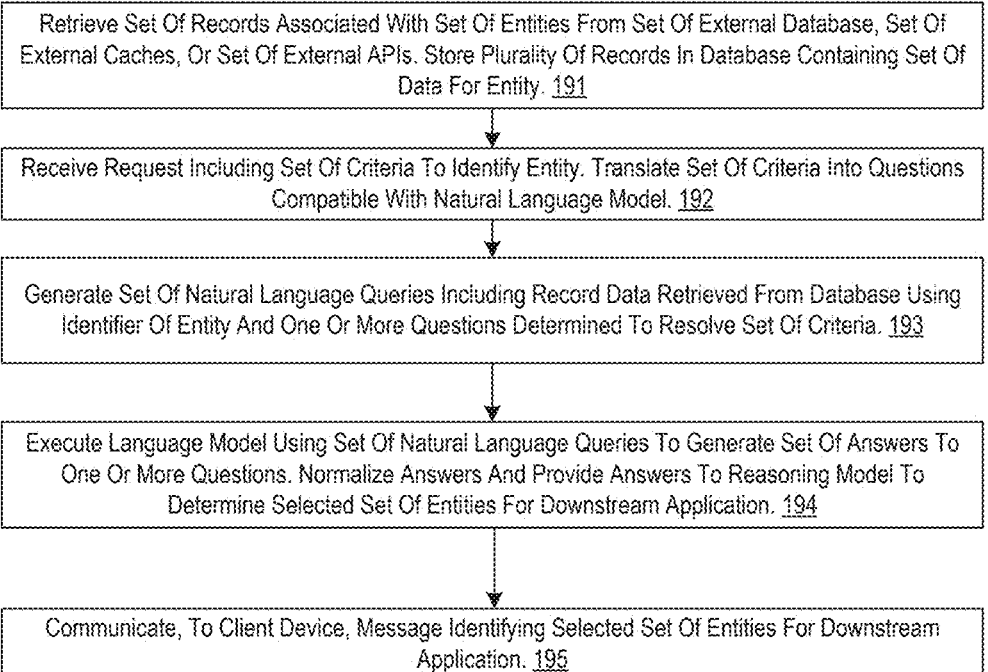

Retrieve Set Of Records Associated With Set Of Entities From Set Of External Database, Set Of External Caches, Or Set Of External APIs. Store Plurality Of Records In Database Containing Set Of Data For Entity. 191

Receive Request Including Set Of Criteria To Identify Entity. Translate Set Of Criteria Into Questions Compatible With Natural Language Model. 192

Generate Set Of Natural Language Queries Including Record Data Retrieved From Database Using Identifier Of Entity And One Or More Questions Determined To Resolve Set Of Criteria. 193

Execute Language Model Using Set Of Natural Language Queries To Generate Set Of Answers To One Or More Questions. Normalize Answers And Provide Answers To Reasoning Model To Determine Selected Set Of Entities For Downstream Application. 194

Communicate, To Client Device, Message Identifying Selected Set Of Entities For Downstream Application. 195

FIG. 1D

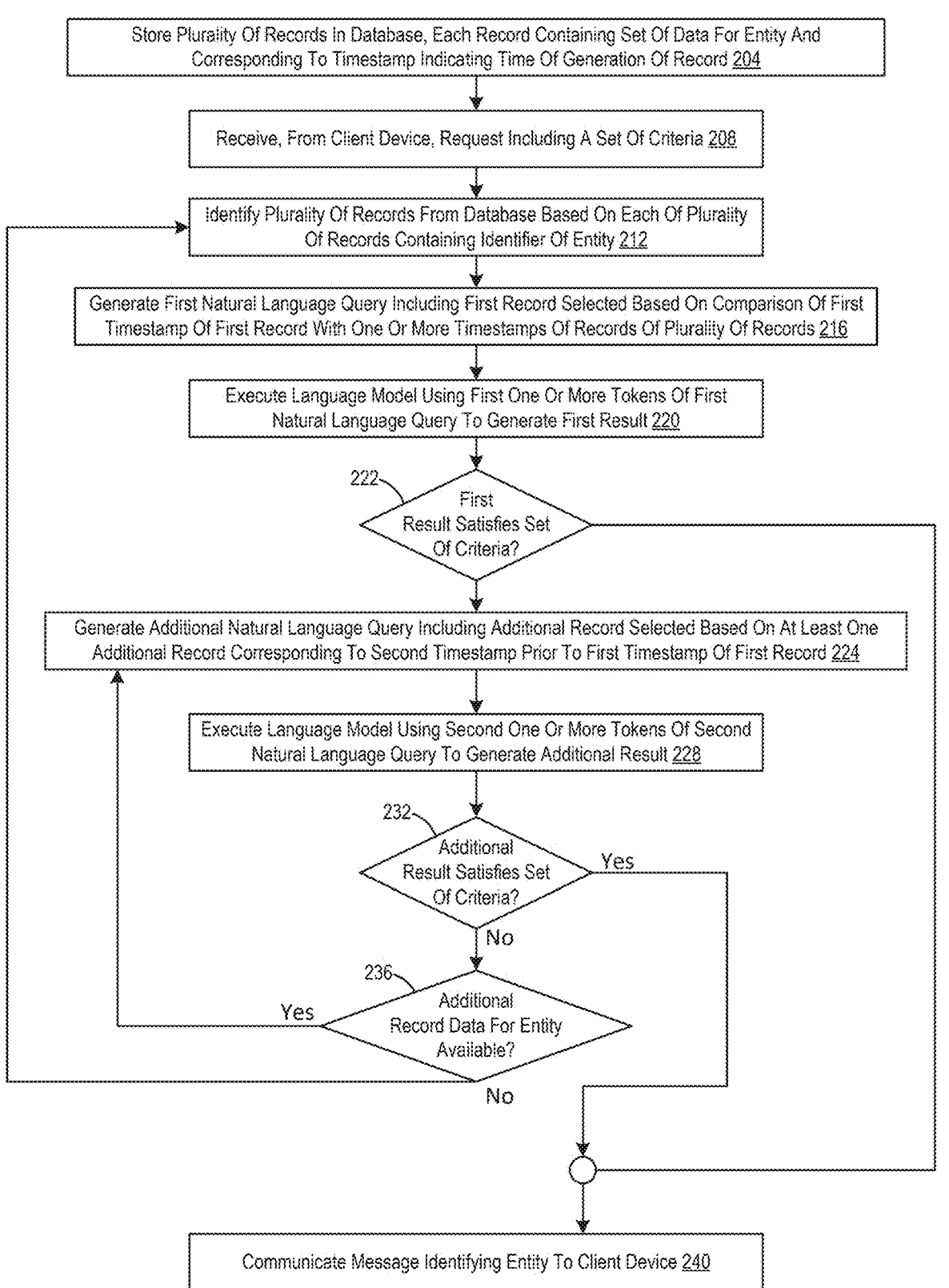

201

Store Plurality Of Records In Database, Each Record Containing Set Of Data For Entity And Corresponding To Timestamp Indicating Time Of Generation Of Record 204

Receive, From Client Device, Request Including A Set Of Criteria 208

Identify Plurality Of Records From Database Based On Each Of Plurality Of Records Containing Identifier Of Entity 212

Generate First Natural Language Query Including First Record Selected Based On Comparison Of First Timestamp Of First Record With One Or More Timestamps Of Records Of Plurality Of Records 216

Execute Language Model Using First One Or More Tokens Of First Natural Language Query To Generate First Result 220

222 — First Result Satisfies Set Of Criteria?

Generate Additional Natural Language Query Including Additional Record Selected Based On At Least One Additional Record Corresponding To Second Timestamp Prior To First Timestamp Of First Record 224

Execute Language Model Using Second One Or More Tokens Of Second Natural Language Query To Generate Additional Result 228

232 — Additional Result Satisfies Set Of Criteria?     Yes

No

236 — Additional Record Data For Entity Available?     Yes

No

Communicate Message Identifying Entity To Client Device 240

A Phase II, Open-Label Study Evaluating the Efficacy and Safety of XYZ-123, a Selective ROS1 Inhibitor, in Patients with ROS1-Positive Non-Small Cell Lung Cancer MRN ∨ | Match Status ∨ | Recruitment Stage ∨ | Criteria ∨

Patient Recruitment Tracking

| MRN | Date Identified | | inc1: Age > 18 | inc2: Diagnosis of ROS1-positive metastatic NSCLC confirmed by FISH | inc3: No history of cardiovascular events in the past 6 months |
|---|---|---|---|---|---|
| 12568954 | 08/22/2024 | | Accepted | Accepted | Accepted |
| 23568956 | 08/28/2024 | | Accepted | Accepted | Accepted |
| 47367898 | 08/30/2024 | | Accepted | Accepted | Accepted |
| 54873265 | 08/20/2024 | | Accepted | Accepted | Accepted |
| 23456789 | 08/30/2024 | | Accepted | Accepted | Borderline |
| 47634569 | 08/18/2024 | | Accepted | Accepted | Accepted |
| 89123455 | 08/22/2024 | | Accepted | Accepted | Accepted |
| 91234567 | 08/28/2024 | | Accepted | Accepted | Borderline |
| 12345678 | 08/27/2024 | | Accepted | Missing Information | Accepted |

X Patient Assessment — 491

Recruitment — 493

| Key | Criteria | Justifications | Assessment |
|---|---|---|---|
| inc1 | Age >18 | 1 Match Found | Accepted |
| inc2 | Diagnosis of ROS1-positive metastatic NSCLC confirmed by FISH | 2 Matches Found | Accepted |
| inc3 | No history of cardiovascular events in the past 6 months | 2 Matches Found | Accepted |
| inc4 | ECOG performance status ≤ 2 | 1 Match Found | Accepted |
| inc5 | AST and ALT <= 3 x ULN | 2 Matches Found | Accepted |
| exc 1 | Active CNS metastases | 0 Match Found | Accepted |
| exc 2 | Major surgery within 4 weeks | 0 Match Found | Accepted |
| exc 3 | Clinical trial participant | 0 Match Found | Accepted |
| exc 4 | History of other malignancy within the past 3 years | 2 Matches Found | Accepted |
| exc 5 | Bacterial infection required treatment within the past 2 months | 0 Match Found | Accepted |

SYSTEMS AND METHODS FOR CONSERVING TOKEN USE WITH A LANGUAGE MODEL FOR CONTEXTUAL ENTITY SELECTION

CROSS-REFERENCE TO RELATED APPLICATIONS

This application claims the benefit of priority as a bypass continuation to International Application No. PCT/GR2025/050015, filed in the Greek Receiving Office on Jun. 2, 2025, the entirety of which is incorporated by reference herein.

BACKGROUND

Medical records provide documentation of patient healthcare interactions and may be created or updated during encounters across various healthcare settings. Modern Electronic Medical Record (EMR) systems may contain a complex mix of structured data (like vital signs and lab values) and unstructured data (such as conversations, clinical notes based on observations and conversations, and patient narratives). Such a mixture may make comprehensive searches through an EMR challenging and involve a significant amount of latency and processing power to complete the searches.

SUMMARY

The evaluation of natural language criteria against patient records presents significant challenges due to the complexity of qualitative terms, contextual understanding, and diverse data formats, but recent approaches use Large Language Models (LLMs) to overcome these limitations by processing both structured and unstructured text data, generating natural language queries or inputs that combine record data with criteria questions, and producing assessments of criteria satisfaction, which can be applied in clinical settings such as determining patient eligibility for trials, while addressing practical considerations like LLM costs and distributed data management.

Some embodiments may use a language model to determine whether candidate patients satisfy certain criteria to provide fast and accurate detection of multiple patients or other entities for a clinical trial or for other clinical applications. Some embodiments may augment the use of language models by comparing values across multiple records and by applying a time-based or temporally defined approach to prioritize language model use. Comparing values across multiple records for one or more criteria may enable the detection of criteria-satisfying data that stretch across a large time block. Additionally, using a time-based approach to prioritize language model use and conserve token consumption may enable the efficient processing of a large batch of unstructured data.

Some embodiments may perform operations related to conserving token use with a language model. In some aspects, the techniques described herein relate to a system including a server comprising one or more processors configured by instructions stored in memory to store a plurality of records in a database, each record containing a set of data for an entity and corresponding to a timestamp indicating a time of generation of the record; receive, from a client device, a request including a set of criteria to identify whether the entity satisfies the set of criteria; identify the plurality of records from the database based on each of the plurality of records containing an identifier of the entity;

generate a first natural language query including a first record selected based on a comparison of a first timestamp of the first record with one or more timestamps of records of the plurality of records; execute a language model using a first one or more tokens of the first natural language query to generate a first result; responsive to determining the first result does not satisfy the set of criteria, generate a second natural language query including a second record selected based at least on the second record corresponding to a second timestamp prior to the first timestamp of the first record; execute the language model using a second one or more tokens the second natural language query to generate a second result; determine the set of criteria is satisfied based at least on the second result; and communicate a message identifying the entity to the client device responsive to the determining the set of criteria is satisfied.

In some aspects, the techniques described herein relate to a system to: sort the plurality of records to determine a sorted plurality of records based on the one or more timestamps of the plurality of records; and select the first record from the sorted plurality of records based at least on the first timestamp of the first record corresponding to a most recent timestamp of the one or more timestamps of the plurality of records.

In some aspects, the techniques described herein relate to a system to: select the second record from the sorted plurality of records based at least on the second timestamp corresponding to a closest time to the first timestamp.

In some aspects, the techniques described herein relate to a system to: determine the relevance of the content of each of the plurality of records to the set of criteria, wherein the one or more processors are configured to select the first record based on the relevance of the content of the first record to the set of criteria.

In some aspects, the techniques described herein relate to a system to determine the relevance of the content of the first record to the set of criteria by: generating a set of questions determined to resolve the set of criteria; and determining the relevance of the content of the first record to the set of questions.

In some aspects, the techniques described herein relate to a system to determine the relevance of the content of the first record to the set of criteria by: generating a criterion embedding from at least one of the set of criteria and a content embedding from the content of the first record using an embedding model; and determining the relevance based on a similarity between the criterion embedding and the content embedding.

In some aspects, the techniques described herein relate to a system to: obtain a duration parameter; and select the second record responsive to determining the second record is within a time period associated with the duration parameter.

In some aspects, the techniques described herein relate to a system to: obtain a set of categories for data sources for the plurality of records; obtain a set of priorities for the plurality of records, wherein the set of priorities indicates relative or absolute priority values associated with the set of categories; categorize the plurality of records based on the set of categories for the plurality of records; and sort an order of the plurality of records based on the set of priorities, wherein selecting the first record from the plurality of records includes selecting the first record based at least on a priority of a category of the first record.

In some aspects, the techniques described herein relate to a system to: obtain a structured data set associated with the record; determine a result indicating that data within the structured data set does not satisfy the set of criteria; and generate the first natural language query using unstructured data within the first record in response to determining the result does not satisfy the set of criteria.

In some aspects, the techniques described herein relate to a system to: generate a summary indicating a quantitative change over time or a categorical change over time based on the plurality of records; and generate the first natural language query or the second natural language query based on the summary.

In some aspects, the techniques described herein relate to a method, including: storing, by one or more processors, a plurality of records in a database, each record containing a set of data for an entity and corresponding to a timestamp indicating a time of generation of the record; receiving, by the one or more processors from a client device, a request including a set of criteria to determine whether the entity satisfies the set of criteria; identifying, by the one or more processors, the plurality of records from the database based on each of the plurality of records containing an identifier of the entity; generating, by the one or more processors, a first natural language query including a first record selected based on a comparison of a first timestamp of the first record with one or more timestamps of records of the plurality of records; executing, by the one or more processors, a language model using a first one or more tokens of the first natural language query to generate a first result; responsive to determining the first result does not satisfy the set of criteria, generating, by the one or more processors, a second natural language query including a second record selected based at least on the second record corresponding to a second timestamp prior to the first timestamp of the first record; executing, by the one or more processors, the language model using a second one or more tokens the second natural language query to generate a second result; determining, by the one or more processors, the set of criteria is satisfied based at least on the second result; and communicating, by the one or more processors, a message identifying the entity to the client device responsive to the determining the set of criteria is satisfied.

In some aspects, the techniques described herein relate to a method, including: sorting, by the one or more processors, the plurality of records to determine a sorted plurality of records based on the one or more timestamps of the plurality of records; and selecting, by the one or more processors, the first record from the sorted plurality of records based at least on the first timestamp of the first record corresponding to a most recent timestamp of the one or more timestamps of the plurality of records.

In some aspects, the techniques described herein relate to a method, including: selecting, by the one or more processors, the second record from the sorted plurality of records based at least on the second timestamp corresponding to a closest time to the first timestamp.

In some aspects, the techniques described herein relate to a method, including: determining, by the one or more processors, a relevance of content of each of the plurality of records to the set of criteria; and selecting, by the one or more processors, the first record based on the relevance of content of the first record to the set of criteria.

In some aspects, the techniques described herein relate to a method, wherein determining the relevance of the content of the first record to the set of criteria includes: generating, by the one or more processors, a set of questions determined to resolve the set of criteria; and determining, by the one or more processors, the relevance of the content of the first record to the set of questions.

In some aspects, the techniques described herein relate to a method, wherein determining the relevance of the content of the first record to the set of criteria includes: generating, by the one or more processors, a criterion embedding from at least one of the set of criteria and a content embedding from the content of the first record using an embedding model; and determining, by the one or more processors, the relevance based on a similarity between the criterion embedding and the content embedding.

In some aspects, the techniques described herein relate to a method, including: obtaining, by the one or more processors, a duration parameter; and selecting, by the one or more processors, the second record responsive to determining the second record is within a time period associated with the duration parameter.

In some aspects, the techniques described herein relate to one or more non-transitory machine-readable media storing program instructions that, when executed by one or more processors, causes the one or more processors to perform operations including: storing a plurality of records in a database, each record containing a set of data for an entity and corresponding to a timestamp indicating a time of generation of the record; receiving, from a client device, a request including a set of criteria to identify whether the entity satisfies the set of criteria; identifying the plurality of records from the database based on each of the plurality of records containing an identifier of the entity; generating a first natural language query including a first record selected based on a comparison of a first timestamp of the first record with one or more timestamps of records of the plurality of records; executing a language model using a first one or more tokens of the first natural language query to generate a first result; responsive to determining the first result does not satisfy the set of criteria, generating a second natural language query including a second record selected based at least on the second record corresponding to a second timestamp prior to the first timestamp of the first record; executing the language model using a second one or more tokens in the second natural language query to generate a second result; determining the set of criteria is satisfied based at least on the second result; and communicating a message identifying the entity to the client device responsive to the determining the set of criteria is satisfied.

In some aspects, the techniques described herein relate to a non-transitory machine-readable media to: sorting the plurality of records to determine a sorted plurality of records based on the one or more timestamps of the plurality of records; and selecting the first record from the sorted plurality of records based at least on the first timestamp of the first record corresponding to a most recent timestamp of the one or more timestamps of the plurality of records.

In some aspects, the techniques described herein relate to a non-transitory machine-readable media to: selecting the second record from the sorted plurality of records based at least on the second timestamp corresponding to a closest time to the first timestamp.

Some embodiments may perform operations for entity identification. In some aspects, the techniques described herein relate to a system including: a server including one or more processors, configured by instructions stored in memory to: store a plurality of records in a database, each record containing a set of data for an entity; receive, from a client device, a request including a set of criteria to identify whether the entity satisfies the set of criteria; generate a first natural language query including one or more questions determined to resolve the set of criteria and a first record retrieved from the database using an identifier of the entity;

execute a language model using the first natural language query to generate at least a first answer to the one or more questions: responsive to determining the first answer does not satisfy the set of criteria, generate a second natural language query including the one or more questions and a second record retrieved from the database using the identifier of the entity; execute the language model using the second natural language query to generate at least a second answer to the one or more questions; determine a combination of the first answer and the second answer satisfy the set of criteria; and generate an alert identifying the entity responsive to the determining the combination of at least the first answer and the second answer satisfy the set of criteria.

In some aspects, the techniques described herein relate to a system to: determine at least one of the one or more questions can be resolved with structured data; responsive to the determination, map the at least one question to a programmatic query configured to query one or more of the plurality of records; and execute the programmatic query to retrieve a third answer from the one or more records.

In some aspects, the techniques described herein relate to a system to determine a combination of at least the first answer, the second answer, and the third answer satisfy the set of criteria.

In some aspects, the techniques described herein relate to a system to generate the first natural language query including the one or more questions and the first record in response to determining the third answer does not satisfy the set of criteria.

In some aspects, the techniques described herein relate to a system, wherein the language model is a decoder-only model, wherein the one or more processors are configured to: execute an encoder-decoder model using the first answer and the second answer to generate a normalized first answer and second answer, and wherein the one or more processors are configured to determine the combination of the first answer and the second answer satisfy the set of criteria by determining a combination of the normalized first answer and second answer satisfy the set of criteria.

In some aspects, the techniques described herein relate to a system to: generate, using a second language model, a set of code using the first answer and/or the second answer; and identify, using the set of code, a first record of the plurality of records based on which the first answer and/or the second answer were generated.

In some aspects, the techniques described herein relate to a system to: output an identification of the first record to a user interface of the client device.

In some aspects, the techniques described herein relate to a system to execute a language model using the first natural language query to generate at least the first answer to the one or more questions by: generating, using the language model, an intermediate representation of the first answer generated based on the first record and a confidence score for the intermediate representation of the first answer; and providing the intermediate representation of the first answer and the confidence score to the language model.

In some aspects, the techniques described herein relate to a system to: store the first answer in a cache; and retrieve the first answer from the cache responsive to generating the second answer.

In some aspects, the techniques described herein relate to a method, including: storing, by one or more processors, a plurality of records in a database, each record containing a set of data for an entity; receiving, by the one or more processors, from a client device, a request including a set of criteria to identify whether the entity satisfies the set of criteria; generating, by the one or more processors, a first natural language query including one or more questions determined to resolve the set of criteria and a first record retrieved from the database using an identifier of the entity; executing, by the one or more processors, a language model using the first natural language query to generate at least a first answer to the one or more questions: responsive to determining the first answer does not satisfy the set of criteria, generating, by the one or more processors, a second natural language query including the one or more questions and a second record retrieved from the database using the identifier of the entity; executing, by the one or more processors, the language model using the second natural language query to generate at least a second answer to the one or more questions; determining, by the one or more processors, a combination of the first answer and the second answer satisfy the set of criteria; and generating, by the one or more processors, an alert identifying the entity responsive to the determining that the combination of at least the first answer and the second answer satisfy the set of criteria.

In some aspects, the techniques described herein relate to a method, including: determining, by the one or more processors, at least one of the one or more questions can be resolved with structured data; responsive to the determination, mapping, by the one or more processors, the at least one question to a programmatic query configured to query one or more of the plurality of records; and executing, by the one or more processors, the programmatic query to retrieve a third answer from the one or more records.

In some aspects, the techniques described herein relate to a method, including determining, by the one or more processors, a combination of at least the first answer, the second answer, and the third answer satisfy the set of criteria.

In some aspects, the techniques described herein relate to a method, including generating, by the one or more processors, the first natural language query including the one or more questions and the first record in response to determining the third answer does not satisfy the set of criteria.

In some aspects, the techniques described herein relate to a method, wherein the language model is a decoder-only model, the method including: executing, by the one or more processors, an encoder-decoder model using the first answer and the second answer to generate a normalized first answer and second answer, wherein determining the combination of the first answer and the second answer satisfy the set of criteria includes determining, by the one or more processors, a combination of the normalized first answer and second answer satisfy the set of criteria.

In some aspects, the techniques described herein relate to a method, including: generating, by the one or more processors, using a second language model, a set of code using the first answer and/or the second answer; and identifying, by the one or more processors using the set of code, a first record of the plurality of records based on which the first answer and/or the second answer were generated.

In some aspects, the techniques described herein relate to a method, including: outputting, by the one or more processors, an identification of the first record to a user interface of the client device.

In some aspects, the techniques described herein relate to non-transitory machine-readable media storing program instructions that, when executed by one or more processors, causes the one or more processors to perform operations including: storing a plurality of records in a database, each record containing a set of data for an entity; receiving, from a client device, a request including a set of criteria to identify whether the entity satisfies the set of criteria; generating a first natural language query including one or more questions determined to resolve the set of criteria and a first record retrieved from the database using an identifier of the entity; executing a language model using the first natural language query to generate at least a first answer to the one or more questions: responsive to determining the first answer does not satisfy the set of criteria, generating a second natural language query including the one or more questions and a second record retrieved from the database using the identifier of the entity; executing the language model using the second natural language query to generate at least a second answer to the one or more questions; determining a combination of at least the first answer and the second answer satisfy the set of criteria; and generating an alert identifying the entity responsive to the determining that the combination of at least the first answer and the second answer satisfy the set of criteria.

In some aspects, the techniques described herein relate to non-transitory machine-readable media to perform operations including: determining at least one of the one or more questions can be resolved with structured data; responsive to the determination, mapping the at least one question to a programmatic query configured to query one or more of the plurality of records; and executing the programmatic query to retrieve a third answer from the one or more records.

In some aspects, the techniques described herein relate non-transitory machine-readable media to perform operations including determining a combination of at least the first answer, the second answer, and the third answer satisfy the set of criteria.

In some aspects, the techniques described herein relate to non-transitory machine-readable media to perform operations including generating the first natural language query including the one or more questions and the first record in response to determining the third answer does not satisfy the set of criteria.

Some embodiments may perform operations for language model-based entity identification. In some aspects, the techniques described herein relate to a system including: a server including one or more processors configured by instructions stored in memory to: store a plurality of records in a database, the plurality of records containing data for a plurality of entities; receive, from a client device, a request including a document identifying a set of criteria and a target number of entities; convert the set of criteria into a set of questions to which answers resolve the set of criteria; iteratively, for each entity of the plurality of entities until one of identifying the target number of entities or completing iteration through the plurality of entities: generate a natural language query for each of a set of records selected based on the record containing an identifier of the entity, the natural language query for each record containing the set of questions and the record; execute a language model using the natural language queries generated from the set of records to generate one or more sets of answers to the set of questions; responsive to determining the one or more sets of answers satisfy the set of criteria, identify the entity as having satisfied the set of criteria; and determine whether the target number of entities has been identified; and transmit a message including an identification of each of one or more of the plurality of entities identified as having satisfied said set of criteria to the client device.

In some aspects, the techniques described herein relate to a system to, for each entity: retrieve one or more records from the database based on the one or more records including the identifier of the entity; and select the set of records from the one or more records based on a relevancy of each record of the set to at least one criterion of the set of criteria.

In some aspects, the techniques described herein relate to a system to select the set of records from the database by: identifying a timestamp of each of the one or more records containing the identifier of the entity; and selecting the set of records based on each record of the set having a timestamp within a defined time period.

In some aspects, the techniques described herein relate to a system to, for at least one of the plurality of entities: generate a first natural language query including the set of questions and a first record of the set of records including the identifier of the entity; execute the language model using a first natural language query to generate at least a first answer to the set of questions and using a second natural language query to generate at least a second answer to the set of questions; and determine a combination of the first answer and the second answer satisfy the set of criteria.

In some aspects, the techniques described herein relate to a system to only use a subset of the set of records to determine the set of criteria is satisfied and stop iteration for the entity responsive to the determination that the set of criteria is satisfied.

In some aspects, the techniques described herein relate to a system to: execute an encoder-decoder model to normalize the one or more sets of answers; and determine if the normalized one or more sets of answers satisfy the set of criteria.

In some aspects, the techniques described herein relate to a system, wherein the one or more processors are configured to: determine the set of criteria is satisfied responsive to determining every criterion of the set of criteria is satisfied by the one or more sets of answers.

In some aspects, the techniques described herein relate to a system, wherein the set of criteria comprises an early exit criterion that, when satisfied, indicates the set of criteria is satisfied, and wherein the one or more processors are configured to determine the one or more sets of answers satisfy the set of criteria by determining the one or more sets of answers satisfy the early exit criterion while other criteria of the set of criteria remain unsatisfied by the one or more sets of answers.

In some aspects, the techniques described herein relate to a system, where the one or more processors are configured to: determine the set of criteria is satisfied responsive to determining a first subset of the set of criteria is satisfied; identify a second subset of the set of criteria that was not satisfied by the one or more sets of answers; and generate the message to include an association between the second subset of the set of criteria and the identifier of the entity in the message.

In some aspects, the techniques described herein relate to a system to: assign a category to each criterion of the set of criteria, the category indicating whether the criterion is required or not; and determine the first subset of the set of criteria based on the one or more answers satisfying each criterion assigned into a required priority.

In some aspects, the techniques described herein relate to a system to: detect an update to the database; and for each entity of the plurality of entities determined not to satisfy the set of criteria, repeat the iteration of processing records in the database including the identifier of the entity to determine whether answers generated from the data of the records satisfy the set of criteria.

In some aspects, the techniques described herein relate to a system to: generate the natural language query for each record of the set of records responsive to determining structured data from records including the identifier of the entity that does not satisfy the set of criteria.

In some aspects, the techniques described herein relate to a system to: increment, responsive to determining that the one or more sets of answers satisfy the set of criteria, a counter; and determine the target number of entities that have been identified based on the incremented counter.

In some aspects, the techniques described herein relate to a method, including: storing, by one or more processors, a plurality of records in a database, the plurality of records containing data for a plurality of entities; receiving, by the one or more processors from a client device, a request including identifying a set of criteria; converting, by the one or more processors, the set of criteria into a set of questions to which answers resolve the set of criteria; iteratively, for each entity of the plurality of entities until completing iteration through the plurality of entities: generating, by the one or more processors, a natural language query for each of a set of records selected based on the record containing an identifier of the entity, the natural language query for each record containing the set of questions and the record; executing, by the one or more processors, a language model using the natural language queries generated from the set of records to generate one or more sets of answers to the set of questions; and responsive to determining the one or more sets of answers satisfy the set of criteria, identifying, by the one or more processors, the entity as satisfying said set of criteria; and transmitting, by the one or more processors, a message including an identification of each of one or more of the plurality of entities identified as having satisfied said criteria the client device.

In some aspects, the techniques described herein relate to a method, including: retrieving, by the one or more processors, one or more records from the database based on the one or more records including the identifier of the entity; and selecting, by the one or more processors, the set of records from the one or more records based on a relevancy of each record of the set to at least one criterion of the set of criteria.

In some aspects, the techniques described herein relate to a method, wherein selecting the set of records from the database includes: identifying, by the one or more processors, a timestamp of each of the one or more records containing the identifier of the entity; and selecting, by the one or more processors, the set of records based on each record of the set having a timestamp within a defined time period.

In some aspects, the techniques described herein relate to a method, including, for at least one of the plurality of entities: generating, by the one or more processors, a first natural language query including the set of questions and a first record of the set of records including the identifier of the entity; executing, by the one or more processors, the language model using a first natural language query to generate at least a first answer to the set of questions and using a second natural language query to generate at least a second answer to the set of questions; and determining, by the one or more processors, a combination of the first answer and the second answer satisfy the set of criteria.

In some aspects, the techniques described herein relate to a method, including only using a subset of the set of records to determine the set of criteria is satisfied and stopping iteration for the entity responsive to the determination that the set of criteria is satisfied.

In some aspects, the techniques described herein relate to a method, including: executing, by the one or more processors, an encoder-decoder model to normalize the one or more sets of answers; and determining, by the one or more processors, the normalized one or more sets of answers satisfy the set of criteria.

In some aspects, the techniques described herein relate to non-transitory machine-readable media storing program instructions that, when executed by one or more processors, causes the one or more processors to perform operations including storing a plurality of records in a database, the plurality of records containing data for a plurality of entities; receiving, from a client device, a request identifying a set of criteria; converting the set of criteria into a set of questions to which answers resolve the set of criteria; iteratively, for each entity of the plurality of entities until completing iteration through the plurality of entities: generating a natural language query for each of a set of records selected based on the record containing an identifier of the entity, the natural language query for each record containing the set of questions and the record; executing a language model using the natural language queries generated from the set of records to generate one or more sets of answers to the set of questions; responsive to determining the one or more sets of answers satisfy the set of criteria, identifying the entity satisfies the set of criteria; and transmitting a message including an identification of each of one or more of the plurality of entities identified as satisfying the set of criteria to the client device.

In some aspects, the techniques described herein relate to a non-transitory machine-readable media to perform operations including retrieving one or more records from the database based on the one or more records including the identifier of the entity; and selecting the set of records from the one or more records based on a relevancy of each record of the set to at least one criterion of the set of criteria.

In some aspects, the techniques described herein relate to a system for increasing record retrieval speed by segmenting outputs, the system including one or more processors and one or more non-transitory computer-readable media storing program instructions that, when executed by the one or more processors, cause the one or more processors to perform operations including: generating a set of outputs by providing first prompts and a first context to a first language model, wherein the first context includes a set of notes of a record indicated to be relevant to a set of natural language queries, and wherein the first prompts includes at least one natural language query of the set of natural language queries; segmenting the set of outputs into a plurality of segments based on a set of categories indicating data source types, wherein each respective segment of the plurality of segments is associated with a respective category of the set of categories; generating code by: for each respective segment of the plurality of segments: (i) determining a collection of classes by selecting classes from a library based on a respective category of the set of categories associated with the respective segment, and (ii) generating a respective block by providing the respective segment and the collection of classes to a second language model as an input for the second language model; and constructing the code by aggregating the respective blocks; and presenting an indicator that the record satisfies one or more criteria indicated by the natural language query by executing the code.

In some aspects, the techniques described herein relate to a system, wherein generating the set of outputs includes generating an intermediate representation with the first language model based on the first prompts and the first context, wherein generating the set of outputs includes providing the intermediate representation to the first language model as an additional input.

In some aspects, the techniques described herein relate to a system, wherein providing the intermediate representation to the first language model as the additional input includes: obtaining, from the first language model, a confidence score associated with the intermediate representation; and providing the intermediate representation to the first language model as the additional input based on the confidence score.

In some aspects, the techniques described herein relate to a system, wherein generating the set of outputs includes: obtaining, from the first language model, a first output and a confidence score associated with the first output; and determining that the confidence score satisfies a threshold; and updating the set of outputs to incorporate the first output based on a determination that the confidence score satisfies the threshold.

In some aspects, the techniques described herein relate to a system, wherein: the set of outputs is a set of normalized inputs; providing the first prompts and the first context to the first language model causes the first language model to output an initial output; and generating the set of normalized inputs includes providing the initial output to an encoder-decoder model to output at least one normalized input of the set of normalized inputs.

In some aspects, the techniques described herein relate to a system, wherein the first language model includes a decoder-only language model, and wherein the encoder-decoder model is a sequence-to-sequence model.

In some aspects, the techniques described herein relate to a system including: generating a set of outputs by providing a set of prompts and a set of contexts to a first language model, wherein the set of contexts includes a set of notes of a record, and wherein the set of prompts includes at least one natural language query; segmenting the set of outputs into a plurality of segments based on a set of categories, wherein each respective segment of the plurality of segments is associated with a respective category of the set of categories; determining a collection of classes by selecting classes from a library based on the set of categories; generating a set of blocks by using a second language model based on the plurality of segments and the collection of classes; constructing code by aggregating the set of blocks; and presenting an identifier for the record based on the code.

In some aspects, the techniques described herein relate to a system, wherein generating the set of outputs includes: assigning a set of scores to a minority of tokens of the set of contexts; and providing the set of scores to a decoder of the first language model.

In some aspects, the techniques described herein relate to a system, wherein the set of prompts include a plurality of natural language queries, wherein presenting the identifier for the record includes presenting the identifier in association with a first indication that the record satisfies a first subset of the plurality of natural language queries and a second indication that the record does not satisfy a second subset of the plurality of natural language queries.

In some aspects, the techniques described herein relate to a system, wherein presenting the identifier for the record includes presenting the identifier in association with an indication that the record requires additional review.

In some aspects, the techniques described herein relate to a system, wherein generating the set of blocks includes: selecting a set of example templates based on at least one prompt of the set of prompts; and providing, as an additional context, the set of example templates to the second language model.

In some aspects, the techniques described herein relate to a system, wherein generating the set of outputs includes:

obtaining a first output from the first language model by providing an initial prompt of the set of prompts to the first language model; storing the first output in a cache, wherein the first output is associated with the initial prompt; detecting a repeated input of the initial prompt to the first language model; and retrieving the first output from the cache based on the detecting of the repeated input.

In some aspects, the techniques described herein relate to one or more non-transitory machine-readable media storing program instructions that, when executed by one or more processors, causes the one or more processors to perform operations including: generating a set of outputs by providing a set of prompts and a set of contexts to a first language model, wherein the set of contexts includes a set of notes of a record, and wherein the set of prompts includes at least one natural language query; segmenting the set of outputs into a plurality of segments based on a set of categories, wherein each respective segment of the plurality of segments is associated with a respective category of the set of categories; determining a collection of classes by selecting classes from a library based on the set of categories; generating a set of blocks by using a second language model based on the plurality of segments and the collection of classes; constructing code by aggregating the set of blocks; and retrieving the record based on the code.

In some aspects, the techniques described herein relate to one or more non-transitory machine-readable media, wherein: generating the set of outputs includes: generating a first subset of outputs including responses for the set of prompts based on a first document associated with a first timestamp, wherein the first subset of outputs indicates a negative response to a first prompt; generating a second subset of outputs based on a second document associated with a second timestamp that is earlier than the first timestamp, wherein the second subset of outputs indicates an affirmative response to the first prompt; and generating the set of blocks includes generating the set of blocks based on the affirmative response to the first prompt.

In some aspects, the techniques described herein relate to one or more non-transitory machine-readable media, wherein generating the set of outputs includes: generating a first subset of outputs including responses for the set of prompts by based on a first document, wherein the first subset of outputs indicates a negative response to a first prompt of the set of prompts and an affirmative response to a second prompt of the set of prompts; generating a second subset of outputs including responses for the set of prompts based on a second document, wherein the second subset of outputs indicates an affirmative response to the first prompt; and generating the set of blocks includes generating the set of blocks based on the affirmative response to the first prompt and the affirmative response to the second prompt.

In some aspects, the techniques described herein relate to one or more non-transitory machine-readable media, wherein generating the set of outputs includes obtaining a confidence score associated with an intermediate representation, wherein generating the set of outputs includes providing the intermediate representation to the first language model as an additional input based on the confidence score.

In some aspects, the techniques described herein relate to one or more non-transitory machine-readable media, wherein generating the set of outputs includes: obtaining, from the first language model, a first output and a confidence score associated with the first output; and determining that the confidence score satisfies a set of criteria; and updating the set of outputs to incorporate the first output based on a determination that the confidence score satisfies the set of criteria.

In some aspects, the techniques described herein relate to one or more non-transitory machine-readable media, wherein: the set of outputs is a set of normalized inputs; providing the set of prompts and the set of contexts to the first language model causes the first language model to output an initial output; and generating the set of normalized inputs includes providing the initial output to an encoder-decoder model to output at least one normalized input of the set of normalized inputs.

In some aspects, the techniques described herein relate to one or more non-transitory machine-readable media, wherein generating the set of outputs includes: assigning a set of scores to a minority of tokens of the set of contexts; and providing the set of scores to a decoder of the first language model.

In some aspects, the techniques described herein relate to one or more non-transitory machine-readable media, wherein the set of prompts include a plurality of natural language queries, the operations further including presenting an identifier for the record in association with a first indication that the record satisfies a first subset of the plurality of natural language queries and a second indication that the record does not satisfy a second subset of the plurality of natural language queries.

In some aspects, the techniques described herein relate to a system for conserving token utilization in language models when constructing code for a health-related record, the system including one or more processors and one or more non-transitory computer-readable media storing program instructions that, when executed by the one or more processors, cause the one or more processors to perform operations including: determining a sequence of scores for a set of notes based on a set of queries stored in a record by, for each respective note for the set of notes: generating a vector based on first tokens of the respective note and second tokens of a respective query of the set of queries; generating weights indicating relations between the first tokens and the second tokens by providing the vector to a first model; and inferring the sequence of scores based on the weights; constructing a context including a sequence of notes sorted in reverse chronological order to conserve token usage based on a subset of the set of notes associated with a subset of the sequence of scores that satisfies a score threshold; generating code based on the context by (1) determining a first set of outputs based on the context and the set of queries and (2) generating the code based on the first set of outputs; and presenting an indicator that the record satisfies one or more criteria indicated by the set of queries by executing the code.

In some aspects, the techniques described herein relate to a system, further including: obtaining a duration parameter; and determining the set of notes by filtering a corpora based on the duration parameter.

In some aspects, the techniques described herein relate to a system, wherein constructing the context includes: obtaining a set of categories for data sources for the set of notes; obtaining a set of priorities for the set of notes, wherein the set of priorities indicates relative or absolute priority values associated with the set of categories; categorizing the set of notes based on the set of categories for the set of notes; and sorting an order of the set of notes based on the set of priorities, wherein determining the first set of outputs includes providing each respective note associated with a first category of the set of categories.

In some aspects, the techniques described herein relate to a system, wherein determining the first set of outputs includes: determining a candidate set of outputs by providing a first set of notes to a machine learning model without providing at least one additional note to the machine learning model; determining that a set of criteria is satisfied based on the candidate set of outputs; and using the candidate set of outputs as the first set of outputs.

In some aspects, the techniques described herein relate to a system, further including: obtaining a structured data set associated with the record; and determining a result indicating that data within the structured data set does not satisfy a set of criteria associated with the set of queries, wherein determining the sequence of scores includes determining the sequence of scores based on the result.

In some aspects, the techniques described herein relate to a system, further including generating a summary indicating a quantitative change over time or a categorical change over time based on the sequence of notes, wherein determining the first set of outputs includes providing, as an additional context, the summary.

In some aspects, the techniques described herein relate to a system including: generating a set of vectors based on first tokens of a set of notes associated with a record and second tokens of a set of queries; inferring a set of scores based on weights indicating relations between the first tokens and the second tokens by providing the set of vectors to a first model; constructing a context including a sequence of notes sorted in reverse chronological order based on a subset of notes associated with a subset of the set of scores that satisfies a score threshold; generating code based on the context by (1) determining a first set of outputs based on the context and the set of queries and (2) generating the code based on the first set of outputs; and presenting an indicator that the record satisfies one or more criteria indicated by the set of queries by executing the code.

In some aspects, the techniques described herein relate to a system, wherein: inferring the set of scores includes using a set general purpose processors to infer the set of scores; and determining the first set of outputs includes determining the first set of outputs using a set of massively parallel processors or a set of tensor processing units.

In some aspects, the techniques described herein relate to a method, wherein generating the code includes: normalizing the first set of outputs into a set of canonical outputs, wherein each respective canonical output of the set of canonical outputs matches with a respective canonical form template in a library of canonical form text; determining a result that the set of canonical outputs satisfy a set of pattern criteria using a rules-based engine, wherein generating the code includes providing the set of canonical outputs to a transformer-based model based on the result.

In some aspects, the techniques described herein relate to a method, wherein constructing the context includes segmenting the sequence of notes into text segments based on punctuation or spacing between text segments, wherein the context includes a set of delimiters separating the text segments.

In some aspects, the techniques described herein relate to a method, further including: accepting, at an exposed endpoint, an update to the record including a second note; determine a new score for the second note by providing text from the second note to the first model; and determining a result that the second note satisfies a set criteria, wherein constructing the context includes constructing the context to include the second note based on the result.

In some aspects, the techniques described herein relate to a method, wherein generating the code includes: normalizing the first set of outputs into a set of canonical outputs including a first subset of canonical outputs and a second subset of canonical outputs, wherein each respective canonical output of the set of canonical outputs matches with a respective canonical form template in a library of canonical form text; and determining a first result indicating that the first subset of canonical outputs satisfies a set of termination criteria, wherein generating the code includes generating the code using the first subset of canonical outputs and without using the second subset of canonical outputs.

In some aspects, the techniques described herein relate to one or more non-transitory machine-readable media storing program instructions that, when executed by one or more processors, causes the one or more processors to perform operations including: generating a set of vectors based on first tokens of a set of notes associated with a record and second tokens of a set of queries; inferring a set of scores based on weights indicating relations between the first tokens and the second tokens by providing the set of vectors to a first model; constructing a context including a sequence of notes sorted in reverse chronological order based on a subset of notes associated with a subset of the set of scores that satisfies a score threshold; generating code based on the context by (1) determining a first set of outputs based on the context and the set of queries and (2) generating the code based on the first set of outputs; and presenting an identifier for the record based on the code.

In some aspects, the techniques described herein relate to one or more non-transitory machine-readable media, wherein constructing the context includes: obtaining a set of categories for the set of notes; obtaining a set of priorities based on the set of queries, wherein the set of priorities indicates relative or absolute priority values associated with the set of categories; categorizing the set of notes based on the set of categories for the set of notes; and sorting an order of the set of notes based on the set of priorities, wherein determining the first set of outputs includes providing each respective note associated with a first category of the set of categories.

In some aspects, the techniques described herein relate to one or more non-transitory machine-readable media, wherein determining the first set of outputs includes: determining a candidate set of outputs by providing a first set of notes to a machine learning model without providing at least one additional note to the machine learning model; determining that a set of criteria is satisfied based on the candidate set of outputs; and using the candidate set of outputs as the first set of outputs.

In some aspects, the techniques described herein relate to one or more non-transitory machine-readable media, further including: obtaining a structured data set associated with the record; and determining a result indicating that data within the structured data set does not satisfy a set of criteria associated with the set of queries, wherein determining the set of scores includes determining the set of scores based on the result.

In some aspects, the techniques described herein relate to one or more non-transitory machine-readable media, further including generating a summary indicating a quantitative change over time or a categorical change over time based on the sequence of notes, wherein determining the first set of outputs includes providing, as an additional context, the summary.

In some aspects, the techniques described herein relate to one or more non-transitory machine-readable media, wherein constructing the context includes segmenting the sequence of notes into text segments based on punctuation or spacing between text segments, wherein the context includes a set of delimiters separating the text segments.

In some aspects, the techniques described herein relate to one or more non-transitory machine-readable media, further including: accepting, at an exposed endpoint, an update to the record including a second note; determine a new score for the second note by providing text from the second note to the first model; and determining a result that the second note satisfies a set criteria, wherein constructing the context includes constructing the context to include the second note based on the result.

In some aspects, the techniques described herein relate to one or more non-transitory machine-readable media, wherein generating the code includes: normalizing the first set of outputs into a set of canonical outputs including a first subset of canonical outputs and a second subset of canonical outputs, wherein each respective canonical output of the set of canonical outputs matches with a respective canonical form template in a library of canonical form text; and determining a first result indicating that the first subset of canonical outputs satisfies a set of termination criteria, wherein generating the code includes generating the code using the first subset of canonical outputs and without using the second subset of canonical outputs.

In some aspects, the techniques described herein relate to a system for generating time-sensitive criteria from natural language questions, the system including one or more processors and one or more non-transitory computer-readable media storing program instructions that, when executed by the one or more processors, cause the one or more processors to perform operations including: flagging a set of labels that is indicated by a first set of queries derived from a document indicating a set of criteria in natural language form, wherein the first set of queries is associated with structured data; obtaining (i) a second set of queries based on the document and (ii) a configuration parameter indicating a processing mode for a language model based the second set of queries; detecting an update to a record; retrieving first data corresponding with the set of labels and a set of speech-derived notes in the record in response to the detecting of the update; determining that the record satisfies the set of criteria by providing the first data and the set of notes to the language model, wherein the language model is configured by the configuration parameter; and updating a registry to indicate a user identified by the record in response to the record satisfying the set of criteria.

In some aspects, the techniques described herein relate to a system, wherein the language model is a first language model, further including generating the first set of queries by providing, to a second language model, a list of the set of labels and the document.

In some aspects, the techniques described herein relate to a system, wherein the language model is a first language model, and wherein obtaining the second set of queries includes providing, to a second language model, the document and the set of labels, wherein the second set of queries match with one or more portions of the document.

In some aspects, the techniques described herein relate to a system, wherein: the second set of queries includes a second query associated with unstructured data; the second query matches with a text sequence in the document; and the first set of queries includes a first query associated with structured data that is generated based on the text sequence.

In some aspects, the techniques described herein relate to a system, wherein determining that the record satisfies the set of criteria includes determining that the record satisfies every query of the first set of queries and the second set of queries.

In some aspects, the techniques described herein relate to a system, wherein: determining that the record satisfies the set of criteria includes determining that the record does not satisfy a first query of the first set of queries or the second set of queries; and updating the registry to indicate the user includes associating an identifier of the user with an indication of the first query.

In some aspects, the techniques described herein relate to a system, wherein the configuration parameter includes a computational graph parameter value or a sampling strategy hyperparameter value.

In some aspects, the techniques described herein relate to a method including: flagging a set of labels that is indicated by a first set of queries derived from a document indicating a set of criteria; obtaining (i) a second set of queries based on the document and (ii) a configuration parameter indicating a processing mode for a language model based the second set of queries; detecting an update to a record; retrieving first data corresponding with the set of labels and a set of notes from the record in response to the detecting of the update; determining that the record satisfies the set of criteria by providing the first data and the set of notes to the language model, wherein the language model is configured by the configuration parameter; and updating a registry to indicate a user identified by the record in response to the record satisfying the set of criteria.

In some aspects, the techniques described herein relate to a method, wherein: determining that the record satisfies the set of criteria includes: determining that the record does not satisfy a first query of the first set of queries or the second set of queries; determining that the first query is associated with a category value indicating borderline satisfaction based on a value of the record; and updating the registry includes associating an identifier of the user with an indication of the first query and an indication of the borderline satisfaction.

In some aspects, the techniques described herein relate to a method, wherein the value of the record indicates a duration or a time.

In some aspects, the techniques described herein relate to a method, further including: extracting a third set of queries based on the document, wherein the third set of queries is not part of the second set of queries; and presenting the third set of queries in association with the user.

In some aspects, the techniques described herein relate to a method, wherein: the second set of queries includes is associated with a set of data types indicating an expected set of answers; and determining that the record satisfies the set of criteria includes providing the set of data types to the language model.

In some aspects, the techniques described herein relate to a method, wherein updating the registry occurs within five minutes of the detecting of the update.

In some aspects, the techniques described herein relate to one or more non-transitory machine-readable media storing program instructions that, when executed by one or more processors, causes the one or more processors to perform operations including: flagging a set of labels that is indicated by a first set of queries derived from a document indicating a set of criteria; obtaining (i) a second set of queries based on the document and (ii) a configuration parameter indicating a processing mode for a language model based the second set of queries; detecting an update to a record; retrieving first data corresponding with the set of labels and a set of notes from the record in response to the detecting of the update; determining that the record satisfies the set of criteria by providing the first data and the set of notes to the language model, wherein the language model is configured by the configuration parameter; and updating a registry to indicate a user identified by the record in response to the record satisfying the set of criteria.

In some aspects, the techniques described herein relate to one or more non-transitory machine-readable media, wherein the language model is a first language model, and wherein obtaining the second set of queries includes providing, to a second language model, the document and the set of labels, wherein the second set of queries match with one or more portions of the document.

In some aspects, the techniques described herein relate to one or more non-transitory machine-readable media, wherein: the second set of queries includes a second query associated with unstructured data; the second query matches with a text sequence in the document; and the first set of queries includes a first query associated with structured data that is generated based on the text sequence.

In some aspects, the techniques described herein relate to one or more non-transitory machine-readable media, wherein determining that the record satisfies the set of criteria includes determining that the record satisfies every query of the first set of queries and the second set of queries.

In some aspects, the techniques described herein relate to one or more non-transitory machine-readable media, wherein: determining that the record satisfies the set of criteria includes determining that the record does not satisfy a first query of the first set of queries or the second set of queries; and updating the registry to indicate the user includes associating an identifier of the user with an indication of the first query.

In some aspects, the techniques described herein relate to one or more non-transitory machine-readable media, wherein: determining that the record satisfies the set of criteria includes: determining that the record does not satisfy a first query of the first set of queries or the second set of queries; determining that the first query is associated with a category value indicating borderline satisfaction based on a value of the record; and updating the registry includes associating an identifier of the user with an indication of the first query and an indication of the borderline satisfaction.

In some aspects, the techniques described herein relate to one or more non-transitory machine-readable media, further including: extracting a third set is:

In some aspects, the techniques described herein relate to a system for generating time-sensitive criteria from natural language questions, the system including one or more processors and one or more non-transitory computer-readable media storing program instructions that, when executed by the one or more processors, cause the one or more processors to perform operations including: flagging a set of labels that is indicated by a first set of queries derived from a document indicating a set of criteria in natural language form, wherein the first set of queries is associated with structured data; obtaining (i) a second set of queries based on the document and (ii) a configuration parameter indicating a processing mode for a language model based the second set of queries; detecting an update to a record; retrieving first data corresponding with the set of labels and a set of speech-derived notes in the record in response to the detecting of the update; determining that the record satisfies the set of criteria by providing the first data and the set of notes to the language model, wherein the language model is configured by the configuration parameter; and updating a registry to indicate a user identified by the record in response to the record satisfying the set of criteria.

In some aspects, the techniques described herein relate to a system, wherein the language model is a first language model, further including generating the first set of queries by providing, to a second language model, a list of the set of labels and the document.

In some aspects, the techniques described herein relate to a system, wherein the language model is a first language model, and wherein obtaining the second set of queries includes providing, to a second language model, the document and the set of labels, wherein the second set of queries match with one or more portions of the document.

In some aspects, the techniques described herein relate to a system, wherein: the second set of queries includes a second query associated with unstructured data; the second query matches with a text sequence in the document; and the first set of queries includes a first query associated with structured data that is generated based on the text sequence.

In some aspects, the techniques described herein relate to a system, wherein determining that the record satisfies the set of criteria includes determining that the record satisfies every query of the first set of queries and the second set of queries.

In some aspects, the techniques described herein relate to a system, wherein: determining that the record satisfies the set of criteria includes determining that the record does not satisfy a first query of the first set of queries or the second set of queries; and updating the registry to indicate the user includes associating an identifier of the user with an indication of the first query.

In some aspects, the techniques described herein relate to a system, wherein the configuration parameter includes a computational graph parameter value or a sampling strategy hyperparameter value.

In some aspects, the techniques described herein relate to a method including: flagging a set of labels that is indicated by a first set of queries derived from a document indicating a set of criteria; obtaining (i) a second set of queries based on the document and (ii) a configuration parameter indicating a processing mode for a language model based the second set of queries; detecting an update to a record; retrieving first data corresponding with the set of labels and a set of notes from the record in response to the detecting of the update; determining that the record satisfies the set of criteria by providing the first data and the set of notes to the language model, wherein the language model is configured by the configuration parameter; and updating a registry to indicate a user identified by the record in response to the record satisfying the set of criteria.

In some aspects, the techniques described herein relate to a method, wherein: determining that the record satisfies the set of criteria includes: determining that the record does not satisfy a first query of the first set of queries or the second set of queries; determining that the first query is associated with a category value indicating borderline satisfaction based on a value of the record; and updating the registry includes associating an identifier of the user with an indication of the first query and an indication of the borderline satisfaction.

In some aspects, the techniques described herein relate to a method, wherein the value of the record indicates a duration or a time.

In some aspects, the techniques described herein relate to a method, further including: extracting a third set of queries based on the document, wherein the third set of queries is not part of the second set of queries; and presenting the third set of queries in association with the user.

In some aspects, the techniques described herein relate to a method, wherein: the second set of queries includes is associated with a set of data types indicating an expected set of answers; and determining that the record satisfies the set of criteria includes providing the set of data types to the language model.

In some aspects, the techniques described herein relate to a method, wherein updating the registry occurs within five minutes of the detecting of the update.

In some aspects, the techniques described herein relate to one or more non-transitory machine-readable media storing program instructions that, when executed by one or more processors, causes the one or more processors to perform operations including: flagging a set of labels that is indicated by a first set of queries derived from a document indicating a set of criteria; obtaining (i) a second set of queries based on the document and (ii) a configuration parameter indicating a processing mode for a language model based the second set of queries; detecting an update to a record; retrieving first data corresponding with the set of labels and a set of notes from the record in response to the detecting of the update; determining that the record satisfies the set of criteria by providing the first data and the set of notes to the language model, wherein the language model is configured by the configuration parameter; and updating a registry to indicate a user identified by the record in response to the record satisfying the set of criteria.

In some aspects, the techniques described herein relate to one or more non-transitory machine-readable media, wherein the language model is a first language model, and wherein obtaining the second set of queries includes providing, to a second language model, the document and the set of labels, wherein the second set of queries match with one or more portions of the document.

In some aspects, the techniques described herein relate to one or more non-transitory machine-readable media, wherein: the second set of queries includes a second query associated with unstructured data; the second query matches with a text sequence in the document; and the first set of queries includes a first query associated with structured data that is generated based on the text sequence.

In some aspects, the techniques described herein relate to one or more non-transitory machine-readable media, wherein determining that the record satisfies the set of criteria includes determining that the record satisfies every query of the first set of queries and the second set of queries.

In some aspects, the techniques described herein relate to one or more non-transitory machine-readable media, wherein: determining that the record satisfies the set of criteria includes determining that the record does not satisfy a first query of the first set of queries or the second set of queries; and updating the registry to indicate the user includes associating an identifier of the user with an indication of the first query.

In some aspects, the techniques described herein relate to one or more non-transitory machine-readable media, wherein: determining that the record satisfies the set of criteria includes: determining that the record does not satisfy a first query of the first set of queries or the second set of queries; determining that the first query is associated with a category value indicating borderline satisfaction based on a value of the record; and updating the registry includes associating an identifier of the user with an indication of the first query and an indication of the borderline satisfaction.

In some aspects, the techniques described herein relate to one or more non-transitory machine-readable media, further including: extracting a third set of queries based on the document, wherein the third set of queries is not part of the second set of queries; and presenting the third set of queries in association with the user.

In some aspects, the techniques described herein relate to one or more machine-readable media storing instructions that, when executed by a set of processors, cause the set of processors to effectuate operations including those of any of the methods above.

In some aspects, the techniques described herein relate to a system comprising: a set of processors and a set of media storing computer program instructions that, when executed by the set of processors, cause the set of processors to effectuate operations including those of any of the methods above.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1D illustrates an example flowchart of a process for selecting entities based on the fast retrieval and processing of structured and unstructured data, in accordance with an implementation.

FIG. 1F illustrates an example machine learning framework that techniques described herein may benefit from.

FIG. 2B illustrates an example flowchart of a process for conserving token use with a language model, in accordance with an implementation.

FIG. 4F illustrates a fourth example user interface, in accordance with an implementation.

DETAILED DESCRIPTION

Figure 1A:
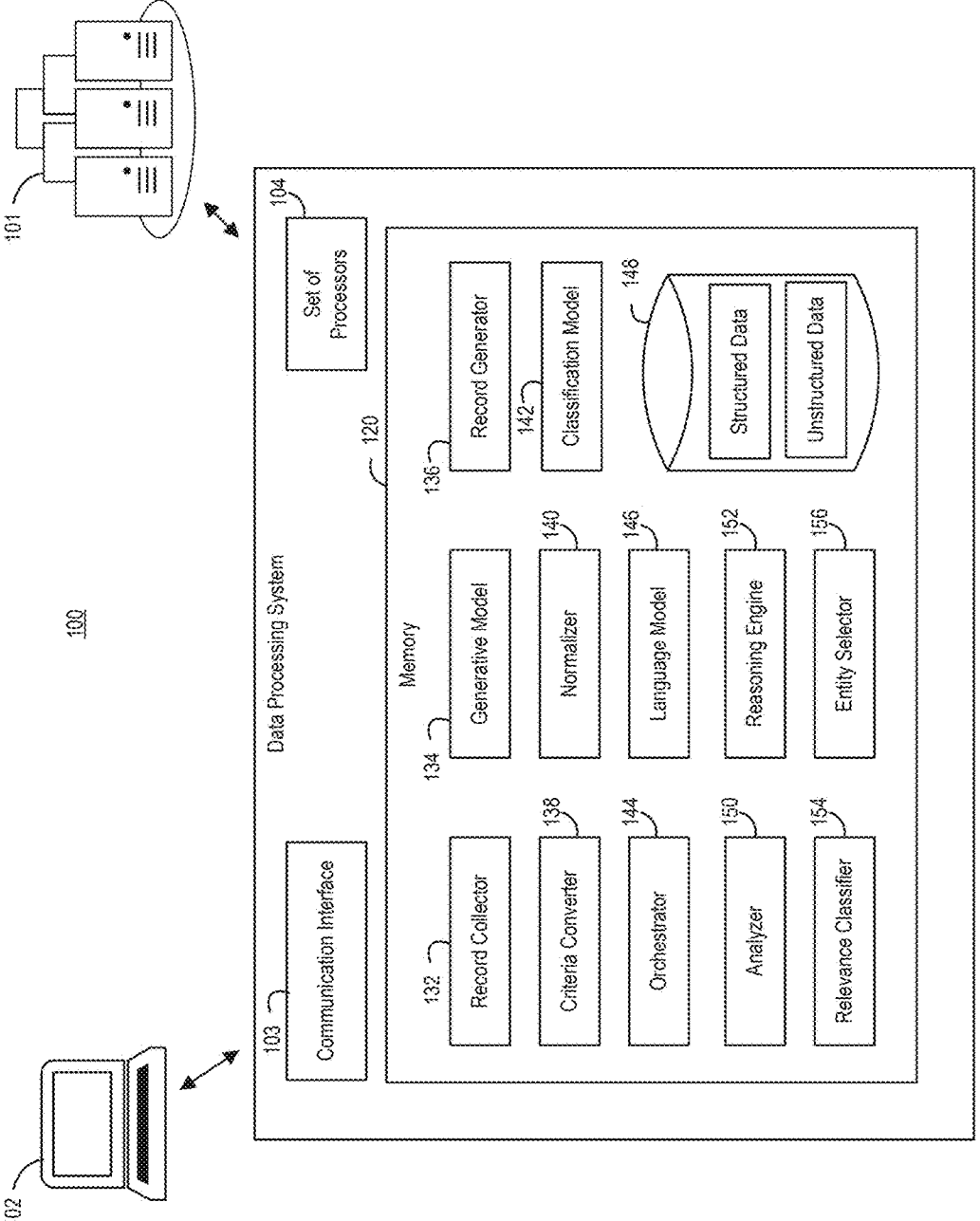
FIG. 1A is an illustration of an example system for selecting entities using a large language model, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Determining whether criteria written in a natural language document are satisfied by one or more patient records in a database is challenging due to the complexity of the criteria and how relevant characteristics that may satisfy such criteria are often represented within unstructured data within such patient records and the limitations of rules-based systems in interpreting such criteria and whether they are satisfied. Natural language criteria often involve qualitative terms and contextual understanding that are difficult to translate into rigid computational queries. Additionally, the heterogeneous nature of patient data, which can include structured tables, semi-structured documents, and unstructured text, further complicates the process. Systems may not be able to identify or abstract the relevant and necessary information from EMRs (e.g., large sources of unstructured data). Systems struggle with these complexities, making it necessary to develop more sophisticated methods to accurately interpret and apply the criteria.

Some embodiments may use Large Language Models (LLMs) to determine if criteria written in a natural language document are satisfied by structured or unstructured text in a record. Some embodiments may generate a natural language query (e.g., a natural language input or a prompt configured for input into a large language model) that includes record data (e.g., clinical notes in text form) and a set of criteria (e.g., questions written in natural language form) to a language model. The language model may then generate a result indicating whether the set of criteria is satisfied, which may indicate that an entity is acceptable for an outcome associated with satisfying the set of criteria (e.g., adding a patient entity to a registry for reporting, for conducting retrospective observational or implementation studies, or for identifying and pre-screening of patients who may be eligible for a clinical trial). Use of the LLM may include operations to handle LLM costs, to make decisions based on data distributed across multiple records, and to operate within a clinical patient record setting.

In many cases, operations to determine whether a set of criteria is satisfied may be hampered by the set of criteria themselves. The complexity of such criteria may span across multiple times, address different domains, and require both objective and subjective data. Furthermore, the inclusion of both structured and unstructured information with contradictory, duplicative or even missing or incomplete data may be problematic with respect to determining whether the set of criteria is satisfied.

Some embodiments may address these issues and other issues discussed in this disclosure by comparing values across multiple records for a set of criteria. Some embodiments may generate a first natural language query and execute a language model using the first natural language query to generate a first answer to one or more questions embedded in the first natural language query. After determining that the first answer does not satisfy the criterion, some embodiments may then generate a second natural language query and execute the language model using the second natural language query to generate a second answer to the one or more questions. Some embodiments may determine that a combination of the first answer and the second answer satisfy the set of criteria. For example, a computer system may retrieve a first clinical note and criterion about blood sugar, construct a question that includes the first clinical note and the criterion, and generate an answer for the question using a language model. After determining that the answer indicates that the patient does not satisfy the criterion based on the first question, the computer system may perform similar operations using the same criterion and a second clinical note for the patient to obtain, via the language model, a second answer for the question. The computer system may then track a change between the first and second answers and, based on the magnitude or direction of the change, determine that the patient satisfies the criteria, which for example, may result in inclusion of the patient in a registry, observational study, or clinical trial.

By comparing values across multiple records for one or more criteria, some embodiments may account for criteria that explicitly or implicitly stretch across a large time block. Furthermore, by examining values from various records, some embodiments can capture trends and patterns that may not be evident from a single record. Additionally, some embodiments may perform iterative processes to input records or discrete record data to increase the likelihood that token attention values will not miss details related to one or more criteria. For example, some embodiments may sequentially provide a single clinical note from a plurality of clinical notes to an LLM instead of providing all of the notes at once in a single input to the LLM. Such operations may be helpful when the LLM exhibits diminishing attention to content positioned in the middle sections of extensive inputs, which may result in reduced accuracy and potential fabrication of information. Such operations may also reduce the amount of compute necessary to process the medical notes in response to queries. Processing records sequentially on an individual basis may increase attention allocation across all data points, thereby enhancing the reliability of the output. This approach is particularly useful in contexts where criteria are influenced by long-term changes or events that occur intermittently. For instance, in medical records, patient health indicators might be noted in unstructured data over time, and only by comparing multiple observations embedded in clinical notes can a meaningful picture of a patient's condition be formed.

In many cases, handling multiple records with Large Language Models (LLMs) may be challenging due to token constraints and processing expenses. Each query created from a record and written criteria may include several tokens, where the computing costs of using an LLM may scale linearly or more with the number of tokens used. In many cases, bulk processing of all available records may become infeasible or undesirable for large-scale applications.

Some embodiments may address these issues and other issues discussed in this disclosure by using a time-based approach to prioritizing LLM utilization to reduce unnecessary token consumption. Some embodiments may store multiple records in a database, receive a request with criteria to identify whether an entity satisfies certain criteria (for example, for a protocol), and identify the records based on an entity identifier. For example, some embodiments may store multiple patient records in a database and then a request from a client device that includes criteria for identifying eligible patients for a clinical trial, where each record contains data such as the patient's name, date of birth, medical history, and clinical notes, all timestamped to indicate when the record was generated. Some embodiments may then select one or more records based on a shared patient identifier (e.g., a patient's name, a patient's identification number, some combination thereof).

Some embodiments may use a time-based approach to prioritize LLM use based on timestamps associated with record data. For example, each clinical note in a set of records may include or otherwise be associated with a different timestamp, indicating a time during which the clinical note was created. Before iteratively providing the clinical notes to an LLM as inputs, some embodiments may sort the notes based on their timestamps in reverse order, such that the most recent note is processed first, then the second-most recent note, then the third most recent note, etc. Furthermore, some embodiments end note processing operations once a sufficient number of criteria is satisfied or upon processing each note within a defined time period, preventing the LLM from having to unnecessarily process the tokens of additional notes.

By using a time-based approach to prioritize LLM use and conserve token consumption, some embodiments may permit the efficient processing of a large batch of unstructured data. Such operations may conserve orders of magnitude of computing resources with respect to processor resources and memory resources by isolating which portions of unstructured data to analyze. Such operations increase the speed and versatility of LLM operations for efficiently processing a large number of records and identifying one or more entities that satisfy a set of criteria for downstream operations. Moreover, by prioritizing the most records, systems performing operations described in this disclosure may provide accurate responses despite the reduced number of tokens being processed.

Significant hurdles related to data complexity and time limitations impede the efficient and accurate review of data within EMRs, such as for easy identification of suitable candidates for clinical trials. In many cases, identifying patients for clinical trials requires a complex analysis of structured and unstructured data over timespans that may range from days to years, while conversely permitting only a relatively brief period of time for patient retrieval and EMR review. This complexity may cause many clinical trials to fail or shut down prematurely due to an inability to find appropriate patients or the enrollment of patients who should not have been part of a trial. Moreover, the records storing patient data may include both structured and unstructured information stored across multiple records and multiple periods, making it difficult to determine if complex criteria having time-related elements are satisfied. Furthermore, in the case of voluminous records, processing all available records in bulk with an LLM may often become impractical and computationally costly.

Some embodiments may address these issues and other issues discussed in this disclosure by using a language model to determine whether candidate patients or other entities satisfy certain criteria, such as for inclusion in a registry or participation in observational or clinical trials.

Some embodiments may receive a document identifying a set of criteria and convert the set of criteria into a set of questions to which answers resolve the set of criteria. Some embodiments may then iteratively identify a target number of entities for the registry by generating natural language queries for each of a set of records associated with a respective entity. Some embodiments may execute a language model using the natural language queries to generate one or more sets of answers to the set of questions and determine whether the applicable criteria are satisfied, such as for identifying entities for addition to a registry or for inclusion in observational or clinical studies.

Some embodiments may further address issues discussed in this disclosure by applying a time-based approach or comparing values across multiple records. For example, when iteratively identifying entities, some embodiments address these issues and reduce LLM-related problems by applying a time-based approach to prioritizing LLM use. Furthermore, some embodiments may determine criteria satisfaction by comparing values across multiple records for a set of criteria, where such criteria may be difficult or impossible to answer based on data stored in a single record.

By using a language model to determine whether patients or other entities satisfy certain criteria, some embodiments may provide the fast and accurate identification of patients for a clinical trial, for an observational study, for an implementation study, or for registry reporting. By leveraging a language model, some embodiments can quickly and accurately detect multiple entities that meet the criteria for a clinical trial or other study. This approach ensures that the selection process is fast and capable of considering a wide range of data that would not be quantifiable using conventional methods within an acceptable time frame.

Part A: System Description

FIG. 1A is an illustration of an example system 100 for selecting entities using a large language model, in accordance with an implementation. In brief overview, the example system 100 can include a set of servers 101 and an electronic device 102. The set of servers 101 can be configured to store various types of data and perform various types of operations discussed in this disclosure. The electronic device 102 can transmit data to the set of servers 101 and the electronic device 102 can execute a large language processing model to receive contextual information regarding database transactions or other communications from a user of the electronic device 102. The electronic device 102 can transmit the contextual information to the set of servers 101 for storage.

The electronic device 102 may include one or more processors that are configured to provide a chat interface. The electronic device 102 may include a communication interface 103, a set of processors 104, and a set of memory 120. The electronic device 102 may communicate with the set of servers 101 via the communication interface 103, which may be or include an antenna or other network device that enables communication across a network and/or with other devices. The set of memory 120 may include a record collector 132, a generative model 134, a record generator 136, a criteria converter 138, a normalizer 140, a classification model 142, an orchestrator 144, a language model 146, a database 148, an analyzer 150, a reasoning engine 152, a relevance classifier 154, and an entity selector 156.

The set of processors 104 may be or include an application-specific integrated circuit (ASIC), a set of graphics processing units (GPUs), a set of field programmable gate arrays (FPGAs), a set of digital signal processors (DSPs), circuits containing one or more processing components, circuitry for supporting a microprocessor, a group of processing components, or other suitable electronic processing components. In some embodiments, the set of processors 104 may execute computer code or modules (e.g., executable code, object code, source code, script code, machine code, etc.) stored in the set of memory 120 to facilitate the operations described herein. The set of memory 120 may be or include any volatile or non-volatile computer-readable storage medium capable of storing data or computer code.

The set of servers 101 or the electronic device 102 can include or utilize at least one processing unit or other logic devices such as a programmable logic array engine or a module configured to communicate with one another or other resources or databases to perform one or more of the operations described in this disclosure. As described herein, computers can be described as computers, computer devices, computing devices, or client devices. The set of servers 101 may each contain their own computer resources (e.g., processor, memory, etc.), share computer resources, or be part of a distributed computer system. The components of the set of servers 101 or the electronic device 102 can be separate components or a single component. The example system 100 and its components can include hardware elements, such as one or more processors, logic devices, or circuits. The set of servers 101 can be a server or computer that is configured to store various types of data, such as data stream data, image data, audio data, other types of content data, etc. For example, the set of servers 101 can store records for different accounts in memory (e.g., in a database in memory), where such media may include non-transitory machine-readable media used to store program instructions for performing one or more operations described in this disclosure.

The record collector 132 is a component that may aggregate and retrieve data from multiple database sources, such as by using dedicated connectors or adapters for each database type (e.g., a database type of the database 148). The record collector 132 may perform such operations by implementing various retrieval methods such as polling, change data capture (CDC), or event-driven mechanisms to fetch real-time data updates. For handling real-time data collection, the record collector 132 may employ message queues like Apache Kafka or RabbitMQ to buffer incoming data streams and prevent data loss during high-volume periods.

The record collector 132 may also perform data collection, maintain connection pools, handle authentication, and manage error recovery for each connected database while also implementing strategies for data consistency and synchronization. The record collector 132 can handle real-time data retrieval by using database features like PostgreSQL's logical replication, MySQL's binlog streaming, or MongoDB's change streams to capture data modifications as they occur. In some embodiments, the record collector 132 may perform techniques such as batch processing, connection pooling, and data compression to increase the likelihood of efficient data collection while minimizing system resource usage and network overhead.

The generative model 134 is a component that may generate queries or other text used by one or more operations described in this disclosure. The generative model 134 may implement such operations by using either or both rule-based templates or machine learning models to create contextually relevant database queries. The system typically includes a knowledge base of predefined query patterns and syntax rules, combined with a transformer-based language model trained on a large corpus of SQL queries and natural language pairs. In some embodiments, the generative model

134 may generate standard CRUD operations using templated rules and more complex analytical queries through learned patterns.

In some embodiments, the generative model 134 may implement text generation operations by using techniques such as few-shot learning where the model is given examples of similar queries as context. For example, a rule-based component of the generative model 134 might handle query structure and basic syntax, while the machine learning model focuses on understanding intent and generating appropriate "WHERE" clauses, "JOIN" conditions, and aggregations. The generative model 134 may incorporate feedback mechanisms to learn from successful queries and improve its generation capabilities over time.

The record generator 136 is a component that may create various types of records based on existing records (e.g., by copying records or modifying them to generate new records) or based on incoming data. For example, a record generator 136 may generate electronic medical records by incorporating medical coding standards, clinical pathways, and typical patient journey patterns. The record generator 136 may generate data including classifications following ICD-10 codes, SNOMED-CT terminology, and standardized treatment protocols based on patient visits, healthcare provider entries, etc. The record generator 136 may generate records for storage in the set of memory 120, where each record may include structured data, unstructured data, or both types of data.

The criteria converter 138 is a component that may translate data from one protocol format (e.g., embedded within a natural language document) to another (e.g., a list of extracted criteria, a model-generated set of questions, etc.). The criteria converter 138 may identify specific protocols in a part of a text document to determine data formats and communication methods. The criteria converter 138 may perform such operations by using conversion logic to map data from a source protocol to a target protocol. This logic may include an application or service capable of handling data formats and communication standards.

The normalizer 140 is a component that may standardize the outputs from a language model (e.g., an output of the language model 146) into a consistent, canonical form. The normalizer 140 may process the data produced by the language model 146 such that different formats, characters, words, or phrases that relate to semantically identical terms or very similar terms are mapped to the same term or symbol in the processed output. For example, the normalizer 140 may convert instances of the phrases "lvl 4," "Lv. 4," "level four," "Lv. 4" to the phrase "level 4."

The normalizer 140 may perform such operations by including and using a sequence-to-sequence model, such as an encoder-decoder model. The normalizer 140 may obtain the varied and potentially inconsistent answers generated by the language model 146 and transform them into a standardized format. By reducing outputs to a standardized format, the normalizer 140 may maintain the integrity and accuracy of the data as it moves through the system. For example, after the language model 146 generates answers to criterion-related questions based on clinical notes, these answers may vary in format and structure. The normalizer 140 may convert these answers into a consistent format, such as normalizing dates, numbers, or other data types to a standard representation. For example, if the language model 146 extracts a date from a clinical note, the normalizer 140 may process this output to ensure that this date is formatted uniformly, regardless of how it was originally presented in the note. This normalized data may later be used by the reasoning engine 152 to make determinations about whether criteria are satisfied, such as patient eligibility for clinical trials, for observational studies, for additions to registries, etc.

The orchestrator 144 is a component that may coordinate and manage the interactions between various components within a system. The orchestrator 144 may act as a central hub to coordinate other components of an orchestrated system, such as a Kubernetes cluster. The orchestrator 144 may retrieve data, delegate tasks to other services, validate requests and responses, handle errors, and persist results. For example, the orchestrator 144 may control or retrieve data from various components, such as retrieving patient data from an Application Programming Interface (API) of the record collector 132, collecting criterion specifications from the criteria converter 138 or the reasoning engine 152. The orchestrator 144 may delegate tasks to the relevance classifier 154, the language model 146, normalizer 140, or the reasoning engine 152. To determine, for a set of records associated with an entity, whether one or more criteria is satisfied. Furthermore, the orchestrator 144 may validate service requests and responses to handle both expected and unexpected errors. Furthermore, the orchestrator 144 may persist derived determinations to the database 148 via an API. The orchestrator 144 may orchestrate batch workloads, streaming workloads, provide a command line interface for batch processing, and an HTTP API for real-time operations.

In some cases, the orchestrator 144 can manage and update a registry within a system, such as a registry of patients for a clinical trial. In some embodiments, the orchestrator 144 may perform such operations by periodically checking for updates or changes in patient information, provide indications of such updates to other components described in this disclosure (e.g., the language model 146, etc.) and applying these updates to the registry. The orchestrator 144 operates as a background process, continuously monitoring the system for any modifications that need to be reflected in the registry. For example, after new patient data is added to the database 148 via the record generator 136 or the record collector 132, the orchestrator 144 may detect this change. The orchestrator 144 may then trigger operations of the language model 146 or other components described in this disclosure to determine whether one or more additional patients should be added to a registry. In some cases, a registry may be maintained by a remote computing device or client device. In such cases, the orchestrator 144 can transmit alerts or messages to the computing device or client device identifying entities that are identified as applying to the registry. The computing device or client device can receive the alerts or messages and update the registry by adding identifiers or names of the entities to the registry.

The language model 146 is a component that may include a large language model (LLM) that is trained to use clinical data and used to produce answers for criterion-related questions. The language model 146 may include a deep neural network architecture based on a transformer design pattern that includes multiple attention layers, dense feed-forward networks, and millions or billions of trainable parameters organized in encoder or decoder blocks. The language model 146 may include a decoder-only model capable of generating text based on the input it receives. The language model 146 may operate by receiving textual data, such as clinical notes, and questions as part of an input for the language model 146. In response to receiving the input, the language model 146 may generate answers or other outputs to these questions. For example, the language model 146 might be asked to determine whether a patient meets certain clinical trial criteria based on the unstructured data stored in the patient's records stored in the database 148. These answers may then be normalized by the normalizer 140 for downstream operations, such as for operations to determine a decision regarding patient eligibility using the reasoning engine 152.

The database 148 may serve as a repository for various types of data. Database 148 may be implemented as a SQL database noSQL database that incorporates both structured data and unstructured data. For example, the database 148 may store patient EMRs that include structured medical-related data and unstructured medical-related data. The EMRs stored in database 148 may include values such as vital signs, lab results, and medication orders in relational tables. As another example, the unstructured medical-related data may include clinical notes, diagnostic imaging reports, and scanned documents in document stores or binary large objects (BLOBs). The database 148 may be deployed as an on-premises system, implemented as a hybrid system with sensitive data retained locally, while less critical data moves to cloud providers, or fully hosted in cloud environments. The database 148 may process queries through specialized indexing mechanisms for both structured and unstructured content, employs full-text search capabilities for clinical notes, supports real-time data access through Representational State Transfer (RESTful) APIs or health-specific interfaces, and can output data in various formats including JavaScript Object Notation (JSON), Extensible Markup Language (XML), or Health Level Seven (HL7) messages. Furthermore, the database 148 may obtain records from one or more sources, such as obtaining records collected by the record collector 132 or generated by the record generator 136.

The analyzer 150 may include or use other modules or other types of components described in this disclosure to analyze portions of data. For example, the analyzer 150 may include the language model 146 and use the language model 146 to determine one or more values associated with a record or an entity mapped to the record. For example, after first receiving a set of criteria based on the criteria converter 138, the analyzer 150 may first use a rules-based system to determine whether the structured data stored in the database 148 for a patient satisfies one or more criteria of the set of criteria. If the set of criteria is sufficiently satisfied by the structured data of the database 148, the analyzer 150 may skip utilizing the language model 146 and instead directly provide data to the analyzer 150.

The relevance classifier 154 is a component that may compute relevance scores to quantify a relevance of text that may be used for context and a criterion (e.g., a structured query or a natural language question). For example, the relevance classifier 154 may perform such operations by determining relevance scores for pairs of trial criteria and clinical notes, to determine what clinical note to retrieve. By identifying relevant information from vast amounts of unstructured data, some embodiments may prioritize what data to use to populate a prompt context.

The classification model 142 is a component that may label and retrieve structured data from records. The classification model 142 can be a machine learning model, such as a neural network, a transformer, a large language model, a support vector machine, etc. The classification model 142 can be trained or configured to identify specific types or classes of data from structured data in clinical notes or records. For instance, the classification model 142 can classify and label values or fields in clinical notes or records with tags identifying the types of values or data to be stored in the fields. For example, the classification model 142 can classify and label fields or values as blood pressure, temperature, age, gender, etc. The classification model 142 can perform such classification by processing the context around the values or fields, such as by identifying one or more other labels in the same row or column as the values or fields. The classification model 142 can do so by applying learned or trained weights or parameters to such context when processing records or clinical notes as a whole or defined portions of the clinical nodes or records containing the values or fields, in some cases. The classification model 142 can label such values or fields and subsequently retrieve the values or data in the fields based on the labels. For instance, the classification model 142 can retrieve the values or data responsive to determining types of data that are relevant to determining whether a set of criteria is satisfied. The classification model 142 can compare the types of data to the labels of the values or fields to identify potentially relevant values or data for the set of criteria. The classification model 142 can retrieve the identified potentially relevant values or data. The orchestrator 144 can use the retrieved values or data to determine whether a set of criteria is satisfied, in some cases.

In some embodiments, the relevance classifier 154 may compute relevance scores by including or otherwise using an encoder-only model. In some embodiments, the relevance classifier 154 may employ dense retrieval methods using encoder models for vector embeddings, sparse retrieval approaches like TF-IDF for term-based matching, cross-attention mechanisms for semantic understanding, or hybrid systems that combine multiple techniques with domain-specific optimizations. The relevance classifier 154 may obtain clinical notes and trial criteria as input and apply a classification model to compute relevance scores. These scores indicate the degree of relevance of each note to the specified criterion. The process involves selecting clinical notes that are relevant to a given trial criterion by computing these relevance scores. The values provided by the relevance classifier 154 may help in filtering out irrelevant information and focusing on the most pertinent data and notes within an EMR.

The entity selector 156 is a component that may identify patients who satisfy certain criteria, such as those who are eligible for a clinical trial or other scenarios based on the outcomes of the reasoning engine 152 and other components within the system. In the context of patient selection, the entity selector 156 plays may select suitable candidates from a large pool of patient data. The entity selector 156 may perform such operations by using the results from the reasoning engine 152 and various other components described in this disclosure, such as the relevance classifier 154 or the language model 146. For example, the relevance classifier 154, which computes relevance scores for pairs of trial criteria and clinical notes to identify pertinent information. The language model 146 may then generate answers to criterion-related questions based on these relevant clinical notes. The normalizer 140 may subsequently standardize these answers to ensure consistency. Finally, the reasoning engine may use both structured and unstructured data to make determinations about whether a patient meets the specific criteria for a clinical trial. The entity selector 156 aggregates these determinations and selects patients who meet the eligibility criteria for the trial.

Figure 1B:
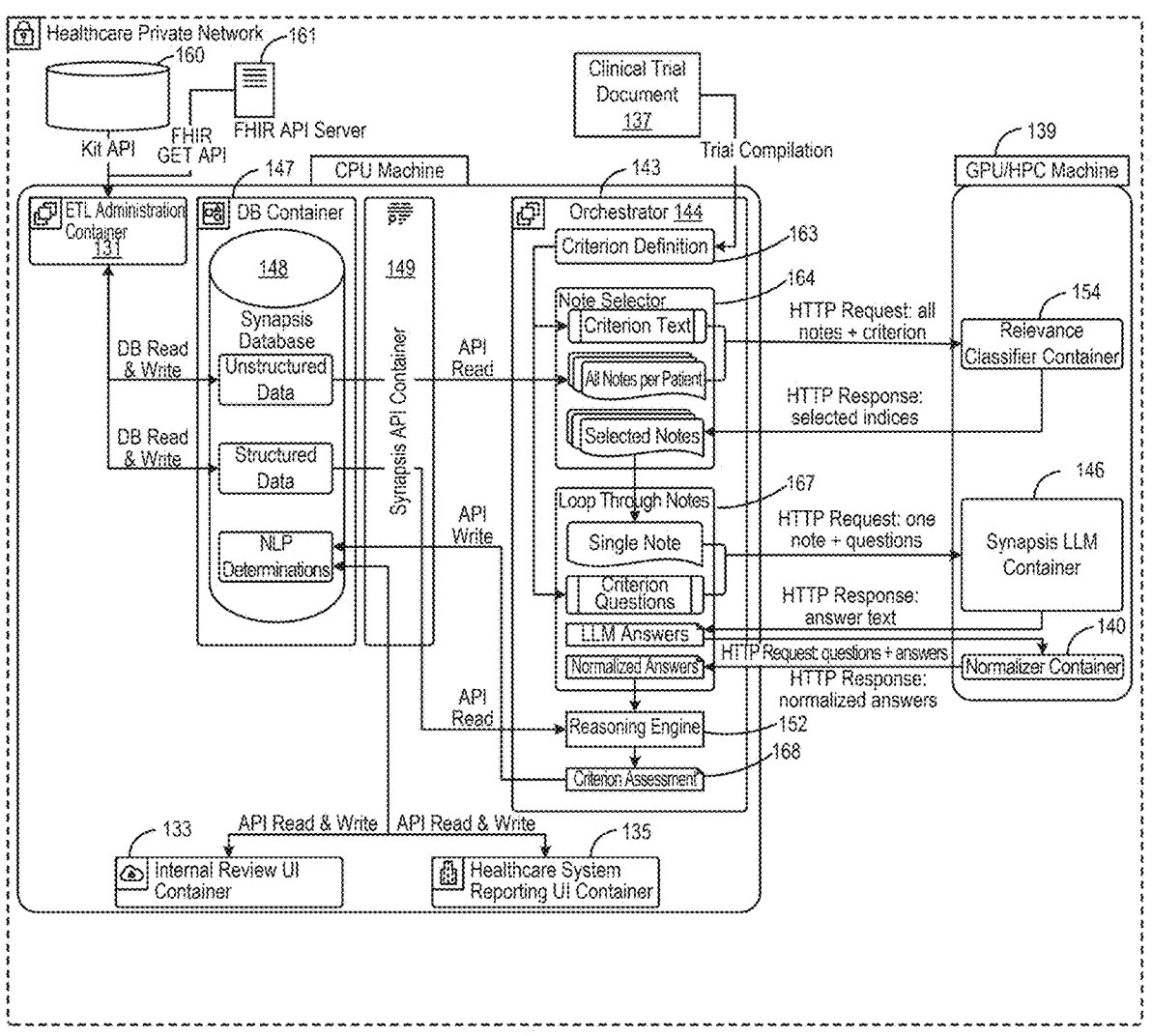
FIG. 1B is an illustration of an example deployment architecture for selecting entities using a large language model, in accordance with an implementation.

FIG. 1B is an illustration of an example deployment architecture 105 for selecting entities using a large language model, in accordance with an implementation. In this example deployment architecture 105, an external database 160 may communicate with an ETL administration container 131 via a first external API provided by an external API server 161. The ETL administration container 131 is in communication to a database container 147 used to host a database 148. The database container 147 may be in direct communication with an API container 149 that is used to provide communication with an orchestrator container 143 used to host an orchestrator 144. The orchestrator 144 may retrieve data from a clinical trial document 137 to construct the set of criteria 163 and interact with a relevance classifier 154, a language model 146, and a normalizer 140 to execute operations for a note selector component 164, an answer generator 167, and a reasoning engine 152 to construct a final criterion assessment 168. The output of the orchestrator 144 may then be stored in the database 148 and further used to provide data to containers hosting applications that perform downstream operations, such as a reviewing user interface container 133 and a reporting user interface container 135.

The external database 160 may serve as a centralized data warehouse containing comprehensive patient profiles and demographic information. Some embodiments may use this first external API to extract data from the external database 160 to obtain structured and unstructured data. Simultaneously, the external API server 161 may send data to the ETL administration container 131 via a second external API, where the external API server 161 may provide patient notes via the second external API.

The ETL administration container 131 may perform read and write operations for a database 148 implemented in the database container 147, where the database 148 includes both structured and unstructured data. The ETL administration container 131 may pull necessary data from the external database 160 and the external API server 161, process and transform this pulled data into a format suitable for storage in the database 148. The ETL administration container 131 may use various techniques, such as in-memory processing (e.g., by storing frequently accessed data in a cache) and batch processing, where such operations may increase the efficiency of operations to handle large volumes of data. Some embodiments may use a writing command (e.g., a database writing query) to store the processed data in the database 148. The database 148 may communicate with the orchestrator container 143 used to host the orchestrator 144 via an API container 149. The API container 149 may perform read operations that send data from the database 148 to the orchestrator 144 and write operations that update records or generate new records in the database 148.

The orchestrator 144 includes data and components, such as the set of criteria 163, the note selector component 164, the answer generator 167, and the reasoning engine 152. Moreover, the orchestrator 144 may communicate with other components to perform operations described in this disclosure. For example, the orchestrator 144 may receive unstructured text embedding criteria in the form of a clinical trial document 137. The orchestrator 144 may perform one or more operations to generate a set of criteria 163, such as by providing the clinical trial document 137 to a criteria converter 138. The orchestrator 144 may execute the note selector component 164 to determine which portions of a set of records (e.g., a subset of records, specific fields of the subset of records, etc.) to provide to the answer generator 167.

The orchestrator 144 may, using the note selector component 164, send a message (e.g., an HTTP request) to the relevance classifier 154, where the message may include structured data, unstructured data, and a set of criteria extracted from the clinical trial document 137. The relevance classifier 154 may then send a response message (e.g., an HTTP response) to the note selector component 164 that includes a set of indices used to assign relevance scores to different records or portions of records to one or more criteria.

The orchestrator 144 may send record data associated with relevance scores satisfying one or more relevance thresholds to the answer generator 167. The answer generator 167 may convert any criterion in the set of criteria extracted from the clinical trial document 137 into a natural language question or other question if the criterion was not itself already a question. The answer generator 167 may then send, for each relevant note, a message to the language model 146. The language model 146 may then perform operations described in this disclosure to send a response message to the answer generator 167 that indicates one or more answers to the set of questions. The answer generator 167 may then provide these output answers and their corresponding questions to the normalizer 140 and retrieve, as a response from the normalizer 140, a set of normalized answers.

In some embodiments, the high-performance computing system 139 may be used by the relevance classifier 154, language model 146, normalizer 140. For example, an encoder-only network of the relevance classifier 154 or decoder-only network of the language model 146 may use a set of GPUs of the high-performance computing system 139. The high-performance computing system 139 may also be used for other computing operations described in this disclosure. For example, some embodiments may use the high-performance computing system 139 to perform criterion detection operations to extract the criteria from the clinical trial document 137 or question generation operations to generate specific questions compatible with the language model 146 based on the extracted criteria.

After obtaining normalized answers from the answer generator 167, the orchestrator 144 may provide the normalized answers to the reasoning engine 152. The reasoning engine 152 may perform a final evaluation based on the normalized answers from the normalizer 140 and results based on structured results from the database 148 to determine entity eligibility for one or more downstream operations, such as patient eligibility for a trial. The reasoning engine 152 may output its result in the final criterion assessment 168, which is then sent to a determination data store of the database 148.

Figure 1C:
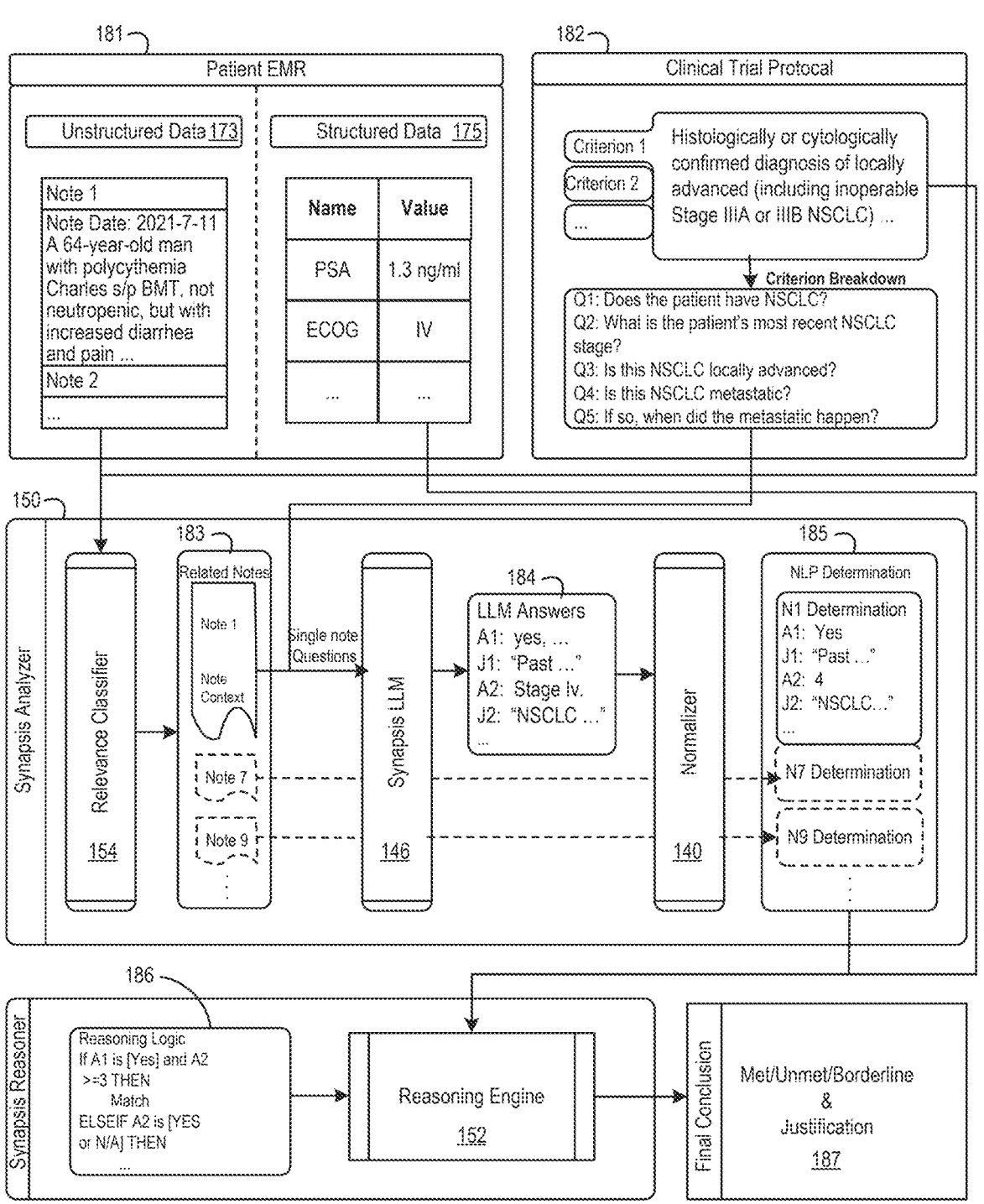
FIG. 1C is an illustration of an example data architecture for selecting entities using a large language model, in accordance with an implementation.

FIG. 1C is an illustration of an example data architecture 106 for selecting entities using a large language model, in accordance with an implementation. The example data architecture 106 depicts a record 181 and a protocol 182 being used as inputs for the analyzer 150, and includes or uses the relevance classifier 154, the language model 146, and the normalizer 140 to construct a filtered set of unstructured records 183, a set of responses 184, and normalized answers 185. In conjunction with reasoning logic 186, the normalized answers 185 and the protocol 182 may both be provided as inputs to the reasoning engine 152. The reasoning engine 152 may then output an output 187 for an entity, where the output 187 indicates a downstream result related to a patient identified by the record 181.

The record 181 may be a record or a collection of records related to a patient and may include an unstructured data portion 173 and a structured data portion 175. Some embodiments may provide the unstructured data portion 173 and the protocol 182 as inputs to the relevance classifier 154. The relevance classifier 154 may then select record data from the unstructured data portion 173 based on the criteria indicated in the protocol 182 to generate the filtered set of unstructured records 183. For example, the relevance classifier 154 may select records based on matches between a semantic vector indicated by criteria of the protocol 182 and semantic vectors generated from the unstructured data portion 173. In some embodiments, the filtered set of unstructured records 183 may be a sorted list of records or record portion that is sorted in chronological order. For example, the filtered set of unstructured records 183 may include a chronological list of record portions sorted by timestamps indicating a time of creation.

Some embodiments may provide the filtered set of unstructured records 183 to the language model 146, where the language model 146 may then output the set of responses 184 in response to receiving the filtered set of unstructured records 183. Some embodiments may then provide the set of responses 184 to the normalizer 140, where the normalizer 140 outputs the normalized answers 185 in response to receiving the set of responses 184 as an input. Some embodiments may then provide the normalized answers 185 in conjunction with the unstructured data portion 173 and the reasoning logic 186 to the reasoning engine 152 to output an output 187, where the output 187 may indicate whether the patient indicated by the record 181 has satisfied certain criteria, which, for example, may indicate whether the patient should be added to a registry, not added to a registry, or assigned for further review. Furthermore, the output 187 may indicate one or more portions of the record 181 to indicate the justifications for the decision indicated by the output 187.

FIG. 1D illustrates an example flowchart of a process 190 for selecting entities based on the fast retrieval and processing of structured and unstructured data, in accordance with an implementation. The process 190 includes a block 191 indicating operations to retrieve records. The block 191 is followed by a block 192 indicating operations to receive a request. The block 192 is followed by a block 193 indicating operations to generate a natural language query. The block 193 is followed by a block 194 indicating operations to execute the language model to determine a set of answers using the set of natural language queries. The block 194 is followed by a block 195 indicating operations to communicate a message identifying entities selected based on the set of answers.

As indicated by block 191, some embodiments may retrieve a set of records associated with a set of entities from a set of external databases, set of external caches, or set of external APIs. Some embodiments may then store a plurality of records in a database containing the set of data for an entity. For example, a computer system may retrieve a set of patient records associated with a set of EMRs for multiple patients from a hospital's database, a pharmacy's cache, and an insurance company's API. The computer system may then store a plurality of these records in a centralized database that contains structured and unstructured data for each patient, including medical history, medical notes, and prescriptions.

As indicated by block 192, some embodiments may receive a request including a set of criteria to identify an entity for protocol. Some embodiments may then translate the set of criteria into a set of questions compatible with a natural language model. For example, a computer system may receive a request that includes a set of criteria indicating required medical conditions, and specific health conditions to identify suitable patients for a clinical trial. The computer system may then translate these criteria into a set of questions compatible with a natural language model. For example, the computer system may translate a set of criteria into questions such as "is the patient between 18 and 65 years old?," "Does the patient have a history of diabetes?," and "Has the patient experienced any cardiovascular events in the past year?"

As indicated by block 193, some embodiments may generate a set of natural language queries that includes record data retrieved from a database using an identifier of an entity and one or more questions determined to resolve a set of criteria. For example, a computer system may generate a natural language query that includes a context portion that includes clinical notes stored in a record indicating a patient's identifier. The natural language query may also include a prompt portion that includes a set of questions determined to resolve a set of criteria, such as "does the patient show signs of diabetes?"

As indicated by block 194, some embodiments may execute the language model using the set of natural language queries to generate a set of answers to one or more questions. Some embodiments may then normalize the answers and provide the answers to a reasoning model to determine a selected set of entities for a downstream application. For example, a computer system may generate queries that include patient clinical notes as contexts and questions like "does the patient have a history of diabetes?" as prompts. Some embodiments may then execute a language model based on these queries to generate a set of answers. Some embodiments may then normalize these answers, such as by standardizing the format of dates, medical terms, and other data elements. After performing a normalization operation, some embodiments may provide these answers to a reasoning model to evaluate the answers and determine a selected set of patients who meet the criteria for a clinical trial or observational study.

As indicated by block 195, some embodiments may communicate, to a client device, a message identifying the selected set of entities for the downstream application. Some embodiments may update an entity registry to include the patients who meet the applicable criteria, while other embodiments may indicate whether the patients meet the criteria for inclusion in a clinical trial or observational study. For example, after determining which sets of patient records satisfy a set of criteria, the computer system may send an HTTP response to a researcher's computer. The computer may then display a list of the selected patients and their relevant details. Additionally, some embodiments may update an entity registry to include the selected set of patients, while other embodiments may indicate whether the patients meet the criteria for inclusion in a clinical trial or observational study.

Figure 1E:
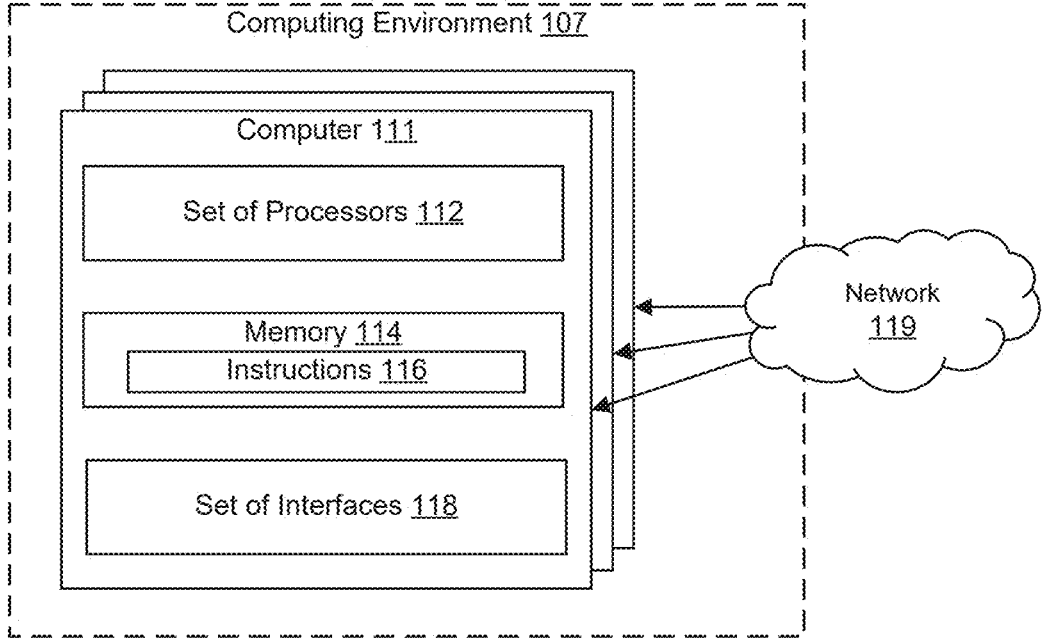
FIG. 1E discloses a computing environment in which aspects of the present disclosure may be implemented.

FIG. 1E discloses a computing environment 107 in which aspects of the present disclosure may be implemented. A computing environment 107 includes a set of computers 111, where the set of computers 111 may include one or more virtual or physical computers that individually or in cooperation achieve tasks, such as implementing one or more aspects described herein. For example, some embodiments may use the set of computers 111 to store entity records, construct a language model input from questions and record data, provide the language model input to a language model, etc. The set of computers 111 may include components that cooperate to cause output based on input. The set of computers 111 includes desktops, servers, mobile devices (e.g., smart phones and laptops), payment terminals, wearables, virtual/augmented/expanded reality devices, spatial computing devices, virtualized devices, other computers, or combinations thereof. In particular example implementations, the computing environment 107 includes at least one physical computer.

The computing environment 107 may specifically be used to implement one or more aspects described herein. In some examples, one or more computers of the set of computers 111 may be implemented as a user device, such as a mobile device, and others of the set of computers 111 may be used to implement aspects of a machine learning framework usable to train and deploy models exposed to the mobile device or provide other functionality, such as through exposed application programming interfaces.

The computing environment 107 can be arranged in any of a variety of ways. In some embodiments, one or more computers of the set of computers 111 can be local to or remote from other computers of the set of computers 111 of the computing environment 107. In some embodiments, the set of computers 111 may be arranged according to client-server models, peer-to-peer models, edge computing models, other models, or combinations thereof.

In many examples, the set of computers 111 is communicatively coupled with devices internal or external to the computing environment 107 via a network 119. The network 119 is a set of devices that facilitate communication from a sender to a destination, such as by implementing communication protocols. Example network 119 include local area networks, wide area networks, intranets, or the Internet.

In some implementations, the set of computers 111 may include general-purpose computing devices (e.g., consumer computing devices). In some instances, via hardware or software configuration, the set of computers 111 may include special purpose computing devices, such as servers able to practically handle large amounts of client traffic, machine learning devices able to practically train machine learning models, data stores able to practically store and respond to requests for large amounts of data, other special purpose computers, or combinations thereof. The relative differences in capabilities of different kinds of computing devices can result in certain devices specializing in certain tasks. For instance, a machine learning model may be trained on a powerful computing device and then stored on a relatively lower powered device for use.

In some embodiments, one or more computers of the set of computers 111 include a set of processors 112, memory 114, and set of interfaces 118. Such components can be virtual, physical, or combinations thereof.

The set of processors 112 are components that execute instructions, such as instructions that obtain data, process the data, and provide output based on the processing. The set of processors 112 often obtain instructions and data stored in the memory 114. The set of processors 112 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the set of processors 112 include at least one physical processor implemented as an electrical circuit. Examples of set of processors 112 may include INTEL, NVIDIA, AMD, QUALCOMM, TEXAS INSTRUMENTS, and APPLE processors.

The memory 114 is a collection of components configured to store instructions 116 and data for later retrieval and use. The instructions 116 can, when executed by the set of processors 112, cause the execution of one or more operations that implement aspects described herein. In many examples, the memory 114 may be one or more non-transitory, machine-readable media, such as random-access memory, read-only memory, cache memory, registers, portable memory (e.g., enclosed drives or optical disks), mass storage devices, hard drives, solid state drives, other kinds of memory, or combinations thereof. In certain circumstances, memory may be transitory and may store information encoded in transient signals.

The set of interfaces 118 are components that facilitate receiving input from and providing output to something external to the set of computers 111, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors, such as those using the Global Positioning System), other input components, or combinations thereof (e.g., a touch sensitive display). The set of interfaces 118 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as WI-FI, cellular, BLUETOOTH, ZIGBEE, or other protocols). One or more of the set of interfaces 118 can facilitate connection of the computing environment 107 to a network 119.

The set of computers 111 can include any of a variety of other components to facilitate the performance of operations described herein. Example components include one or more power units (e.g., batteries, capacitors, power harvesters, or power supplies) that provide operational power, one or more buses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions), among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 1F:
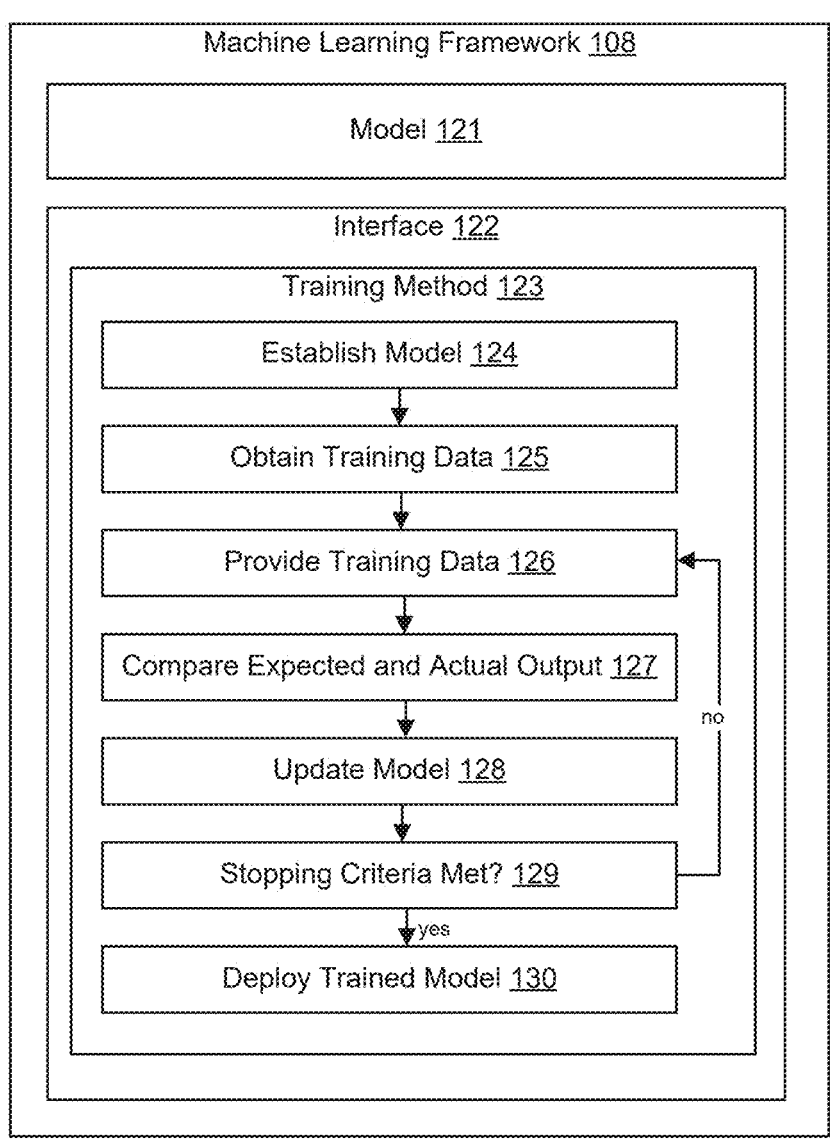

FIG. 1F illustrates a machine learning framework 108 that techniques described herein may benefit from. The machine learning framework 108 is a collection of software and data that implements artificial intelligence trained to provide output, such as predictive data, based on input. Examples of artificial intelligence that can be implemented with machine learning techniques include neural networks (e.g., graph neural networks), language models (including so-called "large language models"), generative models, natural language processing models, adversarial networks, decision trees, Markov models, support vector machines, genetic algorithms, others, or combinations thereof. A person of skill in the art, having the benefit of this disclosure, will understand that these artificial intelligence implementations need not be equivalent to each other and may instead select from among them based on the context in which they will be used. A machine learning framework 108 or components thereof are often built or refined from existing frameworks, such as TENSORFLOW by GOOGLE, INC. or PYTORCH by the PYTORCH community.

The machine learning framework 108 can include one or more versions of the model 121 that are the structured representation of learning and an interface 122 that supports use of the model 121. The model 121 can take any of a variety of forms. In many examples, the model 121 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 121 can include a representation of memory (e.g., providing long short-term memory functionality). Where the set includes multiple versions of the model 121, the multiple versions of the model 121 can be linked, cooperate, or compete to provide output.

The interface 122 can include software procedures (e.g., defined in a library) that facilitate the use of the model 121, such as by providing a way to establish and interact with the model 121. For instance, the software procedures can include software for receiving input, preparing input for use (e.g., by performing vector embedding, such as using Word2Vec, BERT, or another technique), processing the input with the model 121, providing output, training the model 121, performing inference with the model 121, fine-tuning the model 121, other procedures, or combinations thereof.

In an example implementation, interface 122 can be used to facilitate a training method 123 that can include operation 124. Operation 124 includes establishing a model 121, such as initializing a model 121. Establishing the model 121 may include setting up the model 121 for further use (e.g., by training or fine tuning). The model 121 can be initialized with values. In examples, the model 121 can be pretrained. Operation 125 can follow operation 124. Operation 125 includes obtaining training data. In many examples, the training data includes pairs of input and desired output given the input. In supervised or semi-supervised training, the data can be prelabeled, such as by human or automated labelers. In unsupervised learning, the training data can be unlabeled. The training data can include validation data used to validate the model 121 after the model 121 is trained. Operation 126 can follow Operation 125. Operation 126 includes providing a portion of the training data to the model 121. This can include providing the training data in a format usable by the model 121. The machine learning framework 108 (e.g., via the interface 122) can cause the model 121 to produce an output based on the input. Operation 127 can follow operation 126. Operation 127 includes comparing the expected output with the actual output. In an example, this can include applying a loss function to determine the difference between expected and actual. This value can be used to determine how training is progressing. Operation 128 can follow operation 127. Operation 128 includes updating the model 121 based on the result of the comparison. This can take any of a variety of forms depending on the nature of the model 121. Where the model 121 includes weights, the weights can be modified to increase the likelihood that the model 121 will produce the correct output given an input. Depending on the model 121, backpropagation or other techniques can be used to update the model 121. Operation 129 can follow operation 128. Operation 129 includes determining whether a stopping criterion has been reached, such as based on the output of the loss function (e.g., actual value or change in value over time). In addition to, or instead, whether the stopping criterion has been reached can be determined based on a number of training epochs that have occurred or an amount of training data that has been used. In some examples, satisfaction of the stopping criterion can include if the stopping criterion has not been satisfied, the flow of the method can return to Operation 125. If the stopping criterion has been satisfied, the flow can move to operation 130. Operation 130 includes deploying the model 121 for use in production, such as providing the model 121 with real-world input data and producing output data used in a real-world process. The model 121 can be stored in memory 114 of the set of computers 111 or distributed across memories of two or more computers of the set of computers 111 for production of output data (e.g., predictive data).

Part B: Systems and Methods for Conserving Token Use with a Language Model

Figure 2A:
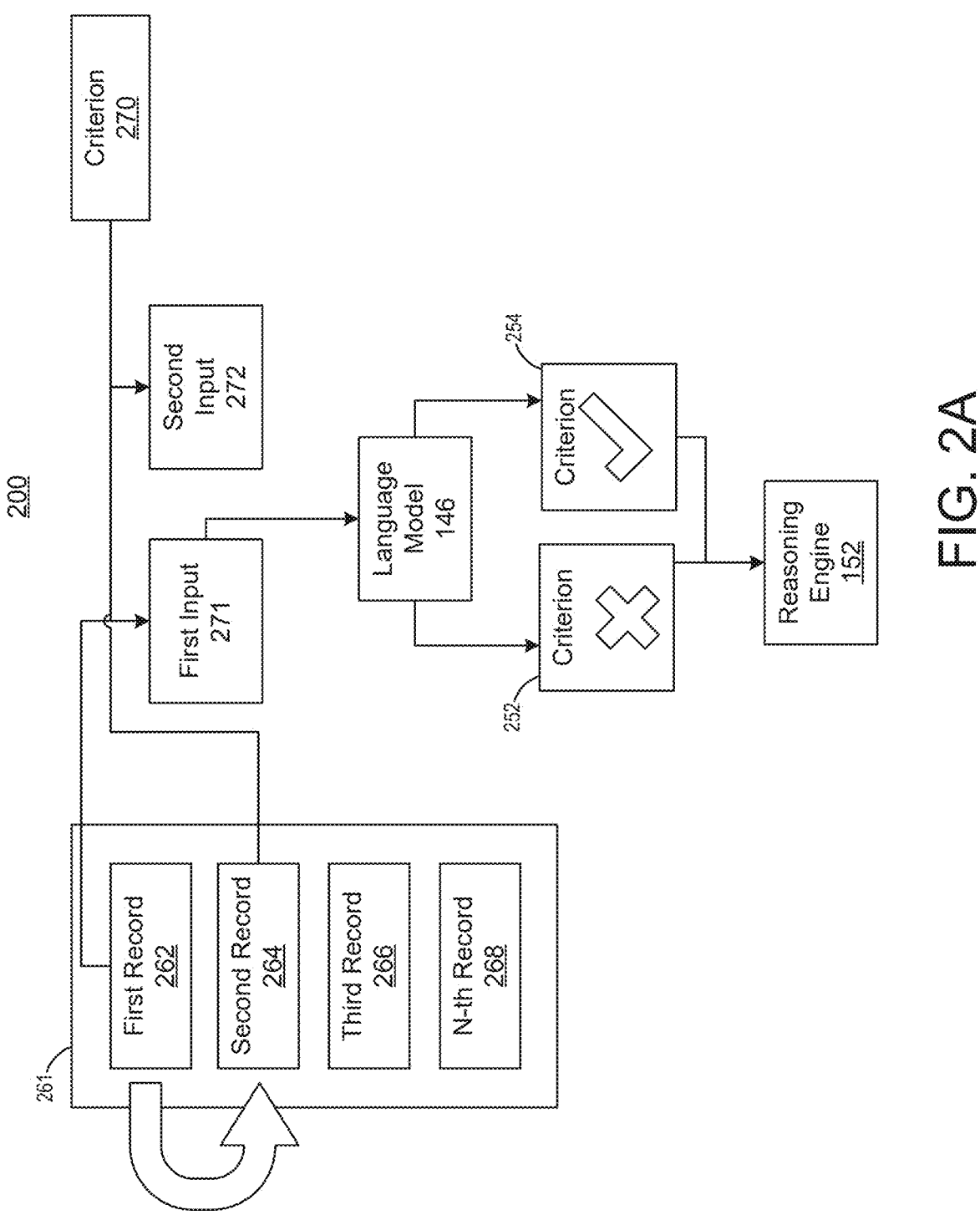
FIG. 2A illustrates an example system for conserving token use with a language model, in accordance with an implementation.

FIG. 2A illustrates an example system 200 for conserving token use in a language model, in accordance with an implementation. As shown in the example system 200, a criterion 270 may be used in conjunction with a first record 262 of a set of records 261 to construct a first input 271, and the criterion 270 may be used in conjunction with a second record 264 of the set of records 261 to construct a second input 272. The set of records 261 also includes a third record 266 and an N-th record 268, and may be sorted with respect to time, such that the timestamp associated with second record 264 is the closest time to the first record 262. Some embodiments may provide the first input 271 and the second input 272 to the language model 146 and may produce the first result 252 and the second result 254, respectively. Some embodiments may then provide the set of results to the reasoning engine 152.

The criterion 270 may be a text that is directly extracted from a natural text document. The criterion 270 may act as a starting point used to determine the eligibility of an entity for one or more downstream operations and may be used when generating the first input 271. The first input 271 may be a first natural language query (e.g., a natural language input, a prompt, etc.) that is provided to the language model 146 to determine whether the criterion 270 is satisfied by record data associated with an entity. Some embodiments may generate the first input 271 based on the criterion 270 by directly using the criterion 270 as a question to include in a prompt of the first input 271. In some implementations, some convert the criterion 270 into a set of questions that is associated with but not identical with the criterion 270 and then use the set of questions as part of the prompt for the first input 271.

Some embodiments may then submit the first input 271 as an input to the language model 146, which may then output the first result 252 in response to receiving the first input 271. After determining that the first result 252 indicates that the criterion 270 is not satisfied, some embodiments may construct the second input 272 based on the criterion 270 and the second record 264. The second record 264 may be a second database record and may be indexed in the set of records 261 by a second timestamp that is earlier than a first timestamp used to index the first record 262 in the set of records 261, where the second timestamp may correspond to a closest time to the first timestamp. Some embodiments may then provide the second input 272 to the language model 146 to produce the second result 254. After determining that the second result 254 satisfies the criterion 270, some embodiments may forgo performing similar input construction operations and language model execution operations for other records of the first result 252, such as the third record 266 and the N-th record 268. By forgoing input construction operations and language model execution operations, some embodiments may reduce the total token consumption used to determine whether the criterion 270 is satisfied by records of the first result 252. Some embodiments may then provide the first result 252 and the second result 254 to the reasoning engine 152 to determine whether a patient meets criteria, for example, for eligibility in a clinical trial, inclusion in an observational study or implementation study, or a registry.

FIG. 2B illustrates an example flowchart of a process 201 for conserving token use with a language model, in accordance with an implementation. The process 201 includes a block 204 indicating operations to store records in a database. The block 204 is followed by a block 208 indicating operations to receive a request including a set of criteria. The block 208 is followed by a block 212 indicating operations to identify records. The block 212 is followed by a block 216 indicating operations to generate a first natural language query. The block 216 is followed by a block 220 indicating operations to execute a language model to determine a first result. The block 220 is followed by a block 222 indicating operations to determine whether the first result satisfies a set of criteria. The block 222 is followed by a block 224 and a block 240, where the block 224 indicates operations to generate an additional natural language query. The block 224 is followed by a block 228 indicating operations to execute the language model based on the additional natural language query to determine an additional result. The block 228 is followed by a block 232 indicating operations to determine whether the additional result satisfies the set of criteria. The block 232 is followed by one of a block 236 or the block 240, where the block 236 indicates operations to determine whether there is additional record data available for processing. The block 240 indicates operations to communicate a message to a client device.

Some embodiments may store a plurality of records in a database, each record containing a set of data for an entity and corresponding to a timestamp indicating a time of generation of the record, as indicated by block 204. A record can be a data structure, a file, a table, an electronic document, etc. An entity may include a person, a group of people, an organization, etc. In some embodiments, the record may be generated and stored as a part of a doctor's visit, where the entity indicated by the record is a patient. For example, a healthcare provider may create and maintain electronic patient records in their medical database system. When a patient checks in during a doctor's visit and fills out a form with information and is then checked by the doctor, staff or healthcare providers may initiate or update a new record entry by inputting entity-related information. Such entity-related information may include the patient's name, date of birth, insurance details, contact information, clinical observations, vital signs, diagnoses, and prescribed treatments to this record, where some or all of the data may be time-stamped by the system to maintain an accurate chronological history. The database may store some or all of this information in structured tables, with separate fields for different types of data-personal information in one section, medical history in another, and current visit details in yet another, all linked together by a unique patient identifier and organized chronologically through the timestamp field. Furthermore, one or more users (e.g., healthcare providers) may add unstructured data, such as clinical notes documenting their observations, conversations with the patient or other types of patient interactions, and medical decision-making as free-text entries. Some embodiments may store such unstructured data in association with the patient identifier.

Some embodiments may receive, from a client device, a request including a set of criteria, as indicated by block 208. In some embodiments, a computer system may receive a request with a set of criteria associated with a search for patients, such as for a clinical trial or to identify patients for a particular treatment or inclusion in an observational or implementation study or inclusion in a registry. Receiving this request may trigger a search and filtering mechanism that evaluates a database's patient population records against the provided parameters indicated by the set of criteria or generated based on the set of criteria.

Some embodiments may receive a request by receiving a set of criteria as web-based form submissions with structured data fields, API endpoints accepting JSON or XML payloads, direct database query interfaces, programmatic software integrations that transmit predefined search parameters, email submissions, enterprise-level data exchange protocols that support complex filtering criteria, etc. Some embodiments may receive a set of criteria embedded in natural language text. For example, some embodiments may receive a set of criteria that is embedded in natural language documents such as research proposals, legal contracts, or descriptive memos. Some embodiments may validate the received data to ensure data integrity, authenticate request sources, or perform other data processing operations to prepare the received data for downstream processes.

Some embodiments may use an LLM or other types of language models involving the use of natural language algorithms to parse unstructured textual descriptions and extract information to assess whether certain criteria have been satisfied. The LLM may identify key phrases, determine numerical ranges, and determine semantic patterns that may be used to translate a narrative description into query parameters. For example, a computer system may implement tokenization and part-of-speech tagging to identify relevant linguistic components, with particular attention to numerical expressions, comparative operators, and domain-specific terminology. The computer system may then apply named entity recognition to detect and classify domain-relevant entities. Furthermore, the computer system may apply dependency parsing to establish relationships between identified elements. Additionally, the computer system may apply regular expressions and pattern matching to capture standardized formats like numerical ranges, units of measurement, and conditional statements. The computer system may apply semantic analysis and related word embeddings and contextual representations to detect relationships and synonymous expressions. The computer system may then normalize the extracted information and transform this normalized information into a structured format suitable for generating query parameters. For example, by performing such operations or similar operations, some embodiments may convert the phrase "we ideally would want the patient to have been asleep for at least 10 hours the previous day" to a search question "did patient sleep >10 hours in previous 24 hours?" By using a language model to parse textual descriptions and extract criteria, some embodiments may retrieve more criteria than by using a simple rules-based service.

Some embodiments may identify a set of records from a database based on each record of the set of records containing an identifier of an entity, as indicated by block 212. In some embodiments, the records being identified may include various types of records. The set of records may include patient records, lab result records, site visit records, etc., and may be associated with an entity based on identifiers associated with that entity, such as an identification sequence or name. For example, a computer system may identify multiple patient records from a database based on patient names or patient identification numbers by performing a targeted search using a list or set of identifiers executing a batch retrieval operation that matches each provided identification number against the database's records. A computer system may create a query that uses an "IN" clause or similar set-based matching mechanism, which allows simultaneous lookup of multiple patient records by comparing each submitted identifier against the database's primary key or unique identifier columns. A computer system may ensure that for each valid name or ID number, a corresponding patient record is located and extracted, with the system handling potential variations like case sensitivity, partial matches, or handling of unmatched identifiers through error logging or flagging mechanisms.

Some embodiments may generate a first natural language query including a first record selected based on the comparison of the first timestamp of the first record with one or more timestamps of records of the set of records, as indicated by block 216. Some embodiments may first select a first record by comparing a first timestamp of a first record with one or more timestamps of records of a plurality of records to select the record with the latest timestamp. Some embodiments may perform such a comparison by sorting a number of available records or record data based on associated timestamps and then use the sorted timestamps to select the most recent record. For instance, if the first record has a timestamp of "2025-01-01 10:00:00" and other records includes timestamps "2025-01-01 09:00:00", "2025-01-01 11:00:00", and "2025-01-01 08:00:00", the system may select the record with the timestamp "2025-01-01 11:00:00," as it is the latest timestamp. In some embodiments may select fields in the same record, where each field may be associated with different timestamps. For example, if a first entry has a timestamp of "2025-01-01 10:00:00" and other entries include timestamps "2025-01-01 09:00:00", "2025-01-01 11:00:00", and "2025-01-01 08:00:00", the system may select the first entry with the timestamp "2025-01-01 11:00:00," as it is the latest timestamp.

Some embodiments may first query structured data before performing operations using language models, where a determination that a set of criteria is satisfied based on the structured data may prematurely stop operations. Some embodiments may obtain a structured data set associated with the record. For example, some embodiments may obtain a structured data set from a patient's medical record, including vital signs, lab results, and medication history. Some embodiments may then determine a result that indicates whether data within the structured data set satisfies or does not satisfy the set of criteria. Some embodiments may determine that the structured data satisfies the set of criteria and, in response, cease operations of the process 201 without using a language model. For example, some embodiments may determine that the structured data including blood pressure, heart rate, and temperature from a patient's medical record satisfies a set of criteria for a clinical trial for a particular treatment or inclusion in an observational or implementation study or inclusion in a registry. Some embodiments may determine that the structured data does not satisfy the set of criteria. For example, some embodiments may determine that the structured data set from a patient's medical record does not satisfy the criteria for a clinical trial or inclusion in an observational or implementation study or inclusion in a registry, such as by not meeting a required lab result threshold, by determining that data for one or more criteria is not found in structured data. In response to determining that the structured data does not satisfy the set of criteria, some embodiments may then generate the first natural language query in response to determining the result does not satisfy the set of criteria.

Some embodiments may use prioritization to determine whether to use structured data or unstructured data to determine whether criteria is satisfied. For example, the system may store priorities indicating whether unstructured data or structured data is of a priority. There may be a discrepancy in data between the structured data and the unstructured data, such as a difference in body temperature on a particular day or an indication of whether a particular procedure was performed. In such cases, the system can use the stored priorities to determine which of the structured data or the unstructured data to use to determine whether criteria is satisfied (e.g., determine whether to use the structured data instead of the unstructured data, or vice versa). The system can use only the higher prioritized of the structured data or the unstructured data to determine whether criteria is satisfied, ignoring or discarding the lower prioritized data.

Some embodiments may consider quantitative or categorical values associated with a record when selecting a first record or an additional record for query generation. Some embodiments may select a most-recent record associated with a particular record category indicating a relevance to a clinical trial for a particular treatment or inclusion in an observational or implementation study or inclusion in a registry. For example, some embodiments may select an additional record based on the record being the most recent record that has not yet been used to generate a language model input, so long as this most recent record is associated with the category "cancer specialist note."

Some embodiments may use a summarizing language model to generate a summary for text and then use the summary as part of an input instead of using the text directly. Some embodiments may generate a summary indicating a quantitative change over time or a categorical change over time based on a plurality of records. For example, some embodiments may generate a summary showing a patient's blood pressure levels over the past year or a change in the patient's diagnosis from "pre-diabetic" to "diabetic." Some embodiments may generate the first natural language query or the second natural language query based on the summary. For instance, some embodiments may generate a natural language query like "Using the patient's clinical notes, answer the question: 'Has the patient's blood pressure improved over the past year?'" based on the summary of the patient's blood pressure levels. Some embodiments may generate a summary for a document as an input for a language model instead of using the document itself to reduce token consumption and processing costs while retaining essential information, enabling more efficient and focused analysis of large document collections.

Some embodiments may obtain a set of categories for data sources for the plurality of records and then obtain a set of priorities for the plurality of records, where the set of priorities indicates relative or absolute priority values associated with the set of categories. Some embodiments may categorize the plurality of records based on the set of categories for the plurality of records. Some embodiments may sort an order of the plurality of records based on the set of priorities, where selecting the first record from the plurality of records includes selecting the first record based at least on a priority of a category of the first record. For example, some embodiments may obtain a set of categories for patient records indicating data sources, such as lab results from a hospital lab, pathology results from a pathology department, and imaging reports from a radiology department. Some embodiments may obtain a set of priorities for these patient records, indicating that lab results have the highest priority, followed by pathology notes and then imaging reports. Some embodiments may categorize the patient records based on these categories, ensuring that each record is assigned to the appropriate category. Some embodiments may then sort the patient records based on the set of priorities, selecting the first record based on the highest priority category, such as lab results. Furthermore, some embodiments may determine priority based on a combination of a category and recency, such as selecting the most recent record that is a lab result record for a patient as the first record for the patient. It should be understood that a set of criteria may explicitly disclose the category prioritization order. Some embodiments may determine a priority for a category based on a set of criteria. For example, some embodiments may determine that a set of criteria is primarily related to radiology data and, in response, prioritize record data associated with radiology reports.

Some embodiments may determine the relevance of the content of each of the plurality of records to the set of criteria. For example, some embodiments may determine the relevance of the content of one or more patient records to the criteria for a clinical trial for a particular treatment or inclusion in an observational or implementation study or inclusion in a registry related to hypertension and then evaluate each available record in a plurality of records to see whether the content includes hypertension-related terminology or statements. Some embodiments may then select a first record based on the relevance of the content of the first record to the set of criteria, such as selecting a record as a first record for query construction due to the relevance of the content of the selected record and the recency of the selected record. For example, some embodiments may select the first patient record based on its relevance to the criteria for a clinical trial or inclusion in an observational or implementation study or inclusion in a registry for hypertension treatment and the detection of the term "hypertension" in a first patient records about the patient's hypertension condition.

Some embodiments may determine a relevance value based on a set of criteria. For example, some embodiments may first generate a set of questions determined to resolve the set of criteria, where such generation may include summarizing text in the set of criteria, generating new text in the set of criteria, or using an extracted portion of the set of criteria as a question. Furthermore, some embodiments may use embeddings to determine relevance values. Some embodiments may generate a criterion embedding from at least one of the set of criteria and a content embedding from the content of the first record using an embedding model (e.g., static word embedding models, contextual embedding models, sophisticated phrase/sentence-level embedding models, etc.). For example, some embodiments may generate a criterion embedding from the criteria for a clinical trial for a particular treatment or inclusion in an observational or implementation study or inclusion in a registry and a content embedding from a patient's medical record using an embedding model. Some embodiments may determine the relevance based on a similarity between the criterion embedding and the content embedding. For example, after generating a criterion embedding from a set of criteria, some embodiments may determine the relevance value for a clinical note stored in a patient's record based on a similarity between the criterion embedding and the content embedding. By using embedding models and criterion embeddings, some embodiments may provide the benefit of enabling efficient semantic similarity comparisons by converting text into dense numerical vectors, allowing rapid matching of related content even when exact word matches are not present.

After selecting a record or a record entry, some embodiments may generate a first natural language query to include some or all of the selected record data. For example, some embodiments may construct a natural language query based on a template, where the template indicates a context that includes the selected record data and a prompt that includes some or all of a set of criteria (e.g., the set of criteria discussed for block 208). For example, some embodiments may receive a first set of criteria that includes "does the patient have symptoms of breathing difficulties?" using operations described for block 208 and then retrieve a record entry that includes a first record note that includes "patient experiencing difficulty of breath and blurry vision" and construct a natural language query using a first template "Using a record note that states: '[record_data_content]', answer the questions: '[set_of_criteria].'" Some embodiments may then use this first set of criteria, this first record note, and this first template to construct the natural language query "Using a record note that states: 'patient experiencing difficulty of breath and blurry vision,' answer the questions: 'does patient have symptoms of breathing difficulties.'"

Some embodiments may generate one or more questions based on a set of criteria, where selecting a patient or another entity based on the set of criteria includes selecting a patient based on the generated question. For example, a computer system may obtain a criterion "blood pressure must surpass 140/90" that is embedded in a natural language document. The computer system may provide this natural language document to an LLM in addition with a prompt that instructs the LLM to identify clinical criterion based on medical terminology and numerical ranges. After extracting one or more criteria, the computer system may generate another targeted prompt to transform the extracted portions of the natural language text into a set of questions, such as "convert these clinical elements into natural language questions." The computer system may submit this second targeted prompt to the LLM to generate a question such as "does the subject's blood pressure exceed 140/90 for either systolic or diastolic pressure?"

Some embodiments may use non-LLM tools to generate questions based on a set of criteria. For example, a computer system may identify the subject of measurement ("blood pressure") through pattern matching or medical entity recognition and then detect one or more comparative operators. The computer system may then map directive terms such as "must surpass" to standardized comparison operators and extract numerical values, where the computer system may recognize the specific format of blood pressure measurements (e.g., detect that 140/90 is a systolic/diastolic measurement. The computer system may then apply transformational rules to convert the declarative statement into an interrogative form, such as by applying templates. For example, the computer system may convert an imperative operator "must surpass" into "exceeds" and maintain numerical values in an original format. Using such operations, the computer system may generate the question, "does the patient's blood pressure exceed 140/90?" based on the criteria. Furthermore, some embodiments may use a combination of LLM and non-LLM methods to generate new questions from criteria.

Some embodiments may execute a language model using the first natural language query to generate a first result, as indicated by block 220. Some embodiments may provide a language model with a natural language query constructed using operations described in this disclosure. It should be understood that a natural language query in this example may include a prompt and a context, and further that it is possible for additional context to be provided in conjunction with or otherwise in association with the natural language query. For example, some embodiments may submit, to a language model, a first query "Using a record note that states: 'patient experiencing difficulty of breath and blurry vision,' answer the questions: 'does patient have symptoms of breathing difficulties.'" Some embodiments may submit this first query to a language model and receive an output, such as "yes" or "the set of criteria is satisfied." Furthermore, it should be understood that, when using the first natural language query, some embodiments may submit all the tokens of the first natural language query to a language model. Some embodiments may truncate one or more portions of the first natural language query and provide some of the tokens of the first natural language query to a language model without providing all of the tokens of the first natural language query to the language model.

When using a language model, some embodiments may use one or more various types of operations to communicate, such as by making API calls by sending queries to the language model's endpoint as HTTP requests in a structured format (e.g., JSON). For example, some embodiments may send a message that includes a natural language query to a REST API endpoint that then returns a response to the natural language query in a structured format. Some embodiments may use endpoints that provide standardized integration with one or more applications while maintaining control over response formatting and error handling. Some embodiments may include or have direct access to a deployment of one or more native language models. Furthermore, some embodiments may use streaming interfaces to receive token-by-token output through WebSocket connections or server-sent events (SSE).

Some embodiments may generate a list of text spans or other data references from the selected record data that supports the answers. For example, some embodiments may first provide a health condition note and a query to a user. Such data references may act as a form of justification to provide explainability for an answer or a downstream action based on the answer. Furthermore, such operations may minimize model hallucinations by providing sentence-level excerpts usable by downstream operations.

Some embodiments may store the first answer in a cache. For example, some embodiments may store the initial diagnosis of a patient in a cache for quick access. Some embodiments may retrieve the first answer from the cache responsive to generating the second answer. For instance, some embodiments may retrieve the cached initial diagnosis when generating a follow-up answer based on new test results, where at least a portion of the input to the language model may have been retrieved from the cache. By using a cache, some embodiments may increase the speed of data retrieval and language model input construction.

Some embodiments may determine whether the first result satisfies the set of criteria, as indicated by block 222. Some embodiments may generate a result indicating whether the structured or unstructured data in a record satisfies a set of criteria based on a natural language query that includes the set of criteria and the record data. For example, some embodiments may provide a natural language query that includes record data (e.g., clinical notes in text form) and a set of criteria (e.g., questions written in natural language form) to a language model. This language model may then generate a result indicating that the set of criteria is satisfied, which may indicate that an entity is acceptable for whatever outcome is associated with satisfying the set of criteria. For example, some embodiments may determine that a patient (or other type of entity) is eligible for enrollment in a clinical trial, observational study, or implementation study based on the the set of criteria being satisfied.

Some embodiments may obtain intermediate results as outputs from a language model and then process this intermediate output. For example, some embodiments may receive the response "4" to the prompt "what is the cancer stage of the patient?" and then determine whether "4" satisfies a required cancer stage by providing this response to a rules-based engine. Furthermore, some embodiments may provide an initial output generated by a language model to an encoder-decoder model to normalize the answer into a canonical format. For example, a computer system may first receive a first answer to a first prompt and a second answer to a second prompt from a language model. The computer system may then execute an encoder-decoder model using the first answer and the second answer to generate a normalized first answer and second answer. Some embodiments may then use this normalized set of answers as the input for a downstream operation to determine whether a patient or another entity should be added to a registry or is eligible for enrollment in a study. In response to a determination that the first result satisfies the set of criteria, operations of the process 201 may proceed to block 240. Otherwise, operations of the process 201 may proceed to operations described for block 224.

Some embodiments may generate an additional natural language query including an additional record selected based at least on the additional record corresponding to an additional timestamp prior to the first timestamp of the first record, as indicated by block 224. Some embodiments may generate an additional natural language query that includes one or more additional records, portions of records, or other record data. Various criteria may be used to select the one or more additional records, portions of records, or other record data. Some embodiments may select a record based on recency, such as selecting the second-most recent record of a timestamp-sorted set of records for being the most recent record that has not yet been used to generate a language model input.

Some embodiments may select a record that is the most recent record which was not yet used to generate a natural language query or otherwise processed by the language model. For example, some embodiments may first select an additional record with the most recent timestamp from a plurality of records. After determining that the data in this first record does not satisfy a set of criteria indicating eligibility using operation similar to or the same as those described for block 220 and block 222, some embodiments may then select the second-most recently updated record. To establish which next record of a plurality of records to process, some embodiments may sort the plurality of records based on their respective timestamps or use a pre-sorted set of records (e.g., use a pre-sorted set of records arranged in other operations described in this disclosure). Similarly, to establish which next record entry of a plurality of record entries in a same record to process, some embodiments may first sort the plurality of record entries based on their respective timestamps (e.g., use pre-sorted portions of records arranged in other operations described in this disclosure). Some embodiments may then select a next record or record portion from the sorted plurality of records based at least on the sorted timestamps.

For example, if a first record has a timestamp of "2025-01-01 12:00:00" and does not meet a set of criteria indicating patient eligibility, a computer system may then select the record with the next latest timestamp, such as "2025-01-01 11:00:00." Some embodiments may process data having different timestamps in the same record. For example, if a first entry has a timestamp of "2025-01-01 10:00:00" and other entries include timestamps "2025-01-01 09:00:00", "2025-01-01 11:00:00", and "2025-01-01 08:00:00", and the system determines that the data associated with the timestamp "2025-01-01 11:00:00" does not satisfy a set of criteria indicating eligibility, some embodiments may instead select the entry associated with "2025-01-01 09:00: 00."

After selecting the additional record data (e.g., by selecting a second record or a second entry in a record), some embodiments may perform operations to generate a query using this selected second record data. For example, some embodiments may construct a second natural language query based on a template, where the template indicates a context that includes the selected record data and a prompt that includes some or all of a set of criteria (e.g., the set of criteria discussed for block 208). For example, some embodiments may receive a first set of criteria that includes "does the patient have symptoms of breathing difficulties?" using operations described for block 208 and then retrieve a record entry that includes a first record note that includes "patient experiencing difficulty of breath and blurry vision" and construct a natural language query using a first template "Using a record note that states: '[record_data_content]', answer the questions: '[set_of_criteria].'" Some embodiments may then use this first set of criteria, this first record note, and this first template to construct the natural language query "Using a record note that states: 'patient experiencing difficulty of breath and blurry vision,' answer the questions: 'does patient have symptoms of breathing difficulties.'"

Some embodiments may use facts extracted across different records to determine whether one or more criteria is satisfied. For example, a computer system may determine whether a patient exhibits increasing pain in their chest within a specified time period as indicated by a criterion. The computer system may first extract the criterion for increasing pain from a natural language document and generate a natural language question based on this criterion (e.g., "does the patient discuss the existence of chest pain and whether it has gotten worse?"). The computer system may then extract a first note indicating chest pain from a first medical record and a second note indicating chest pain from another record taken at a later time. Some embodiments may then provide the first note with the natural language question to the LLM and then provide the second note with the natural language question to the LLM to detect and confirm the existence of an increase in chest pain. For example, the LLM may generate an answer stating: "Yes, there is an increase in pain. The patient discussed chest pain on 4/5/20XX and 6/3/20XX and stated that their chest pain had gotten worse since their last visit." By following this process, the computer system may use an LLM to analyze medical record data across visits.

Some embodiments may execute a language model using the additional one or more tokens of the additional natural language query to generate an additional result, as indicated by block 228. When executing a language model using the additional one or more tokens, some embodiments may use one or more operations described for block 220. When generating a language model using the additional one or more tokens of the additional natural language query, some embodiments may use a similar language model or the same language model used to generate the first result, such same APIs, same set of commands or subset of commands, same parameters or subset of parameters. For example, some embodiments may use a language model to process a second natural language query that include a prompt and context, such as a clinical note a patient's elevated white blood count and a question on whether a white blood count exceeds a certain threshold. The language model may then generate outputs, such as an output indicating that a patient's white blood count satisfies the certain threshold. Furthermore, other operations described for block 220 may be performed for block 228, such as retrieving text spans from the record data indicating sources in data that justify an output or otherwise are associated with an output.

Some embodiments may determine whether the set of additional results satisfies the set of criteria, as indicated for block 232. When determining whether the set of additional results satisfies the set of criteria, some embodiments may perform some operations similar to or the same as those described for block 222. For example, after first determining that first record data does not satisfy a set of criteria, a computer system may then select additional record data (e.g., an additional record or an additional portion of a record). The computer system may then provide a language model with the selected additional record data in conjunction with the set of criteria. For example, some embodiments may provide a language model with a first set of notes from a first record, determine that the set of criteria is not satisfied, and then provide the language model with a second set of notes from a second record to determine that the second set of notes satisfy the set of criteria. Furthermore, some embodiments may determine that a set of criteria is satisfied based on multiple records or portions of records, unless the criteria themselves restrict such a determination. For example, some embodiments may obtain "approved" as a language model output after providing a language model with contents of three differently-timestamped clinical note entries in a patient record as context and a prompt that includes a criterion "the patient visited the doctor three times in the last year."

In response to a determination that the set of additional results satisfies the set of criteria, operations of the process 201 may proceed to operations described for block 240. Otherwise, operations of the process 201 may proceed to operations described for block 236.

Some embodiments may determine whether additional record data for the entity is available, as indicated by block 236. After processing a first record associated with an entity, some embodiments may proceed to the next record associated with that entity if a set of criteria are not satisfied by the current record. Some embodiments may proceed through individual entries or other portions of record data associated with different timestamps in a single record if a current portion of record data does not satisfy the set of criteria. Some embodiments may continue processing records associated with an entity until a set of criteria is satisfied. This process may involve examining individual entries or portions of record data with different timestamps within a single record.

Some embodiments may limit a search for available records to a specified time period. Some embodiments may obtain a duration parameter as part of determining the relevance of content and then select the second record if it is within a time period associated with the duration parameter. For example, some embodiments may obtain a duration parameter specifying a three-month period for reviewing patient records. Some embodiments may then select the second patient record if it falls within this three-month period, ensuring the relevance of the content to the clinical trial criteria or inclusion in an observational or implementation study or inclusion in a registry.

In response to a determination that there is additional record data for the entity that is available for processing, some embodiments may return to operations described for block 224 to select a new record or record entry for processing. Otherwise, operations of the process 201 may return to operations described for block 212 to select a new available entity and a corresponding set of records for processing. For example, in some embodiments, a computer system may iterate through a database of medical records using a loop (e.g., a for loop) to search for additional patient information. The computer system may make an API query during each iteration to examine patient_id values in the records table, checking for supplemental data flags or related record entries. The computer system may continue to iterate through the loop to search for additional patients that may meet applicable criteria (for example, for potential enrollment in a clinical trial, inclusion in a registry, or other patient identification purposes) until either a pre-determined number of patients has been processed or the total number of feasible patients has been exhausted.

Some embodiments may communicate a message identifying an entity as potentially satisfying the criteria of a protocol to a client device, as indicated by block 240. In response to determining that a set of criteria is satisfied by data associated with an entity, some embodiments may select that entity for downstream operations, such as generating an alert for that entity. Some embodiments may communicate the message via a user interface. For example, some embodiments may send, to a client device, an entity identification message (e.g., indicating they would be communicated through a structured list displaying key identifying details, such as rendering a digital notification with the participant's name, unique test participant ID, assigned test group, scheduled test date, and contact email address). The interface at the client device may then present these details in a clean, hierarchical format. For example, some embodiments may use a vertical list with bold labels and corresponding values, ensuring clear visual communication of the essential information needed to uniquely identify and contact the selected test participant.

Some embodiments may communicate the message by identifying a selected entity by generating a listing of entities that includes the selected entity or updating a listing of entities to include the selected entity. For example, after determining that a patient's record data satisfies a set of criteria, some embodiments may select the patient and update a registry of patients that includes the selected patient or include the patient in a list of eligible patients for a clinical trial, observational study, implementation study, or evidence-based care pathway. Some embodiments may then send the list of patients to a client device or a portion of the list of patients (e.g., a list of new patients added to the list of patients). In some cases, the list may correspond to a clinical trial or observational or implementation study, while in another cases, it may instead be a list of individuals to be included in a registry (e.g., a regulatory registry) that satisfy the criteria. After receiving the list of patients, some embodiments may present the list of patients in a user interface.

Using the operations above, some embodiments may employ a time-based strategy to prioritize LLM use and reduce unnecessary token consumption. For example, a computer system may store multiple records in a database and obtain a first natural language protocol for a clinical trial for a particular treatment or inclusion in an observational or implementation study or inclusion in a registry that includes criteria for a set of patients. The computer system may apply one or more language algorithms to the first natural language text document to extract a set of criteria and then generate a set of questions from the set of criteria, where a first question may include a requirement that a patient report loud ringing noises over a two-month period, and where the answers to the first question may be embedded in unstructured data.

Continuing this example, the computer system may sort a set of timestamped clinical notes that are stored in their own separate records into a reverse chronological order and use this sorting to provide the most recent clinical note with the first question to an LLM. The LLM may then produce a first response. The computer system may then determine that the first note does not contain sufficient information to satisfy the first question and proceed to the second note by providing the second-most recent clinical note with the first question to the LLM. The LLM may then output a second response, causing the computer system to determine whether the second response is sufficient to satisfy the set of criteria, and, if necessary, process additional notes with the LLM to generate additional responses. For example, the first response may be "reports loud ringing noise" with no indication of a time period, and thus the "two-month" requirement would not have been satisfied. The computer system may determine that the second response may include the phrase "reports mild ringing noise" and is associated with a timestamp two months more than two months before the timestamp for the first note and, in response, determine that the "two-month" requirement is satisfied. If the two-month requirement is the only remaining criteria to be satisfied, the computer system may then stop processing additional notes and stop using the LLM to generate additional answers to the first question. Some embodiments may then select a set of entities, for example, for the clinical trial or inclusion in an observational or implementation study or inclusion in a registry by selecting patients for which the corresponding answers indicate that the patient had reported loud ringing noises over a two-month period.

Figure 3A:
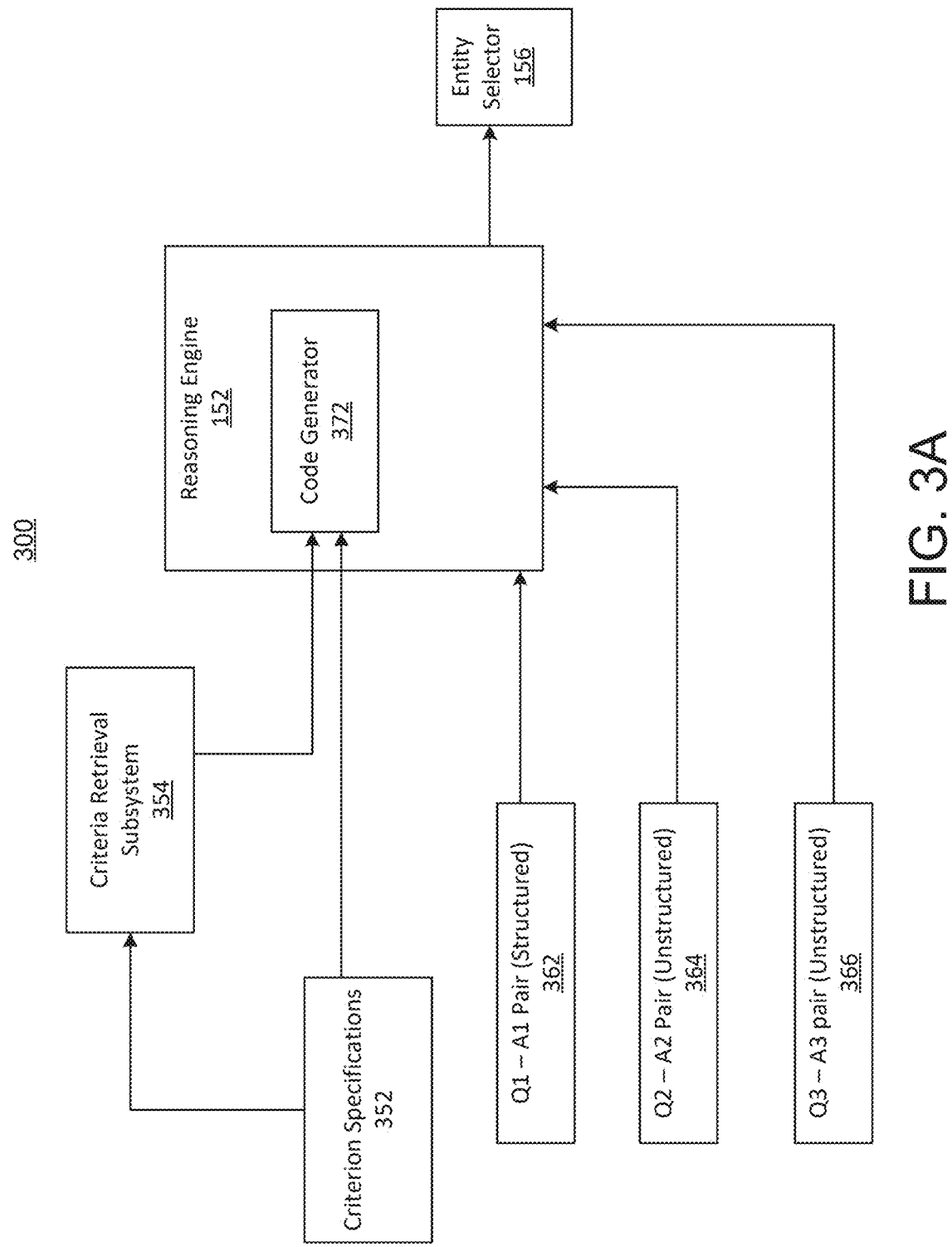
FIG. 3A illustrates an example system for conserving token use with a language model, in accordance with an implementation.

Part C: Systems and Methods for Reducing Language Model-Based Errors for Entity Identification FIG. 3A illustrates a conceptual diagram of a reasoning engine used to select entities based on custom reasoning, in accordance with an implementation. As shown in the example system 300, criterion specifications 352 may be provided to a criteria retrieval subsystem 354, which then outputs retrieved data to a reasoning engine 152 that includes a code generator 372. In addition, question-answer pairs retrieved from both structured and unstructured data may be provided to the reasoning engine 152. The reasoning engine 152 may then output data to the entity selector 156.

In some embodiments, a computer system may provide the criterion specifications 352 to the criteria retrieval subsystem 354. The criterion specifications 352 may include various types of text, such as a pre-constructed set of machine-interpretable criteria, a list of natural language criteria, a natural language document that embeds criteria into the various portions of the text. The criteria retrieval subsystem 354 may extract portions of the criteria by using natural language processing algorithms, regular expression patterns, or one or more language models. The criteria retrieval subsystem 354 may send extracted criteria to the code generator 372 or questions generated from the extracted output to the code generator 372. For example, the criteria retrieval subsystem 354 may construct a set of questions that includes "did the patient describe pain that improves after bowel movements?" and "did the patient describe the existence of blood in stool?" based on the criterion specifications 352 including a criterion that "patient does not have Irritable Bowel Syndrome." The criteria retrieval subsystem 354 may then send the extracted criteria or the questions constructed from the extracted criteria to the code generator 372. Furthermore, some embodiments may directly send the criterion specifications 352 to the code generator 372.

The code generator 372 or another portion of the reasoning engine 152 may construct program code, conditional logic, or another type of machine-interpretable instruction to determine whether one or more criteria is satisfied for the purpose of evaluating data to select one or more entities. For example, the code generator 372 may be configured to directly formulate database queries capable of extracting data from structured data or determine answers based on the structured data. For example, the criteria retrieval subsystem 354 may construct the question "what is the patient's most recent folate value within the last 4 weeks?" and provide the question to the code generator 372. The code generator 372 may then construct reasoning logic based on the provided questions and other data. For example, the code generator 372 may construct reasoning logic that states that if the most recent folate value is lower than 1.0 nanograms per milliliter, then a first criterion is not met. In some embodiments, the code generator 372 may codify the decision logic of the second stage in a general programming language, such as Python, allowing for the expression of arbitrarily complex logic if necessary for a given criterion.

Some embodiments may provide criteria obtained from the criterion specifications 352 or questions generated from the criterion specifications 352 (e.g., generated by the criteria retrieval subsystem 354) to obtain a set of questions. Some embodiments may then inject one or more questions of this set of questions to a structured data query or an LLM as part of a prompt. The results of the structured data query may provide a first question-answer pair 362. The LLM may provide answers based on one more unstructured types of data, such as a set of clinical notes. For example, the results of the unstructured data query may provide a second question-answer pair 364 and a third question-answer pair 366. Some embodiments may normalize the first question-answer pair 362, the second question-answer pair 364, or the third question-answer pair 366 and provide the normalized answers to the reasoning engine 152.

The reasoning engine 152 may determine whether a set of criteria is satisfied by following conditional logic constructed by the code generator 372 based on the first question-answer pair 362, the second record 264, or the third question-answer pair 366. Some embodiments may include additional information to incorporate as criteria based on additional data sources, such as a hard-coded parameter or study limitation. For example, some embodiments may construct one or more machine-interpretable criteria that includes a required timeframe in which to consider data, whether another criterion is a hard requirement, a study size, etc. The reasoning engine 152 may then output a final determination to the entity selector 156, where the entity selector 156 may then select one or more entities based on the output of the reasoning engine 152. For example, some embodiments may generate the first question-answer pair 362, the second question-answer pair 364, and the third question-answer pair 366 based on records corresponding with a candidate patient. The reasoning engine 152 may then determine, based on complex python logic constructed by the code generator 372, the first question-answer pair 362, the second question-answer pair 364, and the third question-answer pair 366, that the candidate patient satisfies the set of criteria extracted by the criteria retrieval subsystem 354. The reasoning engine 152 may then output this decision to the entity selector 156, where the entity selector 156 may then add the candidate patient's identifying information to a list of candidate patients.

Figure 3B:
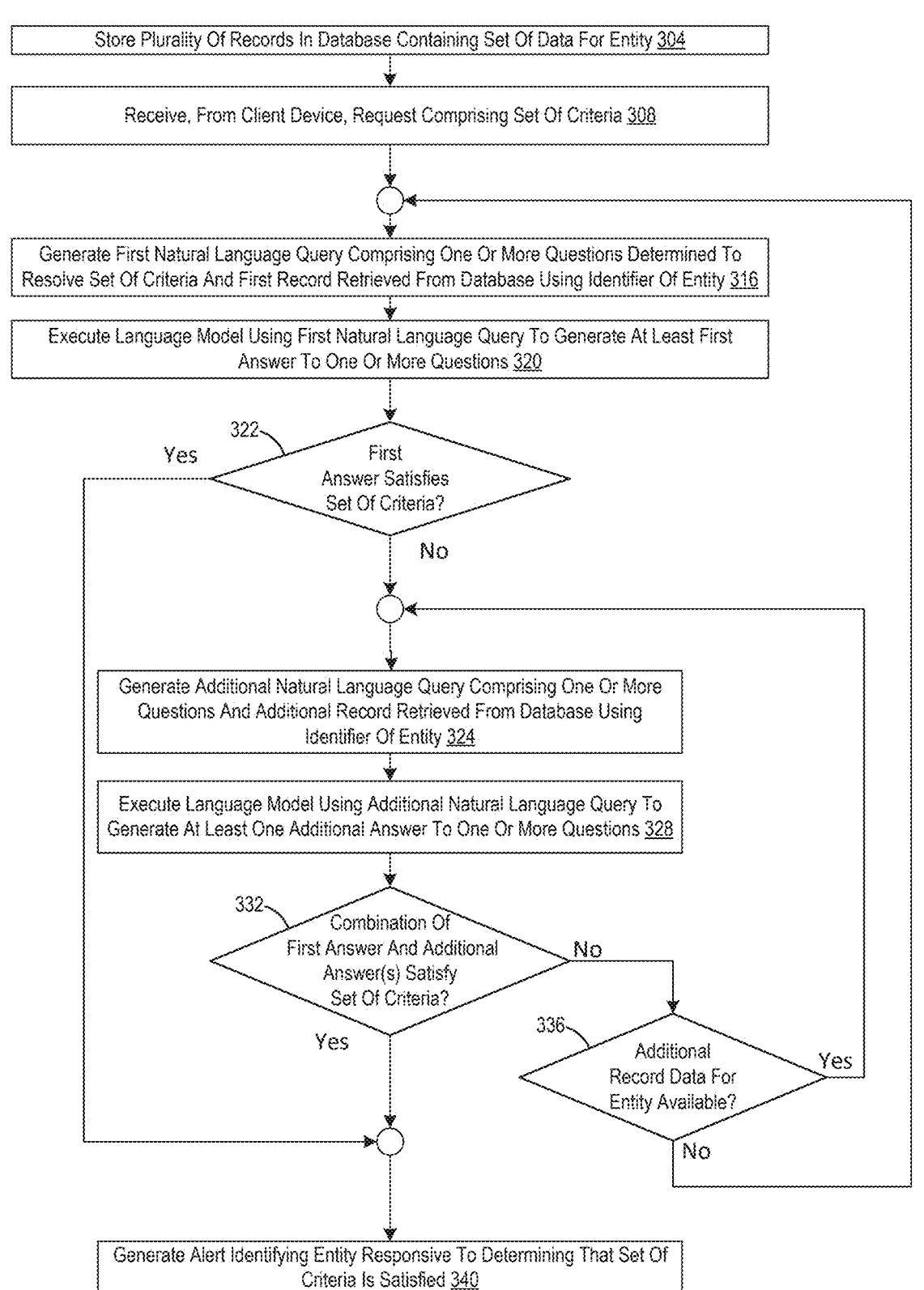
FIG. 3B illustrates an example flowchart of a process for reducing language model hallucinations for entity identification, in accordance with an implementation.

FIG. 3B illustrates an example flowchart of a process 301 for reducing language model hallucinations for entity identification, in accordance with an implementation. The process 301 includes a block 304 indicating operations to store records in a database. The block 304 is followed by a block 308 indicating operations to receive a request. The block 308 is followed by a block 316 indicating operations to generate a first natural language query. The block 316 is followed by a block 320 indicating operations to execute a language model to determine a first answer. The block 320 is followed by a block 322 indicating operations to determine whether the first answer satisfies a set of criteria. The block 322 is followed by a block 324 and a block 340, where the block 324 indicates operations to generate an additional natural language query. The block 324 is followed by a block 328 indicating operations to execute the language model based on the additional natural language query to determine an additional answer. The block 328 is followed by a block 332 indicating operations to determine whether the combination of the first answer and any additional answers satisfies the set of criteria. The block 332 is followed by one of a block 336 or the block 340, where the block 336 indicates operations to determine whether there is additional record data available for processing. The block 340 indicates operations to generate an alert identifying an entity.

Some embodiments may store a plurality of records in a database containing a set of data for an entity, as indicated by block 304. Some embodiments may perform operations similar to or the same as those described for other operations to store a plurality of records in a database, such as those described for block 204 or block 404. For example, some embodiments may store a plurality of records in a database, where each record contains a set of data for an entity, such as the name, identification number, and contact information for a patient or individual.

Some embodiments may receive, from a client device, a request including a set of criteria to identify whether an entity satisfies such criteria, as indicated by block 308. Some embodiments may perform operations similar to or the same as those described for other operations to receive requests, such as those described for block 208 or block 408. For example, a computer system may receive a request with a set of criteria associated with a search for patients for a clinical trial (or observational study, implementation study, or inclusion in a registry). Some embodiments may receive a request via various methods, where the request may be received in the form of natural language text that contains a set of criteria.

Some embodiments may generate a first natural language query including one or more questions determined to resolve the set of criteria and a first record retrieved from a database using an identifier of an entity, as indicated by block 316. Some embodiments may perform operations similar to or the same as those described for block 216 with respect to generating a natural language query, though some embodiments may perform such operations without performing other operations described for block 216. For example, some embodiments may generate a first natural language query to include some or all of a set of record data retrieved from a patient's medical record. Some embodiments may construct a natural language query based on a template, where the template indicates a context that includes the selected record data and a prompt that includes some or all of a set of criteria (e.g., the set of criteria discussed for block 308). For example, some embodiments may receive a first set of criteria that includes "does the patient have symptoms of high blood pressure?" Some embodiments may then retrieve a record entry for a patient or other entity that includes a record note that includes "patient experiencing frequent headaches and dizziness" and construct a natural language query using a first template "Using a record note that states: '[record_data_content],' answer the questions: '[set_of_criteria].'" Some embodiments may then use this first set of criteria, this first record note, and this first template to construct the natural language query "Using a record note that states: 'patient experiencing frequent headaches and dizziness,' answer the questions: 'does patient have symptoms of high blood pressure.'"

Some embodiments may resolve one or more criteria of the set of criteria based on structured data. For example, some embodiments may generate a programmatic query for structured data to resolve a set of criteria. Some embodiments may determine that one or more questions in a set of criteria may be resolved with structured data and map the one or more questions to a programmatic query configured to query one or more of the plurality of records. For example, some embodiments may determine that a question about a patient's blood pressure can be answered using structured data from the patient's medical record. For example, some embodiments may map the question about the patient's blood pressure to a SQL query that retrieves the relevant data from the medical records based on structured data. Some embodiments may execute the programmatic query to retrieve a third answer from the one or more records. For example, some embodiments may execute the SQL query to retrieve the patient's latest blood pressure reading from the medical records. When constructing a query for a language model, some embodiments may then remove the satisfied subset of criteria from inclusion in the query. For example, if a set of criteria includes three criteria, where the third criterion is satisfied based on a patient record's indicated blood pressure value, some embodiments may construct a query that includes unstructured record data as input and includes the first two criteria as output.

Some embodiments may execute a language model using the first natural language query to generate at least a first answer to one or more questions, as indicated by block 320. Some embodiments may perform operations similar to or the same as those described for block 220 with respect to generating a natural language query, though some embodiments may perform such operations without performing other operations described for block 220. For example, some embodiments may send an API request that includes a natural language query to a language model executing on a cloud computer system, where the endpoint may then output a result using the language model. The language model can generate results used to determine whether a related entity should be added to a set of criteria, using various communication methods like API calls and streaming interfaces. For example, some embodiments may use an API endpoint to input, to a language model, a query "Using a record note that states: 'patient experiencing urinary problems and dog-breath, answer the questions: 'does patient have symptoms of urinary problems?'". The language model may then generate an output "yes" and send this output to a downstream subsystem via one or more communication methods, such as HTTP or a WebSocket connection.

Some embodiments may use the first answer to generate an alert identifying an entity, as indicated by block 340. When generating an alert for an entity, some embodiments may perform operations similar to or the same as those disclosed for block 240. Some embodiments may determine that a patient's record data satisfies a set of criteria using a first record or first retrieved record data and select the patient for downstream operations. Some embodiments may update a list of patients that satisfy applicable criteria to include the selected patient and send the updated list to a client device. For example, a computer system may determine that a patient's record data satisfies the criteria for enrollment in a clinical trial, observational study, implementation study, registry, or care pathway based on their medical history. The computer system may then add the patient to the patient list and send the updated list to a client device, where the client device may then present a notification displaying the patient's name, the patient's medical record number, and a unique trial ID.

Some embodiments may execute an encoder-decoder model using the first answer or other additional answers to generate a set of normalized answers. For example, some embodiments may use an encoder-decoder model to process a patient's initial diagnosis and follow-up test results to generate standardized answers, where versions of the number "4" may all be converted to "4." For example, the outputs "IV," "Four," and four" may each be converted to "4." An encoder-decoder model may include a distinct encoder network that compresses input data into a fixed-dimensional vector space and a decoder network that then uses the vectors as context to generate its output sequence. Some embodiments may determine that the combination of the first answer and the second answer satisfies the set of criteria by evaluating the combination of the normalized first answer and second answer. For instance, some embodiments may determine that the combination of a patient's normalized initial diagnosis and follow-up test results meets the eligibility criteria for a clinical trial, observational study, or registry. Furthermore, it should be understood that similar operations may be performed for other outputs of a language model, such as answers generated using operations described for block 328.

Some embodiments may determine whether the first answer satisfies a set of criteria, as indicated by block 322. When determining whether the first answer satisfies the set of criteria, some embodiments may perform operations similar to or the same as those described for block 222. For example, some embodiments may generate an answer or other result indicating whether the structured or unstructured data in a record satisfies a set of criteria based on a natural language query that includes the set of criteria and the record data. Some embodiments may provide a natural language query that includes record data and a set of criteria for a protocol (e.g., questions written in natural language form for a clinical trial for a particular treatment or inclusion in an observational or implementation study or inclusion in a registry to assess treatment for prostate cancer) to a language model. This language model may then generate a result indicating that the set of criteria is satisfied, which may indicate that an entity is acceptable for whatever outcome is associated with satisfying the set of criteria. For example, some embodiments may determine that a patient (or other type of entity) is acceptable for a clinical trial or inclusion in an observational or implementation study or inclusion in a registry based on the set of criteria being satisfied and, in response, add the patient to a list of patients eligible for a prostate cancer treatment study.

In response to a determination that the first answer satisfies the set of criteria, operations of the process 301 may proceed to block 340. Otherwise, operations of the process 201 may proceed to operations described for block 324.

Some embodiments may generate an additional natural language query including one or more questions and an additional record retrieved from a database using an identifier of an entity, as indicated by block 324. Some embodiments may perform operations similar to or the same as those described for generating natural language queries elsewhere in this disclosure, such as operations described for block 216 or block 316. For example, some embodiments may select, to include as part of an input to a language model, a most recent record not yet used to generate a natural language query or otherwise processed by the language model. Some embodiments may use other standards to select for a set of records, such as selecting record data based on a determination that the selected set of records is labeled with a priority indicator or with a category exclusive to one or more criteria.

After selecting the additional record data (e.g., by selecting a second record or a second entry in a record), some embodiments may perform operations to generate a query using this selected second record data. For example, some embodiments may construct a second natural language query based on a template, where the template indicates a context that includes the selected record data and a prompt that includes some or all of a set of criteria (e.g., the set of criteria discussed for block 208). For example, some embodiments may receive a first set of criteria that includes "does the patient have symptoms of tuberculosis?" and then retrieve a record entry that includes a first record note that includes "patient experiencing persistent cough and night sweats" and construct a natural language query using a first template "Using a record note that states: '[record-_data_content]', answer the questions: '[set_of_criteria].'" Some embodiments may then use this first set of criteria, this first record note, and this first template to construct the natural language query "Using a record note that states: 'patient experiencing persistent cough and night sweats,' answer the questions: 'does patient have symptoms of tuberculosis?'"

Some embodiments may execute a language model using the additional natural language query to generate at least a second answer to one or more questions, as indicated by block 328. Some embodiments may perform operations similar to or the same as operations described elsewhere to execute a language model, such as operations described for block 220, block 228 or block 320. For example, some embodiments may send an API request containing a natural language query to a language model running on a cloud computer system, where the endpoint processes the query and returns a result using the language model. The language model can produce results to determine if a related entity meets a set of criteria, utilizing various communication methods like API calls and streaming interfaces. For example, some embodiments may use an API endpoint to submit a query to a language model, such as "Using a record note that states: 'patient experiencing urinary problems and dog-breath, answer the questions: 'does patient have symptoms of urinary problems?'". The language model may then generate an output "yes" and transmit this result to a downstream subsystem through communication methods like HTTP or a WebSocket connection.

Some embodiments may determine whether a combination of the first answer and a set of additional answers satisfies the set of criteria, as indicated by block 332. When determining whether a combination of the first answer and a set of additional answers satisfies the set of criteria, some embodiments may perform operations similar to or the same as operations described elsewhere to determine whether the set of criteria is satisfied, such as operations described for block 232.

It should be understood that determining whether an additional result satisfies a set of criteria may be performed across different records or across different portions of a set of records. For example, a set of criteria associated with a first protocol may include a first criterion that a patient had not eaten pineapples in the last 24 hours, a second criterion that a patient has had heart surgery in the past three years, and a third criterion that a patient was once exposed to botflies. Some embodiments may determine that a combination of a first answer generated with a first record, a second answer generated with a second record, and a third answer generated with a third record satisfies the set of criteria. For example, some embodiments may process the first record with a language model to output an answer indicating that the patient had not eaten pineapples in the last 24 hours, with the second record with the language model to output an answer indicating that the patient underwent heart surgery two years ago, and with the third record with the language model to output an answer indicating that the patient was exposed to botflies during a trip five years ago. By combining these answers, some embodiments may confirm that the patient meets the set of criteria associated with the first protocol even if such information is individually not present in any individual record or portion of text.

In some embodiments, the system may determine that a single criterion is satisfied based on a combination of data retrieved from different records. For example, a computer system may extract or generate a natural language query using a language model to evaluate whether a criterion is met based on data from a first record. If the criterion is not satisfied, the system may then apply the same query or another query using data from other records. In some embodiments, the system may aggregate records or portions of records to compare data. For example, a computer system reasoning engine may aggregate a clinical note from a first record and a clinical note from a second record taken over a two-month period in a context and then apply a prompt "has the patient been ill more than four times in the past two months?" The computer system may receive a first answer "no" based on the first response" and a second answer "no" based on the second response, but by combining the data from the two records in aggregate, may receive an answer "yes." Furthermore, some embodiments may selectively determine which records to combine based on associated timestamps and indications of duration or time periods in a question. For example, if a question included the phrase "last four months," some embodiments may restrict a search of records or record data having timestamps associated with the previous four months from a current time without searching record data associated with timestamps that are further than four months into the past.

Some embodiments may further filter record data by topic when determining an answer to a question. For example, some embodiments may combine a patient's lab notes without combining the patient's physical therapy notes based on a question related to blood measurements when determining an input for an LLM. Furthermore, some embodiments may apply a downstream reasoning engine to aggregate answers based on data from single records. By comparing the answers based on data from multiple records, some embodiments determine one or more criteria are satisfied even when single-record analysis of a criteria would result in a determination that these criteria are not satisfied.

In some embodiments, the process of iteratively determining whether a set of data is satisfied based on answers generated from separate record data or combined record data may reduce hallucinations by increasing the likelihood that answers are provided in their appropriate context and that details are not missed. By analyzing record data one record at a time, some embodiments may avoid the LLM tendency to ignore the middle portion of lengthy text and reduce the likelihood that an inaccurate answer is provided as a result of missing information stored in the body of the record data. Furthermore, by intelligently combining different records based on time or topic instead of performing a default aggregation of all available records, some embodiments using an LLM may maintain this degree of accuracy and reduce hallucinations even when determining answers based on multiple records.

Some embodiments may detect discrepancies between different measurements or information embedded in unstructured data. For example, some embodiments may use a reasoning engine to compare a first answer for a first record with a second answer generated based on text in a second record, where the first answer indicates that a patient stated that he did have asthma as a child, and the second answer indicates that the patient states that he did not have asthma as a child. The reasoning engine may apply a pre-configured heuristic to determine whether a criterion is satisfied, such as a heuristic to favor an answer in a most recent record, a heuristic to search for other data (e.g., search for other statements or data supporting childhood asthma), a heuristic to favor an affirmative answer, etc.

Some embodiments may use the answer generated from the structured data in combination with the answers generated from the unstructured data to determine if the set of criteria is satisfied. Some embodiments may determine that at least one of the questions can be resolved with structured data, map the question to a programmatic query to search the records, and execute the query to retrieve an answer. Some embodiments may then combine this answer with one or more additional answers obtained from a language model, such as answers obtained from a combination of a first answer obtained using operations described for block 320 and additional answers obtained using operations described for block 328. For example, a computer system may identify that a question about a patient's blood pressure can be answered using structured data from the patient's medical record. Responsive to this determination, the computer system may then map the question to a programmatic query configured to search one or more of the records. For example, the computer system may map the question about the patient's blood pressure to a SQL query that retrieves the relevant data from the medical records. The computer system may then provide documents and a first and second questions about diet activity to a language model and retrieve a first answer to the first question based on data stored in a first clinical record and a second answer to the second question based on data stored in a second clinical record. The computer system may then determine that a combination of the first answer, the second answer, and the third answer satisfies a set of criteria indicating eligibility for a weight loss clinical trial.

Some embodiments may determine a text source of a data record used to determine an answer. Some embodiments may generate a set of code using the first answer or the second answer with a second language model. For example, some embodiments may use a second language model to generate code that processes a patient's initial diagnosis and follow-up test results. Some embodiments may identify a first record of the plurality of records based on which the first answer or the second answer are generated using the set of code. For example, some embodiments may use the generated code to identify the specific patient record that provided the initial diagnosis and follow-up test results. Some embodiments may then output an identification of the first record to a user interface of the client device. For example, some embodiments may display the patient's record ID and relevant details on the user interface of the client device to inform the healthcare provider about the source of the diagnosis and test results to help indicate which portions of the record data satisfy one or more criteria.

When determining an answer, some embodiments may implement a reasoning chain. For example, some embodiments may generate a set of intermediate outputs with a language model for a complex set of criteria. Some embodiments may generate an intermediate representation of the first answer based on the first record using the language model and assign a confidence score to this intermediate representation, where a high confidence score may indicate greater confidence in the accuracy of an answer. For example, some embodiments may use a language model to generate an intermediate representation of a patient's diagnosis from their medical record and assign a confidence score indicating the reliability of this diagnosis. Some embodiments may provide the intermediate representation of the first answer and the confidence score to the language model. Some embodiments may then input the intermediate representation of the patient's diagnosis and its confidence score back into the language model for further processing or validation. For example, some embodiments may use a chain-of-reasoning model for glaucoma assessment by building intermediate representations at one or more steps: First, in some embodiments, the model may create a representation of pressure status by providing documented intraocular pressure measurements above 21 mmHg over multiple visits to a language model. This representation may then be used as input for the language model at a next step to answer whether a patient's eye condition satisfies a set of criteria indicating eye deterioration.

Some embodiments may determine whether additional record data is available, as indicated by block 336. Some embodiments may perform operations similar to or the same as those described for other operations to determine whether record data is available, such as operations described for block 236. For example, some embodiments may continue processing records associated with an entity until a set of criteria is satisfied. Some embodiments may examine individual entries or portions of record data with different timestamps within a single record. If the current record does not meet the criteria, some embodiments may move on to the next record or review different portions of the same record.

In response to a determination that there is additional record data for the entity that is available for processing, some embodiments may return to operations described for block 324 to select a new record or record entry for processing. Otherwise, operations of the process 201 may return to operations described for block 316 to select a new available entity associated with a new set of available records for processing.

Some embodiments may generate an alert identifying an entity for a downstream application (e.g., for a protocol, such as a clinical trial or observational study, for a registry, etc.) responsive to determining that the set of criteria is satisfied, as indicated by block 340. Some embodiments may perform operations similar to or the same as those described for generating an alert or performing other operations after determining that a set of criteria is satisfied as described elsewhere in this disclosure, such as operations described for block 240 or block 440. In the case that additional answers were determined after first determining a first answer, some embodiments may generate an alert identifying an entity for a protocol in response to determining that the combination of at least the first answer and one or more additional answers satisfy the set of criteria. In some implementations, if the first answer was sufficient, then some embodiments may generate an alert identifying an entity for a protocol in response to determining that the combination of at least the first answer and one or more additional answers satisfy the set of criteria.

Some embodiments may determine that an entity's record data satisfies a set of criteria and select the entity for downstream operations. For example, a computer system may determine that a patient's data satisfies the set of criteria for inclusion in a clinical trial, an observational study, or implementation study, or, in a registry. The computer system may then send the entity identification to a client device for presentation on a graphical display. Upon receiving the entity identification, the client device may present an alert notification to a user that displays the added information. For example, the client device may display a patient's full name, a unique trial ID, assigned trial group, scheduled trial date, and contact email address in a clear, hierarchical format.

As an example, some embodiments may receive a criteria for a trial 103351a and retrieve records for a first patient 15256166742. Some embodiments may then collect structured data for the first patient and generate a first set of answers for a first set criteria based on the structured data. Some embodiments may then generate questions based on one or more other criteria and provide the questions in conjunction with record data to an LLM to generate a second set of answers. When generating the second set of answers, some embodiments may iteratively provide, as inputs, questions and data from a single record or single piece of unstructured data from the records of the first patient, where the LLM may iteratively output additional answers. Some embodiments may then compare the answers from the multiple records and the unstructured data to determine that the first patient satisfies the applicable criteria. For example, some embodiments may output a data table that lists patient-related data that includes a medical record number or another type of patient identifier (e.g., "MRN: 15256166742"), a date of patient identification (e.g., "10/ 20/20XX"), the answers to one or more criteria ("patient over 18? 'Yes'"), a trial identifier (e.g., "TrialID: 103351a"), etc.

Figure 4A:
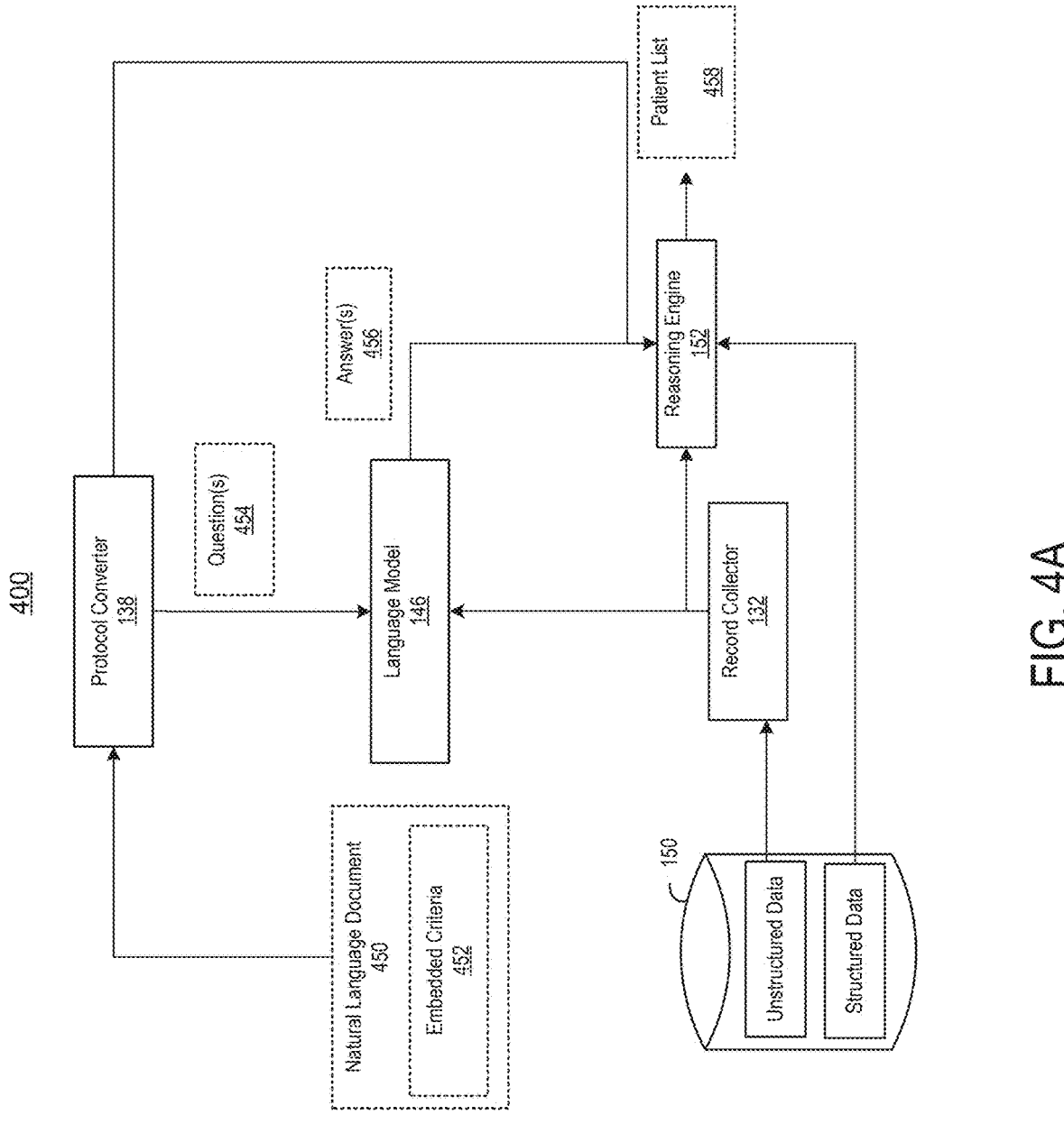
FIG. 4A illustrates an example system for reducing language model hallucinations for patient identification, in accordance with an implementation.

Part D: Natural Language Framework for Language Model-Based Entity Identification FIG. 4A illustrates an example system 400 for reducing language model hallucinations or other language model-based errors for entity identification, in accordance with an implementation. As shown in the example system 400, a natural language document 450 includes a set of embedded criteria 452, which may be processed by the criteria converter 138 to produce a set of questions 454. Additionally, the record collector 132 may obtain data from the database 148. The language model 146 may receive the set of questions 454 and the data collected by the record collector 132 and output a set of answers 456 to the reasoning engine 152, which may also receive the set of questions 454 and may also retrieve record data from the database 148. The reasoning engine 152 may then provide a final determination on whether a patient satisfies a set of criteria, where the output of the reasoning engine 152 may be used to update a patient list 458.

Some embodiments may provide the natural language document 450 containing the set of embedded criteria 452 to a criteria converter 138. The criteria converter 138 may extract the set of embedded criteria 452 from the natural language document 450 and generate the set of questions 454. In some embodiments, the set of questions 454 may directly include one or more criteria from the set of embedded criteria 452. For example, if the set of embedded criteria 452 includes the phrase "does the patient have gout?", the criteria converter 138 may then generate the set of questions 454 to directly include the phrase "does the patient have gout?"

Some embodiments may obtain structured and unstructured data from the database 148 using the record collector 132. Some embodiments may then provide the obtained data and the set of questions 454 to the language model 146. The language model 146 may then generate a set of answers 456 that are provided to the reasoning engine 152. The reasoning engine 152 may make a final determination on entity eligibility for a list of entities based on the set of answers 456, record data collected from the database 148, and a set of complex conditional logic provided by the criteria converter 138. Some embodiments may then update a patient list 458 based on the output of the database 148. For example, based on a determination that a patient is eligible for a clinical trial, some embodiments may update the patient list 458.

In some cases, instead of determining whether a patient is eligible for a clinical trial, some embodiments may determine whether individuals are to be added to a registry. For example, satisfaction of the set of criteria may not correspond to a clinical study, but rather may correspond to whether an entity is eligible to be added to a registry (e.g., a registry including a list of individuals with a specific disease). The system can determine different individuals satisfy the set of criteria and transmit a message to a computing device maintaining or otherwise associated with the registry to add the individuals to the registry.

In some cases, some embodiments may determine whether individuals being monitored for an observational study have one or more characteristics (e.g., an observational study of changes in individuals over time, such as based on some intervention (e.g., a medication application)). For example, satisfaction of the set of criteria may correspond to whether an entity has a characteristic (e.g., meets a weight loss threshold, a strength threshold, a respiratory rate threshold, etc.) associated with the observational study. The system can determine different individuals that have the characteristic and transmit a message to a computing device associated with the observational study.

Some embodiments may use components of the system 400 or other components described in this disclosure to perform operations to isolate patient clusters with shared traits based on a known condition. To find common characteristics associated with a disease, the system 400 may collect patent data that includes both people with and without a known disease or condition, along with various features about each person such as demographic information, medical history, lifestyle factors, and biological markers. The computer system may also use a language model to detect additional characteristics from unstructured data about the person, where the input to the language model may include clinical notes.

The computer system may employ one or more machine learning approaches to determine which set of patient characteristics should be associated with a disease. Some embodiments may apply a logistic regression model to determine interpretable coefficients showing how strongly each characteristic correlates with the disease. Some embodiments may apply a random forest analysis to determine which characteristics most strongly predict the disease. Some embodiments may use clustering techniques to identify subgroups within the disease population that share similar characteristics.

Some embodiments may detect features in unstructured text or other unstructured data using a language model. Some embodiments may use the language model 146, another language model, or another language algorithm to generate features based on structured or unstructured data, where the outputs of such models or algorithms may include tokens, key phrases, embedding vectors, other types of vectors, or other types of values. For example, some embodiments may determine a set of semantic vectors representing phrases, sentences, or paragraphs of clinical notes of a set of patients indicated to share an illness "Z123" using a clustering algorithm. Some embodiments may then determine a set of characteristics based on the clustering algorithm. For example, some embodiments may detect that embedding space vectors related to the works or phrases "highly irritable," "nervous tic," and 'tremors" are correlated with the illness "Z123" by generating the embedding space vectors using one or more language models and applying clustering operations to the generated embedding space vectors.

Some embodiments may perform similar operations for vectors derived from structured data, such as vectors computed based on blood pressure data and body temperature data. As an example of detecting features using structured data from patient records, some embodiments may receive a list of patients associated with the known condition "illness XY321." Some embodiments may then convert the structured data for each patient into a set of vectors by using the values directly, determining an average from the values, or otherwise aggregating values. For example, some embodiments may determine an average blood pressure over a 72-hour period, an average body temperature over a 72-hour period, a range of for these two measurements, and construct vectors based on these values. Some embodiments may further apply feature selection or feature synthesis techniques to isolate features or generate new features for inclusion in the vector space. Some embodiments may then apply clustering techniques to detect value clusters that are correlated with the condition "illness XY321." For example, by applying clustering techniques on a set of vectors constructed from structured data, some embodiments may detect that the combination of blood pressure readings greater than "130/80" and low body temperature less than 36.1 degrees Celsius is associated with "illness XY321."

Some embodiments may combine values derived from structured data and unstructured data to construct a set of latent vectors that can be mapped to combinations of structured data and unstructured features. For example, some embodiments may construct mixed vectors that include a first set of values generated from structured data (e.g., recognized illness names or categories of illnesses, quantitative or categorical data such as blood readings, blood chemical measurements, etc.) and a second set of values generated from unstructured data (e.g., vectors representing phrases, sentiment, uncategorized diagnosis, etc.). Some embodiments may then apply clustering or other techniques to determine correlations between vectors and patient conditions. For example, by applying clustering techniques on a set of vectors constructed from structured and unstructured data for patients indicated to be infected with "Abc6613." Some embodiments may detect that the combination of blood pressure readings greater than "130/80" and phrases such as "preference for salty food" is associated with "Abc6613."

Figure 4B:
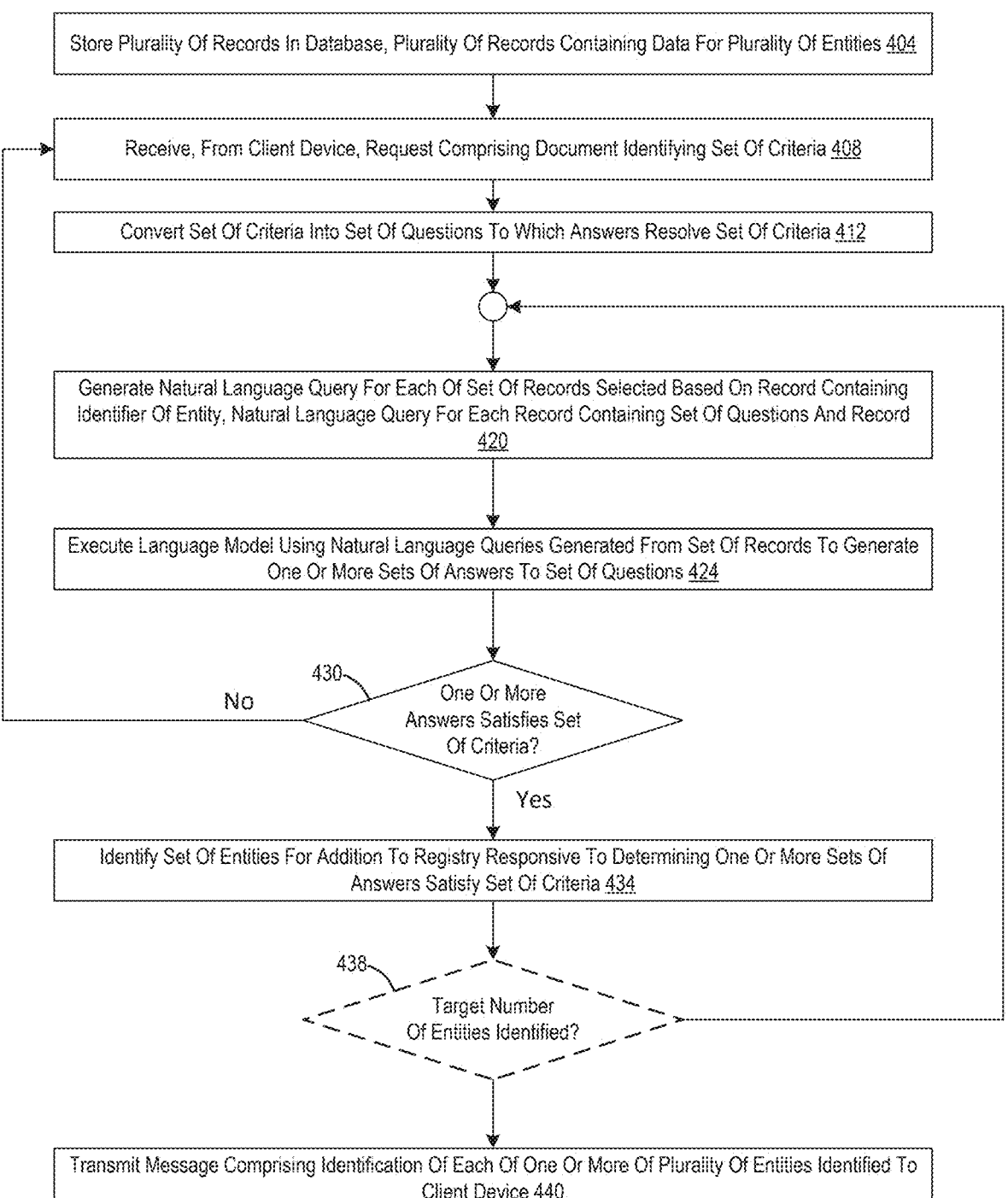
FIG. 4B illustrates an example flowchart of a process for reducing language model hallucinations for patient identification, in accordance with an implementation.

FIG. 4B illustrates an example flowchart of a process 401 for reducing language model hallucinations for entity identification, in accordance with an implementation. The process 401 includes a block 404 indicating operations to store records in a database. The block 404 is followed by a block 408 indicating operations to receive a request. The block 408 is followed by a block 412 indicating operations to convert a set of criteria into questions. The block 412 is followed by a block 420 indicating operations to execute a language model to determine a first answer. The block 420 is followed by a block 424 indicating operations to execute the language model to determine one or more answers. The block 424 is followed by a block 430 indicating operations to determine whether one the one or more answers satisfies the set of criteria. The block 430 is followed by a block 434 indicating operations to identify a set of entities that meet the applicable criteria. The block 434 indicates operations to determine whether a target number of entities has been identified, and is followed by block 440 or block 420, where the block

440 indicates operations to transmit a message that includes the one or more identifications of the set of entities.

Some embodiments may store a plurality of records in a database, with each of the plurality of records containing data for a plurality of entities, as indicated by block 404. Some embodiments may perform operations similar to or the same as those described for other operations to store a plurality of records in a database, such as those described for block 204 or block 304. For example, some embodiments may store a plurality of records in a database representing device entities, where each record contains a set of data for an entity, such as the device name, identification number, and network configuration for a network device.

Some embodiments may receive, from a client device, a request including a document identifying a set of criteria, as indicated by block 408. In some cases, the request can include a target number of entities, such as a number of entities for inclusion in a protocol or registry. Some embodiments may perform operations similar to or the same as those described for other operations to receive requests, such as those described for block 208 or block 308. For example, a computer system may receive a request having (1) a natural language document for one or more clinical trials, where the clinical trials may correspond to a set of criteria associated with a search for patients for participating in the clinical trial, and, in some cases, (2) a number indicating the total number of patients required for the clinical trial. The request may not include a target number of entities in some cases, such as when the computer system is identifying entities for a registry or for other downstream applications.

The target number of entities may be a value indicated in the same set of text used to retrieve the set of criteria. For example, some embodiments may obtain a document and provide the document to a language model that then outputs both a set of criteria for a clinical trial and an indication that the target number of entities is 100 patients for the clinical trial. Some embodiments may obtain a target number of entities directly via terminal instructions, a user interface entry, etc.

Some embodiments may assign categories to one or more criteria, such as priority categories that indicate that a criterion is required or not required. Some embodiments may assign a category to each criterion of the set of criteria, the category indicating whether the criterion is required or not. Some embodiments may determine the first subset of the set of criteria based on the one or more answers satisfying each criterion assigned into a required priority. For example, a computer system may categorize criteria extracted from a clinical trial document, such as marking "age between 18 and 65" as a required criterion and "non-smoker" as an optional criterion. As described elsewhere in this disclosure, some embodiments may later perform operations to determine if one or more language model outputs (e.g., answers) satisfies a set criteria (e.g., such as in operations disclosed for block 430). When performing such operations, some embodiments may then evaluate records to determine if the required criteria (e.g., age and diagnosis) are satisfied before considering optional criteria (e.g., lifestyle factors).

Some embodiments may assign criteria within a set of criteria as early exit criteria. Early exit criteria may be or include individual criteria or combinations of criteria (e.g., combinations or subsets of multiple criteria) that, if satisfied, indicates a set of criteria of which the early exit criteria is a part is satisfied without other criteria of the set of criteria being satisfied. For example, a set of criteria can include an early exit criterion of "blood pressure above 140/90." The system can determine the set of criteria is satisfied based only on the early exit criterion being satisfied by one or more sets of answers generated as described herein. The set of criteria may be satisfied in other manners when other criteria of the set of criteria is satisfied, but the early exit criterion by itself can indicate the set of criteria is satisfied for downstream application. By using the early exit criteria in this manner, the system can reduce the processing resources to search through the records using the systems and methods described herein by avoiding extra processing of records for an entity to determine whether each of the search criteria (e.g., the set of criteria) is satisfied.

Some embodiments may assign criteria within a set of criteria as exclusion criteria. Exclusion criteria may be or include individual criteria or combinations of criteria (e.g., combinations or subsets of multiple criteria) that, if satisfied, indicates a set of criteria of which the exclusion criteria is a part is not satisfied, regardless of whether criteria of the set of criteria is satisfied. For example, a set of criteria can include an exclusion criterion of "age below 5 years old." The system can determine the exclusion criterion is satisfied by one or more sets of answers generated as described herein. Responsive to the determination, the system can determine the set of criteria cannot be or is not satisfied for the entity being processed. Based on the determination, the system can stop evaluating records for the entity and/or initiate processing of records of a different entity to determine whether the different entity satisfies the set of criteria. By using the exclusion criteria in this manner, the system can reduce the processing resources to search through the records using the systems and methods described herein by avoiding extra processing of records for an entity that can no longer satisfy the search criteria (e.g., the set of criteria).

Some embodiments may convert a set of criteria into a set of questions to which answers resolve the set of criteria, as indicated by block 412. For example, some embodiments may provide a language model with a text document containing requirements, questions, or a framework for selecting a set of entities for a clinical trial, observational or other type of study. Some embodiments may provide the document to the language model through an API call and request semantic parsing that includes the identification of requirements for the protocol.

Some embodiments may generate a natural language query for each of a set of records selected based on the record containing an identifier of an entity, with the natural language query for each record containing a set of questions and the record, as indicated by block 420. Some embodiments may perform operations similar to or the same as those described for other operations to generate a query, such as those described for block 216, block 224, block 316, or block 324. For example, some embodiments may generate a natural language query for each of a set of patient records selected based on the record containing an identifier of a patient, with the natural language query for each record containing a set of questions and the record data. For example, if a patient record contains the identifier "Patient123" and includes a set of clinical notes, the natural language query may include the set of clinical notes as an input context and the prompt "Using the clinical notes for Patient123, answer the questions: 'Does the patient have symptoms of diabetes?'".

Some embodiments may perform an iterative process for identifying which entities satisfy a set of criteria, such as a set of criteria indicating eligibility for inclusion in clinical research or to add to a registry. Some embodiments may generate a first natural language query that includes a set of questions and a first record of the set of records that includes an identifier of the entity. For example, some embodiments may generate a natural language query that includes questions about a patient's symptoms and a specific medical record that contains the patient's identifier and medical history. Some embodiments may then execute the language model using a first natural language query to generate at least a first answer to the set of questions and using a second natural language query to generate at least a second answer to the set of questions. By analyzing individual clinical notes or other record data using a language model in an iterative fashion, some embodiments may significantly reduce the likelihood of a language model outputting hallucinations. Such operations may avoid hallucination or inaccuracy problems created by the over-inclusion of text in a language model input.

As an example of performing an iterative process, a computer system may iteratively construct a first query to answer questions about a patient's heart pain based on a first note and then construct a second query to answer questions about the patient's hunger. At each iteration, the computer system may then provide the respective query to the language model to generate the respective first answers, resulting in the first and second answers. Furthermore, it should be understood that some embodiments may perform similar operations to iterate through more than two records to generate additional answers. Some embodiments may then iteratively perform these record iterations for each entity in a set of available entities until a target number of entities that satisfy the set of criteria are found.

Some embodiments may stop an iteration across records or record data for an entity if all criteria of a set of criteria to determine eligibility for the entity is satisfied. Some embodiments may stop iterating through a set of records for an entity after determining that a subset of criteria needed to satisfy the set of criteria is satisfied. Some embodiments may only use a subset of the set of records to determine the set of criteria is satisfied. Some embodiments may stop iteration for the entity responsive to the determination that the set of criteria is satisfied. For example, even if a patient has five records, some embodiments may stop iterating after processing the third record using operations described in this disclosure. By stopping an iteration, some embodiments may significantly reduce the computational cost of using a language model.

Some embodiments may retrieve one or more records from the database based on the records containing the identifier of the entity. For example, some embodiments may retrieve multiple patient records from a database using the patient's identification number. Furthermore, some embodiments may select the set of records from the retrieved records based on the relevance of each record to at least one criterion of the set of criteria. For example, some embodiments may select patient records that are most relevant to the criteria for a clinical trial for a particular treatment or inclusion in an observational or implementation study or inclusion in a registry, such as those containing information about hypertension. Determining relevance may include determining relevance based on semantic similarity using an embedding model, where the embedding model itself may be static or dynamic.

Some embodiments may retrieve records that are within a defined time period. Some embodiments may identify a timestamp of each of the one or more records containing the identifier of the entity. For example, some embodiments may identify the timestamps of various medical records associated with a patient, such as visit notes, lab results, and prescription records. Some embodiments may then select a set of records for analysis based on each record of the set having a timestamp within a defined time period. For example, after receiving a message defining an analysis time period of six months, some embodiments may select medical records of a patient that were created within the last six months and ignore all records falling outside this boundary. Some embodiments may then use these selected records as inputs for a language model and to answer queries.

Some embodiments may execute a language model using natural language queries generated from a set of records to generate one or more sets of answers to a set of questions, as indicated by block 424. Some embodiments may perform operations similar to or the same as those described for other operations to execute a language model, such as those described for block 220, block 228, block 320, or block 328. For example, some embodiments may execute a language model using natural language queries generated from a set of medical records to generate one or more sets of answers to a set of questions. For example, some embodiments may provide a language model with a first query "Using the clinical notes for Patient123, answer the questions: 'Does the patient have symptoms of diabetes?'" The language model may then process this first query to generate an answer, such as "yes." Furthermore, the language model may be configured to detect which portions of structured or unstructured data was used to determine the answer. For example, the language model may cite a specific record or a specific excerpt from a clinical note record used to generate an answer.

When executing a language model based on queries and a set of records, some embodiments may iteratively process the set of records in a reverse chronological order that is limited to a time range indicated by a protocol. For example, some embodiments may construct a first input that includes a most recent clinical note for a first patient and a set of questions and submit the first input to the language model to obtain a first set of answers. After determining that the set of criteria is not satisfied based on the first set of answers, some embodiments may then construct a second input that includes a second-most recent clinical note for the first patient and the set of questions. Some embodiments may then submit the second input to the language model to obtain a second set of answers. In response to determining that the second set of answers satisfies the set of criteria, some embodiments may then stop further use of the language model for records from this first patient.

When executing a language model based on queries and a set of records, some embodiments may use the combined data of multiple records or portions of records or use the combined answers of multiple records to determine whether a set of criteria is satisfied. For example, some embodiments may construct a first input that includes a first clinical note for a first patient and a set of questions and submit the first input to the language model to obtain a first set of answers. Some embodiments may then construct a second input that includes a second clinical note for the first patient and the set of questions. Some embodiments may then submit the second input to the language model to obtain a second set of answers. Some embodiments may then compare the first set of answers and the second set of answers to determine whether one or more criteria is satisfied. For example, after obtaining a criterion that a patient had felt a particular symptom for all of the four-month period, some embodiments may compare the answers generated based on multiple clinical notes from multiple records generated over the four-month period to determine whether the criterion was satisfied.

Some embodiments may generate a natural language query for each record of a set of records responsive to determining structured data from records associated with an entity (e.g., the record includes the identifier of the entity) does not satisfy a set of criteria. For example, some embodiments may generate a programmatic query to search through the structured portion of patient databases to determine whether a set of criteria including a first criterion that a resting heart rate exceeding 100 beats per minute and a second and an alternative criterion that a patient has vision problems outdoors is satisfied. Some embodiments may determine, for a first record for a first entity, that the first criterion is satisfied and, in response, forgo operations to use a language model for records of the entity. Some embodiments may determine, for a second record for a second entity, that the first criterion is not satisfied and, in response, generate a natural language query based on the second record and other records associated with the second entity. The computer system may then use the language model to generate answers for the first and second criteria for the second entity.

Some embodiments may normalize outputs of a language model. Some embodiments may execute an encoder-decoder model to normalize the one or more sets of answers. For example, some embodiments may use an encoder-decoder model to standardize the format of answers derived from various patient records to increase consistency in the format that information is provided and ensure accurate downstream processing. Some embodiments may then determine the normalized one or more sets of answers that satisfy the set of criteria. For example, the computer system may evaluate the standardized answers from patient records to confirm that they meet the specific criteria required for a clinical trial or other clinical research or treatment pathway.

Some embodiments may determine whether one or more answers satisfy the set of criteria, as indicated by block 430. Some embodiments may determine that a set of criteria is satisfied if every criterion is satisfied. For example, some embodiments may evaluate a patient's records to determine if the patient meets the criteria for a clinical trial for a particular treatment or inclusion in an observational or implementation study or inclusion in a registry. Some embodiments may determine that a set of criteria includes three requirements: the patient's age must be between 18 and 65, the patient must have a diagnosis of hypertension, and the patient must not have a history of heart disease. Some embodiments may check a structured data table in a record to determine that the patient's age falls within the specified range. Some embodiments may further check that the patient's medical records include a diagnosis of hypertension, and confirm that there is no record of heart disease in the patient's health history, based on a first and second answer output by a language model. Some embodiments may then determine that all three criteria are satisfied and, in response, determine that the patient is eligible for the clinical trial or inclusion in an observational or implementation study or inclusion in a registry.

Some embodiments may determine that a set of criteria is satisfied based on alternative conditions of a criteria, additive conditions, or other combinations of conditions that permit a set of criteria to be satisfied even if not every criterion of the set of criteria is satisfied. Some embodiments may determine whether the set of criteria is satisfied responsive to determining that a first subset of the set of criteria is satisfied and identify a second subset of the set of criteria that was not satisfied by the one or more sets of answers. Some embodiments may then generate a message to include an association between the second subset of the set of criteria and the identifier of the entity in the message. For example, some embodiments may evaluate a patient's health records and determine that the patient meets the criteria for a clinical trial or inclusion in an observational or implementation study or inclusion in a registry if the patient satisfies a subset of the criteria, such as blood type and a history of blood in stool, even if other criteria are not yet evaluated or not satisfied. For example, some embodiments may review a patient's health records and identify that while the patient meets the criteria for blood type and a history of blood in stool, the records do not include data satisfying the criteria for specific lab results. The computer system may then create a message that links the specific lab results with the patient's identifier to indicate a user about criteria that may need further evaluation.

Some embodiments may identify an entity responsive to determining that one or more sets of answers satisfy a set of criteria, as indicated by block 434. Some embodiments may detect that a set of criteria is satisfied based on one record associated with an entity. For example, if a patient's medical record indicates that they have a history of high blood pressure and recent lab results show elevated cholesterol levels, some embodiments may use a first language model to extract a criteria indicating high blood pressure and cholesterol levels for a risk assessment and then use a second language model or the same first language model to determine that the set of criteria is satisfied based on using the patient's medical record as context.

Some embodiments may determine whether a target number of entities is identified for inclusion in a list, for example for a clinical trial, observational study, implementation study, a registry, as indicated by block 438. Some embodiments may iteratively, for each entity of a plurality of entities, perform operations described above to generate queries and provide these generated queries to a language model to obtain answers or other types of results usable to select one or more entities. For example, some embodiments may perform one or more operations described for block 420, block 424, block 430, or block 434. Some embodiments may continue to perform such an iterative search until either identifying the target number of entities or completing the iteration through the entirety of a plurality of entities available in one or more databases.

Some embodiments may use a counter to determine whether a target number of entities or some other type of threshold is satisfied. Some embodiments may increment a counter responsive to determining that the one or more sets of answers satisfy the set of criteria. Some embodiments may then determine that a target number of entities have been identified based on the incremented counter. For example, a computer system may increase a counter each time a patient's health records meet the criteria for example, for a clinical trial, observational study, implementation study, or inclusion in a registry. The computer system may then use the incremented counter to verify that the desired number of patients have been identified, where the computer system may stop additional operations to use a language model once the counter matches or exceeds a target number of entities.

Some embodiments may be triggered to repeat one or more operations described in this disclosure after detecting an update to a database. Some embodiments may detect an update to the database and, for each respective entity of a plurality of entities determined not to satisfy a set of criteria, repeat an iteration of a set of operations that includes processing records in the database associated with an entity (e.g., includes an identifier of the respective entity) to determine whether answers generated from the data of the records satisfy the set of criteria. For example, a computer system may monitor a patient database to detect the addition of new or modified patient records while evaluating patient eligibility, for example, for a clinical trial or clinical research or inclusion in a registry. The computer system may then re-evaluate patient records that initially did not meet the criteria by processing any new or updated records to check if the patient now satisfies the eligibility requirements.

Some embodiments may transmit a message including the identification of each of one or more of a plurality of entities identified as meeting the applicable criteria to a client device, as indicated by block 440. Some embodiments may transmit a message that includes at least one entity identifier, where the entity may be added to a list of entities. Some embodiments may send a single entity identifier or a small number of entity identifiers as updates to an existing list of entities. Some embodiments may send the entirety of a list of entities to a client device or other computer system to update a list of entities. For example, some embodiments may identify the following patients for inclusion in a clinical trial, observational study, implementation study, or a registry: Patient ID: 12345, Patient Name: John Doe, Medical Condition: Hypertension; Patient ID: 67890, Patient Name: Jane Smith, Medical Condition: Diabetes; Patient ID: 54321, Patient Name: Robert Brown, Medical Condition: Asthma. Some embodiments may send this message to the client device to update the applicable list with the identified patients.

Figure 4C:
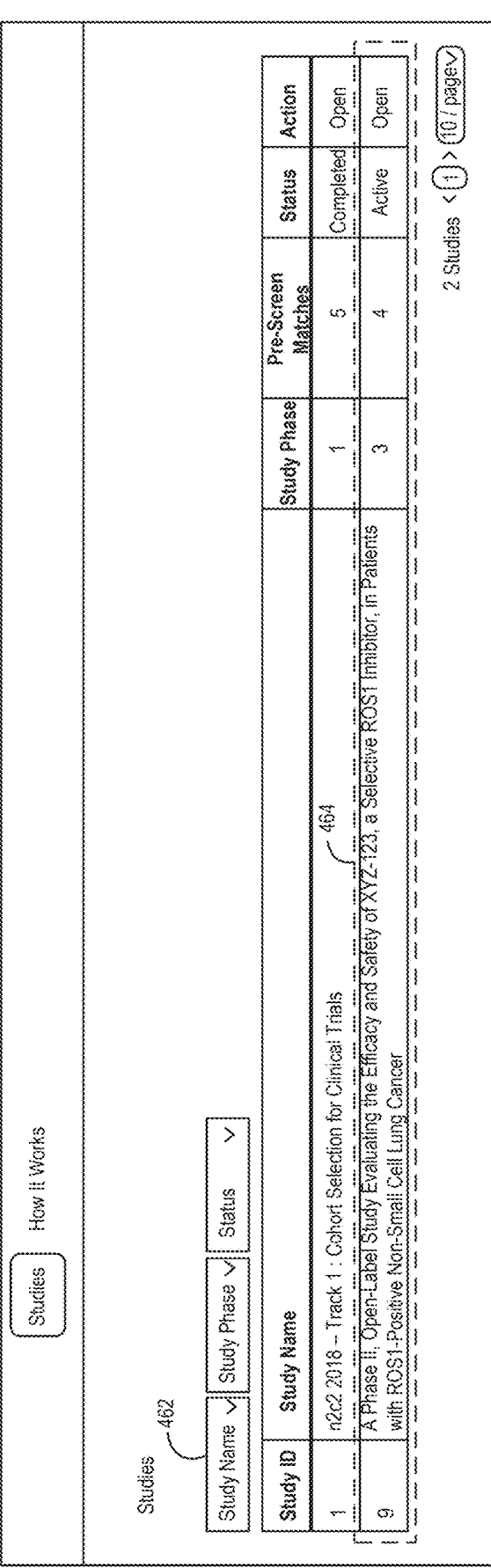
FIG. 4C illustrates a first example user interface, in accordance with an implementation.

FIG. 4C illustrates a first example user interface, in accordance with an implementation. A user interface 460 may include a list of clinical studies and their associated data. For example, the user interface 460 depicts a row 464 that indicates a set of study identifiers (e.g., the study ID and the study name), the phase of the study, the number of matches found for the study, the status of the study, and whether the study is open or not open. In some embodiments, a user may retrieve data for a study by entering study name or study identifier into a search field 462.

Some embodiments may use the data linked to by the user interface 460 to obtain protocol information criteria information used for block 408. For example, when constructing the data shown in row 464, some embodiments may obtain test information and criteria information from the same document used to provide data described for the block 408.

Figure 4D:
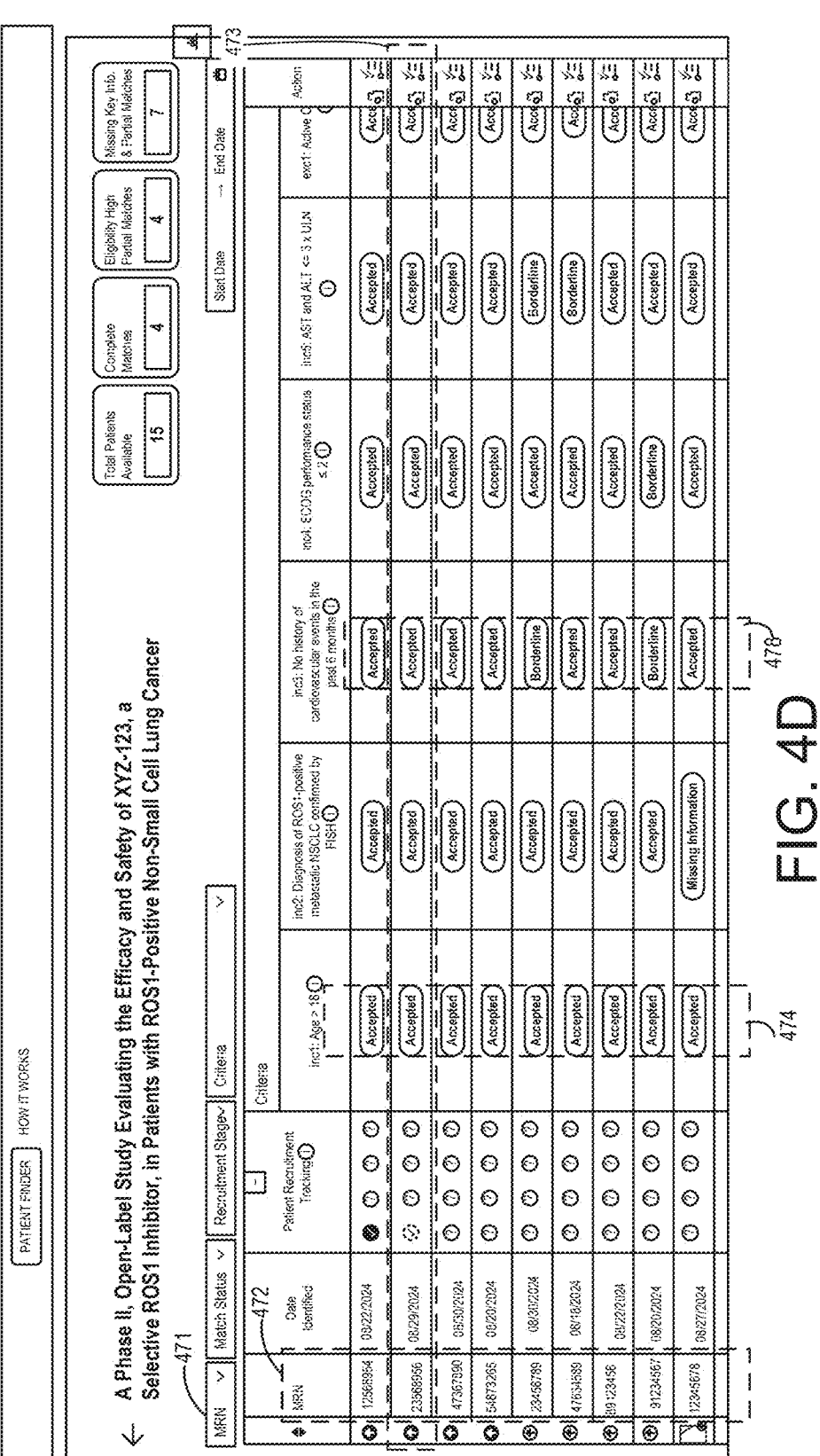
FIG. 4D illustrates a second example user interface, in accordance with an implementation.

FIG. 4D illustrates a second example user interface, in accordance with an implementation. In some embodiments, a user may interact with (e.g., click on) the row 464 or another portion of the user interface 460 to access a user interface 470. The user interface 470 may include a list of patients selected as eligible for a clinical trial, where the selection of such patients may be performed using operations described for block 438 or block 440. The user interface 470 may show patient data for individual patients, such as data shown in a row 473. The patient data shown in each row may include patient identifier information (as shown by data corresponding with a column 472), age information (as shown by data corresponding with a column 474), or cardiovascular history data (e.g., (as shown by data corresponding with a column 478). In some embodiments, a user may retrieve data for a study by entering study name or study identifier into a search field 471.

When constructing the user interface 470, some embodiments may use patient data obtained using operations described for block 404 and identified using operations described for block 434. For example, a computer system may obtain patient data shown in row 473 by retrieving patient data from a database. The computer system then may then identify the patient shown in row 473 by performing operations described for block 434.

Figure 4E:
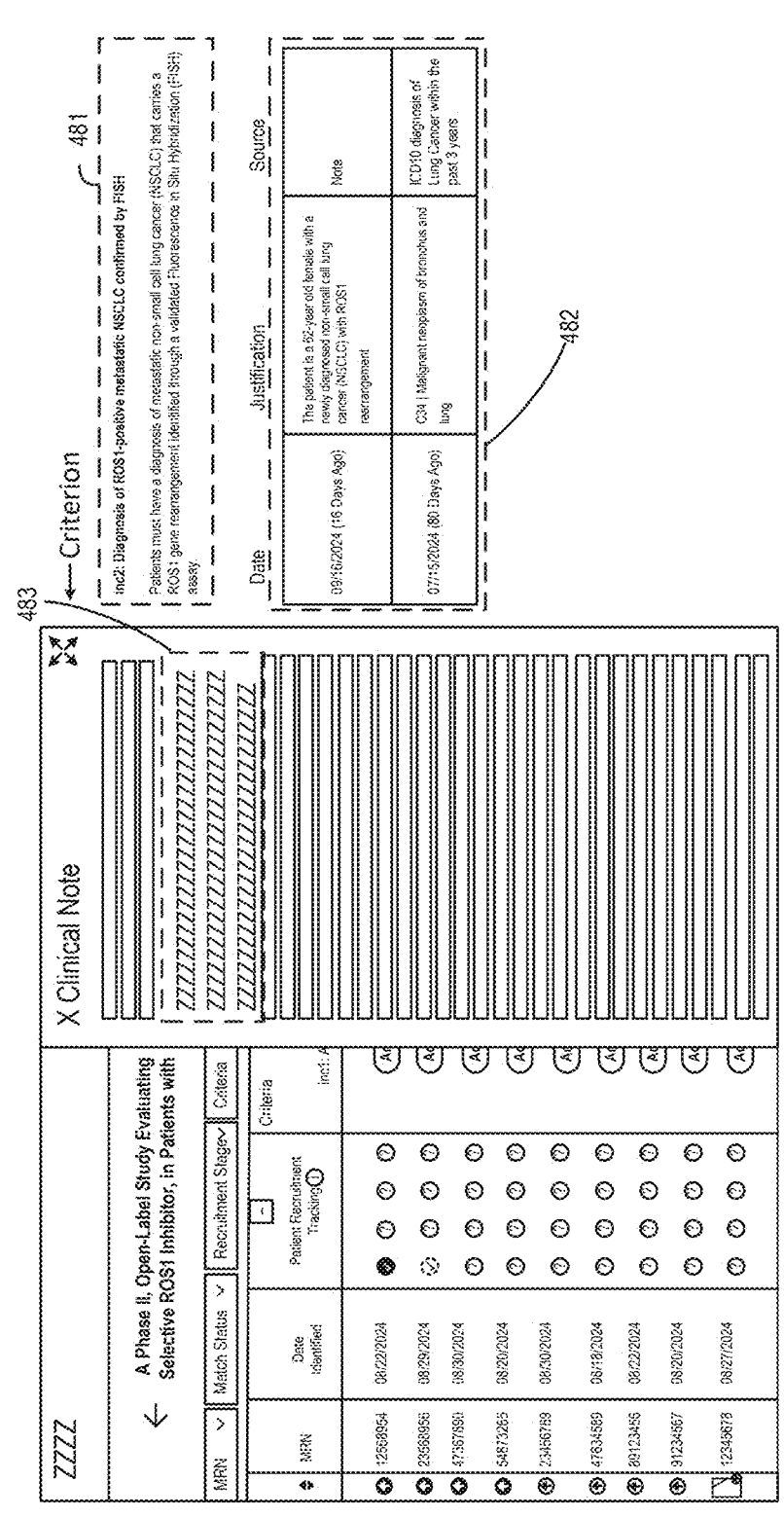
FIG. 4E illustrates a third example user interface, in accordance with an implementation.

FIG. 4E illustrates a third example user interface, in accordance with an implementation. In some embodiments, a user may interact with a row in the user interface 470 or another portion of the user interface 470 to access a user interface 480. The user interface 480 may present a criterion 481 for the study and then indicate records 482 to indicate record data used to support a determination that the criterion 481 is satisfied. Additionally, the user interface 480 may present an excerpt 483 from a record to indicate which part of a text is used to justify a determination that the criterion 481 is satisfied.

When constructing the user interface 480, some embodiments may use data obtained by performing one or more operations described for block 424. For example, a computer system may execute a language model to determine an answer to the criterion 481, where the answer may include an indication of the records 482 and the excerpt 483. Some embodiments may then send, to a client device for display in the user interface 480, the text and data necessary to generate the criterion 481, the records 482, and the excerpt 483.

FIG. 4F illustrates a fourth example user interface, in accordance with an implementation. In some embodiments, a user may interact with a portion of the user interface 470 to access a user interface 490. The user interface 490 may, via a table 491, present the status for whether various criteria for a study have been satisfied with respect to a patient. For example, a column 493 may indicate an assessment of the set of criteria shown in table 491 with respect to whether or not the answer for each respective criterion of the set of criteria is acceptable for a study. Furthermore, table 491 may include a column 492 that provides justifications, which may include portions of record data to support an assertion.

When constructing the user interface 490, some embodiments may use data obtained by performing one or more operations described for block 424. For example, a computer system may execute a language model for multiple queries and for multiple records to determine the answers shown in column 493. Similarly, some embodiments may further use the answers provided by operations described for block 424 to determine the support indicated by column 492. Some embodiments may then send to a client device for display in the user interface 490, the text and data necessary to generate the table 491.

Some embodiments may perform operations described in this disclosure to construct the data shown in the user interface 460, the user interface 470, the user interface 480, or the user interface 490. For example, a computer system may store a plurality of records in a database, each containing data for various patients, including the patient 23568956 shown in row 473 in the user interface 470. The computer system may also receive protocol data, such as criteria data embedded in a natural language document for a protocol represented by row 464. The computer system may then perform operations described for block 408 or block 412 to extract criteria from this natural language document and provide the extracted criteria to the client device to present in the user interface 480. The computer system may then perform operations described for block 420 to determine questions, such as a question on whether the patient has had no history of cardiovascular event in the past 6 months for the patient 12568954. Some embodiments may then perform operations for block 424, block 430, block 434, or block 438 to determine answers based on patient record data, such as the data indicating that a patient has had no history of cardiovascular events in the past 6 months as indicated by table 491 in the user interface 490.

Example Embodiments

In some embodiments, the systems and methods described herein may be used to identify patients for a clinical trial. For instance, a system may receive, from a client device, a request. The request can include (1) one or more natural language documents indicating the qualifications of individuals that are needed to be eligible for a clinical trial, and, in some cases, (2) a target number of entities indicating a number or maximum number of entities to include in the clinical trial. The system may convert the qualifications into one or more questions (e.g., natural language questions) and/or sets of criteria (e.g., Boolean criteria, thresholds, etc.) that can be satisfied by answers to the one or more questions. An example of a question may be "what is the blood pressure of the entity." A corresponding criterion to the question can be "blood pressure above 140/90." The system can convert the qualifications into any number of questions and/or corresponding criteria. The system can use the systems and methods described herein to identify a target number of entities for the clinical trial. Based on the identification, the system can transmit identifications of the entities to the client device. The client device can receive the identifications of the entities. Based on the receipt, the client device can add (e.g., automatically add or add responsive to a user input, such as from a clinician) the entities of the identifications to the clinical trial.

In some embodiments, the systems and methods described herein may be used to perform observational studies. For instance, a system may receive, from a client device, a request. The request can include one or more natural language documents indicating different characteristics of individuals that are being monitored in an observational study. The system may convert the characteristics into one or more questions (e.g., natural language questions) and/or sets of criteria (e.g., Boolean criteria, thresholds, etc.) that can be satisfied by answers to the one or more questions. An example of a question may be "did the individual experience weight loss of at least 10 percent over the course of a month?" A corresponding criterion to the question can be "weight loss above 0.1." The system can convert any number of characteristics into questions and/or corresponding criteria. The system can use the systems and methods described herein to identify individuals participating in the observational study that satisfy the different criteria or that have the characteristics being monitored, in some cases maintaining a list of those that satisfy or have the characteristics and/or those that do not satisfy or have the characteristics. The system can transmit identifications of the entities or lists to the client device, in some cases in response to determining a time period (e.g., time period of the observational study) has ended, in response to a time interval ending, and/or in response to a request from the client device. The client device can receive the identifications of the entities. Based on the receipt, the client device can generate a user interface identifying the entities.

In some embodiments, the systems and methods described herein may be used to add entities or individuals to a registry. For instance, a system may receive, from a client device, a request. The request can include one or more natural language documents indicating different characteristics for a registry maintained by the client device or a system associated with the client device. The system may convert the characteristics into one or more questions (e.g., natural language questions) and/or sets of criteria (e.g., Boolean criteria, thresholds, etc.) that can be satisfied by answers to the one or more questions. An example of a question may be "what was the patient's blood sugar level over the course of the last year." A corresponding criterion to the question can be "blood sugar level above 180 mg/dl." The system can convert any number of characteristics into questions and/or corresponding criteria. The system can use the systems and methods described herein to identify individuals for which records are stored by the system that satisfy the different criteria for the registry, in some cases maintaining a list of those that satisfy the criteria. The system can transmit identifications of the entities to the client device. The client device can receive the identifications of the entities. Based on the receipt, the client device can add the identifications of the entities to the registry.

In some embodiments, the systems and methods described herein may be used to detect miscoding (e.g., medical miscoding). For instance, a system may monitor or identify codes (e.g., medical codes that correspond to specific medical conditions) of different entities. Each code may correspond to a particular set of criteria. In performing the monitoring, the system may receive or identify sets of medical codes assigned to patients over time. The system can store a mapping of the medical codes to different sets of criteria or documents from which the system can generate sets of criteria. For each code, the system can convert the language of the documents (e.g., using the mapping) into one or more questions (e.g., natural language questions) and/or sets of criteria (e.g., Boolean criteria, thresholds, etc.), or otherwise identify the sets of criteria using the mapping, that can be satisfied by answers to the one or more questions. The system can identify the records for the patient assigned to the codes and use the systems and methods described herein to determine whether the sets of criteria mapped to or corresponding to the codes are satisfied. The system can determine satisfied sets of criteria correspond to correctly classified codes and unsatisfied sets of criteria correspond to incorrectly classified codes. The system can generate an alert or message identifying the correct or incorrect codes for individual patients and transmit the alert or message to a client device for display at the client device.

In some cases, the system can automatically correct codes identified as incorrectly satisfied. For instance, responsive to determining a code is incorrectly classified, the system can identify or generate one or more, or each of the sets of criteria for the other codes stored in the mapping. The system can use the systems and methods described herein to determine which set of criteria is satisfied by records for each incorrectly classified code. The system can identify the codes that map to the satisfied sets of criteria. The system can transmit the identified codes to the client device for display at the client device.

In some embodiments, the systems and methods described herein may be used to determine whether devices (e.g., entities) owned by individuals are healthy (e.g., can be used or reliably used) for registration, such as for clinical trials, observational studies, etc. For instance, the system may receive, from a client device, a request including a document identifying a set of criteria, in some cases with a target number of individuals or devices. The request can include (1) a natural language document indicating a set of hardware tests to perform on devices of potential individuals for registration, where the hardware test may be used as a set of criteria associated with a search for devices for performing the hardware test, and (2) a number indicating the total number of devices or entities required for the hardware test. The system may determine computing devices that satisfy the criteria, such as to determine individuals that are eligible for participation in a clinical trial or observational study (e.g., identify individuals that have the necessary equipment to communicate with the system to perform the clinical trial or observational study).

For example, a computer system may receive a natural language document indicating a set of hardware tests for device connectivity and network configuration for 100 devices sampled from a set of 500,000 devices. The natural language document may state "perform a test for network latency satisfies a 100 ms threshold for at least 5,000 sampled devices." The computer system may then perform operations described herein in this disclosure to convert the criteria in the natural language document into a set of questions, including "does the device respond within 100 ms of being pinged?". By doing so, in some cases, the computer system may ensure that individuals that are identified for different protocols or other applications have devices that can connect with the computer system for the downstream applications.

It should be understood that, while a hardware test may include a network test as described above, a hardware test may also include other types of connectivity/network tests, tests related to device identity, tests related to device memory or processor resources, tests related device uptime, tests related to firmware or software version verification, security compliance tests, power and environmental monitoring tests, etc.

In some embodiments, the systems and methods described herein may be used to determine whether the language models used by a system can be used to perform the systems and methods described herein. For example, a system can store a set of criteria indicating various thresholds for large language models, such as accuracy thresholds, precision thresholds, relevance thresholds, safety thresholds, etc. The system or users can evaluate outputs of different language models (e.g., stored locally by the system or stored by external systems) that perform the searching methods described herein to generate values or data that correspond to the different criteria of the set of criteria, such as values for safety, precision, relevance, etc. The system can store the values or data in one or more records with timestamps indicating the time of generation of the data or values. The system can use the systems and methods described on the stored records to identify one or more language models that satisfy the set of criteria (e.g., exceed the relevant thresholds) to use to perform the systems and methods described herein. The system can use the identified model for subsequent searching and identification. The system can repeat this process over time to dynamically change between the different models to maintain performance and account for changes in training of the model that may affect the performance of the models.

Techniques herein may be applicable to improving technological processes of various data systems. As used in this disclosure, a random process may include a pseudorandom process that involves the use of one or more algorithms to generate pseudorandom values. A random process may also include a physics-based random process that involves the use of a physical measurement to generate a random value.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care. Where implementations involve machine learning, machine learning can be used according to a defined machine learning policy. The policy can encourage the training of a machine learning model with a diverse set of training data. Further, the policy can encourage testing for, and correcting undesirable bias embodied in the machine learning model.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. In addition, the systems and methods described herein may be performed in real time. It should also be noted that the systems and/or methods described above may be applied to, or used in accordance with, other systems and/or methods.

In some embodiments, the various computer systems and subsystems illustrated in the figures may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. In some implementations, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some, or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the words "can" or "may" are used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

These and other aspects and implementations are discussed in detail herein. The detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computer device," "computing device," or "component" encompass various apparatuses, devices, and machines for processing data, including by way of example a programmable processor, a computer, a system on a chip, or multiple ones, or combinations of the foregoing. The apparatus can include special purpose logic circuitry, e.g., a FPGA or an ASIC. The apparatus can include GPUs. The GPUs can be configured to execute or process the different models of the apparatus, such as the various machine learning models and/or large language models of the apparatus. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the set of servers 101 or the electronic device 102) to perform actions by operating on input data and generating output. The processes and logic flows can also be performed by, and apparatuses can also be implemented as, special purpose logic circuitry, e.g., an FPGA or an ASIC. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to at least one of a conjunctive list of terms may be construed as an inclusive OR to indicate any of a single, more than one, and all of the described terms. For example, a reference to "at least one of 'A' and 'B'" can include only 'A,' only 'B,' as well as both 'A' and 'B.' Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for conserving token use with a language model, the system comprising:

a server comprising one or more processors configured by instructions stored in memory to:

store a plurality of health records in a database, each health record containing a set of data for an entity and corresponding to a timestamp indicating a time of generation of the health record;

receive, from a client device, a request comprising a set of criteria to identify whether the entity satisfies the set of criteria;

identify the plurality of health records from the database based on each of the plurality of health records containing an identifier of the entity;

generate a first natural language query comprising a first health record selected based on a comparison of a first timestamp of the first health record with one or more timestamps of health records of the plurality of health records;

execute a language model using a first one or more tokens of the first natural language query to generate a first result;

responsive to determining the first result does not satisfy the set of criteria, generate a second natural language query comprising a second health record selected based at least on the second health record corresponding to a second timestamp prior to the first timestamp of the first health record;

execute the language model using a second one or more tokens of the second natural language query to generate a second result;

determine the set of criteria is satisfied based at least on the second result; and communicate a message identifying the entity to the client device responsive to the determining the set of criteria is satisfied.

2. The system of claim 1, wherein the one or more processors are configured to:

sort the plurality of health records to determine a sorted plurality of health records based on the one or more timestamps of the plurality of health records; and select the first health record from the sorted plurality of health records based at least on the first timestamp of the first health record corresponding to a most recent timestamp of the one or more timestamps of the plurality of health records.

3. The system of claim 2, wherein the one or more processors are configured to:

select the second health record from the sorted plurality of health records based at least on the second timestamp corresponding to a closest time to the first timestamp.

4. The system of claim 1, wherein the one or more processors are configured to:

determine a relevance of content of each of the plurality of health records to the set of criteria, wherein the one or more processors are configured to select the first health record based on the relevance of content of the first health record to the set of criteria.

5. The system of claim 4, wherein the one or more processors are configured to determine the relevance of the content of the first health record to the set of criteria by:

generating a set of questions determined to resolve the set of criteria; and determining the relevance of the content of the first health record to the set of questions.

6. The system of claim 4, wherein the one or more processors are configured to determine the relevance of the content of the first health record to the set of criteria by:

generating a criterion embedding from at least one of the set of criteria and a content embedding from the content of the first health record using an embedding model; and determining the relevance based on a similarity between the criterion embedding and the content embedding.

7. The system of claim 1, wherein the one or more processors are configured to:

obtain a duration parameter; and select the second health record responsive to determining the second health record is within a time period associated with the duration parameter.

8. The system of claim 1, wherein the one or more processors are configured to:

obtain a set of categories for data sources for the plurality of health records;

obtain a set of priorities for the plurality of health records, wherein the set of priorities indicates relative or absolute priority values associated with the set of categories;

categorize the plurality of health records based on the set of categories for the plurality of health records; and sort an order of the plurality of health records based on the set of priorities, wherein selecting the first health record from the plurality of records comprises selecting the first health record based at least on a priority of a category of the first health record.

9. The system of claim 1, wherein the one or more processors are configured to:

obtain a structured data set associated with the plurality of health records;

determine a result indicating that data within the structured data set does not satisfy the set of criteria; and generate the first natural language query using unstructured data within the first health record in response to determining the result does not satisfy the set of criteria.

10. The system of claim 1, wherein the one or more processors are configured to:

generate a summary indicating a quantitative change over time or a categorical change over time based on the plurality of health records; and generate the first natural language query or the second natural language query based on the summary.

11. A method, comprising:

storing, by one or more processors, a plurality of health records in a database, each health record containing a set of data for an entity and corresponding to a timestamp indicating a time of generation of the health record;

receiving, by the one or more processors from a client device, a request comprising a set of criteria to determine whether the entity satisfies the set of criteria;

identifying, by the one or more processors, the plurality of health records from the database based on each of the plurality of health records containing an identifier of the entity;

generating, by the one or more processors, a first natural language query comprising a first health record selected based on a comparison of a first timestamp of the first health record with one or more timestamps of health records of the plurality of health records;

executing, by the one or more processors, a language model using a first one or more tokens of the first natural language query to generate a first result;

responsive to determining the first result does not satisfy the set of criteria, generating, by the one or more processors, a second natural language query comprising a second health record selected based at least on the second health record corresponding to a second timestamp prior to the first timestamp of the first health record;

executing, by the one or more processors, the language model using a second one or more tokens of the second natural language query to generate a second result;

determining, by the one or more processors, the set of criteria is satisfied based at least on the second result; and communicating, by the one or more processors, a message identifying the entity to the client device responsive to the determining the set of criteria is satisfied.

12. The method of claim 11, comprising:

sorting, by the one or more processors, the plurality of health records to determine a sorted plurality of health records based on the one or more timestamps of the plurality of health records; and selecting, by the one or more processors, the first health record from the sorted plurality of health records based at least on the first timestamp of the first health record corresponding to a most recent timestamp of the one or more timestamps of the plurality of health records.

13. The method of claim 12, comprising:

selecting, by the one or more processors, the second health record from the sorted plurality of health records based at least on the second timestamp corresponding to a closest time to the first timestamp.

14. The method of claim 11, comprising:

determining, by the one or more processors, a relevance of content of each of the plurality of health records to the set of criteria; and selecting, by the one or more processors, the first health record based on the relevance of content of the first health record to the set of criteria.

15. The method of claim 14, wherein determining the relevance of the content of the first health record to the set of criteria comprises:

generating, by the one or more processors, a set of questions determined to resolve the set of criteria; and determining, by the one or more processors, the relevance of the content of the first health record to the set of questions.

16. The method of claim 14, wherein determining the relevance of the content of the first health record to the set of criteria comprises:

generating, by the one or more processors, a criterion embedding from at least one of the set of criteria and a content embedding from the content of the first health record using an embedding model; and determining, by the one or more processors, the relevance based on a similarity between the criterion embedding and the content embedding.

17. The method of claim 11, comprising:

obtaining, by the one or more processors, a duration parameter; and selecting, by the one or more processors, the second health record responsive to determining the second health record is within a time period associated with the duration parameter.

18. One or more non-transitory machine-readable media storing program instructions that, when executed by one or more processors, causes the one or more processors to perform operations comprising:

storing a plurality of health records in a database, each health record containing a set of data for an entity and corresponding to a timestamp indicating a time of generation of the health record;

receiving, from a client device, a request comprising a set of criteria to identify whether the entity satisfies the set of criteria;

identifying the plurality of health records from the database based on each of the plurality of health records containing an identifier of the entity;

generating a first natural language query comprising a first health record selected based on a comparison of a first timestamp of the first health record with one or more timestamps of health records of the plurality of health records;

executing a language model using a first one or more tokens of the first natural language query to generate a first result;

responsive to determining the first result does not satisfy the set of criteria, generating a second natural language query comprising a second health record selected based at least on the second health record corresponding to a second timestamp prior to the first timestamp of the first health record;

executing the language model using a second one or more tokens the second natural language query to generate a second result;

determining the set of criteria is satisfied based at least on the second result; and communicating a message identifying the entity to the client device responsive to the determining the set of criteria is satisfied.

19. The one or more non-transitory machine-readable media of claim 18, wherein the operations comprise:

sorting the plurality of health records to determine a sorted plurality of health records based on the one or more timestamps of the plurality of health records; and selecting the first health record from the sorted plurality of health records based at least on the first timestamp of the first health record corresponding to a most recent timestamp of the one or more timestamps of the plurality of health records.

20. The one or more non-transitory machine-readable media of claim 19, wherein the operations comprise:

selecting the second health record from the sorted plurality of health records based at least on the second timestamp corresponding to a closest time to the first timestamp.

* * * * *